United States Patent
Mori et al.

(10) Patent No.: US 6,292,267 B1
(45) Date of Patent: *Sep. 18, 2001

(54) NETWORK PRINTER APPARATUS AND LAN NETWORK SYSTEM

(75) Inventors: Yoshio Mori; Fumitake Abe; Keiji Ishiguro; Satoru Ueyama; Mari Ito; Toshimi Sato; Yasushi Saitoh; Yasunari Kida, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,449

(22) Filed: May 8, 1997

Related U.S. Application Data

(63) Continuation of application No. 08/292,110, filed on Aug. 17, 1994.

(30) Foreign Application Priority Data

Nov. 16, 1993 (JP) .................................................. 5-286806
Mar. 18, 1994 (JP) .................................................. 6-048423

(51) Int. Cl.$^7$ .................................................. G06F 15/00

(52) U.S. Cl. .................................. 358/1.15; 709/230

(58) Field of Search .............................. 358/1.1, 1.6, 1.9, 358/1.12, 1.13, 1.14, 1.15; 712/229, 1; 709/200, 201, 202, 217, 218, 221, 229, 230, 249, 358; 710/61, 72, 105, 261; 395/101, 106, 109, 111, 112, 113, 114; 229/570, 800, 200.3, 200.31, 200.32, 200.47, 500, 501, 408, 409, 437

(56) References Cited

U.S. PATENT DOCUMENTS

| | | | |
|---|---|---|---|
| 4,995,103 | 2/1991 | Tsukada et al. | 358/451 |
| 5,113,355 | 5/1992 | Nomura | 395/110 |
| 5,220,674 | * 6/1993 | Morgan et al. | 395/800 |
| 5,303,336 | 4/1994 | Kageyama et al. | 395/114 |
| 5,342,034 | 8/1994 | Mandet et al. | 270/53 |
| 5,358,238 | 10/1994 | Mandel et al. | 271/298 |
| 5,450,571 | 9/1995 | Roseurans et al. | 395/112 |
| 5,467,432 | 11/1995 | Ota | 395/112 |
| 5,467,434 | 11/1995 | Hower, Jr. et al. | 395/114 |
| 5,475,801 | 12/1995 | Brindle et al. | 395/114 |
| 5,537,626 | * 7/1996 | Kraslavsky et al. | 395/828 |
| 5,550,997 | 8/1996 | Lp et al. | 711/103 |
| 5,636,333 | * 6/1997 | Davidson, Jr. et al. | 395/114 |
| 5,940,582 | 8/1999 | Akabori et al. . | |

FOREIGN PATENT DOCUMENTS

| | | |
|---|---|---|
| 0 123 806 | 11/1984 | (EP) . |
| 2 200 818 | 8/1988 | (GB) . |
| 57-142058 | 9/1982 | (JP) . |
| 418631 | 1/1992 | (JP) . |
| 4317118 | 11/1992 | (JP) . |
| 5-61620 | 3/1993 | (JP) . |
| 5108961 | 4/1993 | (JP) . |

OTHER PUBLICATIONS

Tanabe, Masatoshi, "Printer Adopter for LAN as "Third Box" for connecting Printers", Feb. 1, 1993, Nikkei Communications.

Tsuchiya, Shinichi, "Page Printers for Direct Connection to NET", Oct. 4, 1993, Nikkei Communications.

* cited by examiner

*Primary Examiner*—Dov Popovici
*Assistant Examiner*—Gabriel I. Garcia
(74) *Attorney, Agent, or Firm*—Helfgott & Karas, P.C.

(57) ABSTRACT

A high-speed network printer apparatus which can be used in common by clients having different communication protocols and which can sort out printing jobs into the order of clients. Printing information is supplied from a client which may be a personal computer or a work station through a connector of the printer apparatus. A LAN interface driver receives the printing information and identifies a communication protocol by which the printing information is transferred. A communication protocol controller receives printing information in accordance with a predetermined protocol. A spooling controller, which is coupled to a storage unit which stores the received printing information, creates a queue for printing jobs. A printer controller reads out from the storage unit the printing information corresponding to a printing job of the highest priority which is designated by the queue, and forms a dot image on the basis of the printing information. A printing mechanism prints the image on paper. A mailbox stores printed paper into a designated bin. A printing job table is provided in the printer apparatus, in which each row is allotted to one printing job which includes a field for storing an emulation program name. A registering unit judges whether or not there is a another printing job having the same emulation program name to expedite the printing process.

39 Claims, 64 Drawing Sheets

PC ENVIRONMENT

WS ENVIRONMENT

MIXED ENVIRONMENT

| FEP → PRC | PRC → FEP |
|---|---|
| 0 1  REQUEST FOR PRINTING | 0 1  APPARATUS READY |
| 0 2  ELIMINATE JOB | 0 2  JOB END |
| 0 3  HOLD JOB | 0 3  OFF LINE |
| 0 4  MOVE JOB | 0 4  ERROR OFF LINE |
| 0 5  STOP PRINTING | 0 5  ON LINE |
| 0 6  RESUME PRINTING | 0 6  TEST COMMAND |
| 0 7  SHUTDOWN | 0 7  KEEP POWER-OFF STATE |
| 0 8  NOTICE OF ERROR | 0 8  NOTICE OF ERROR |

FIG. 14

| | COMMAND | FUNCTION | lpd COMPATIBLE SYSTEM | COMMUNICATION FILTER SYSTEM |
|---|---|---|---|---|
| UNIX STANDARD PRINTING COMMANDS | lpr | TRANSMIT A JOB TO THE PRINTER | EXTENSION PRINTING IS POSSIBLE BY SUPER OPTION DESIGNATION OF FILTER IS DISREGARDED | EXTENSION PRINTING IS POSSIBLE BY SUPER OPTION DESIGNATION OF FILTER IS POSSIBLE |
| | lpq | DISPLAY THE JOBS IN THE JOB QUEUE | DISPLAY OF THE JOB QUEUES BOTH IN A LOCAL HOST AND IN THE NETWORK PRINTER IS POSSIBLE | DISPLAY OF THE JOB QUEUE ONLY IN LOCAL HOST IS POSSIBLE |
| | lpm | ELIMINATE A SPOOLING JOB | OBJECT OF ELIMINATION: JOB BOTH IN LOCAL HOST AND IN THE NETWORK PRINTER | OBJECT OF ELIMINATION: JOB ONLY IN A LOCAL HOST |
| | lpc | CONTROL THE PRINTER | OBJECT OF CONTROL: ONLY A LOCAL HOST | |
| PRINTING COMMAND EXCLUSIVELY FOR NPR | npr | TRANSMIT A JOB TO THE NETWORK PRINTER | EXTENSION PRINTING IS POSSIBLE BY SUPER OPTION DESIGNATION OF FILTER IS DISREGARDED | EXTENSION PRINTING IS POSSIBLE BY SUPER OPTION DESIGNATION OF FILTER IS POSSIBLE |
| | npq | DISPLAY THE JOBS IN THE JOB QUEUE IN THE NETWORK PRINTER | DISPLAY OF THE JOB QUEUES BOTH IN A LOCAL HOST AND IN THE NETWORK PRINTER IS POSSIBLE | |
| | nprm | ELIMINATE A SPOOLING JOB IN THE NETWORK PRINTER | OBJECT OF ELIMINATION: JOB BOTH IN LOCAL HOST AND IN THE NETWORK PRINTER | |
| | npj | DISPLAY THE JOBS WHICH HAVE BEEN REQUIRED TO BE PRINTED BY THE NETWORK PRINTER | OBJECT OF DISPLAY: JOB IN THE NETWORK PRINTER | |
| | nph | HOLD/CANCEL THE JOB IN THE NETWORK PRINTER | OBJECT OF HOLDING/CANCELING: JOB IN THE NETWORK PRINTER | |
| | npc | CONTROL THE NETWORK PRINTER | OBJECT OF CONTROL: JOB ONLY IN THE NETWORK PRINTER | |
| | npset | SET THE NETWORK PRINTER | OBJECT OF SETTING: ONLY THE NETWORK PRINTER | |

FIG. 22

| COMMAND CODE | HEADER | TYPE OF DATA | | DIRECTION PRINTER HOST CLIENT |
|---|---|---|---|---|
| REQUEST FOR PRINTING | ① ① ① ② | PRINTING FILE PRINTING ATTRIBUTE FILE FILE ATTRIBUTE INFORMATION CONFIRMATION INFORMATION | JOB NAME EMULATION NAME DESIGNATED PAPER FEED HOPPER BOTH-SIDE PRINTING USER NAME (GROUP NAME) BIN NUMBER FILE SIZE | → → → ← |
| INQUIRY | ① ② | INQUIRY REQUEST INFORMATION CONTENTS OF INQUIRY | NUMBER OF QUEUED JOBS QUEUED JOB INFORMATION PRINTER STATE | → ← |
| JOB CONTROL | ① ② | JOB CONTROL INFORMATION CONFIRMATION INFORMATION | ELIMINATION HOLD/CANCEL HOLD CHANGE OF PRIORITY | → ← |
| PRINTER CONTROL | ① ② | PRINTER CONTROL INFORMATION CONFIRMATION INFORMATION | STOP RECEIPT OF SPOOL/ RESUME RECEIPT STOP/RESUME PRINTER POWER OFF | → ← |
| PRINTING ENVIRONMENT SETTING | ① ① ② ② | INQUIRY ABOUT ENVIRONMENT ENVIRONMENT SETTING INFORMATION ENVIRONMENT INFORMATION CONFIRMATION INFORMATION | IP ADDRESS, MAC ADDRESS INITIAL APPARATUS INFORMATION PAPER FEED/BOTH SIDE OFFSET STACK BANNER CONTROL EMULATION PRINTER MANAGER/ WHERE TO INFORM | → → ← ← |
| INFORMATION NOTICE | ① ② | NOTICE INFORMATION CONFIRMATION INFORMATION | | ← → |

○ NUMBER OF BINS : n n n   INCREASE IN THE NUMBER OF BINS: □ △ n n n   ORDER OF ALLOTTING BINS: □ DESCENDING ORDER
REMOVAL OF BINS: □ ▽ n n n   □ ASCENDING ORDER

62

○ MANAGEMENT OF LOGGING INFORMATION
　□ : DISPLAY
　□ : TRANSFER → □ EXTERNAL MEDIUM : FLOPPY   □ : USER NAME
　□ : PRINT
　□ : LIST OF MAILBOX MANAGEMENT INFORMATION
　□ : LIST OF BIN ALLOTMENT INFORMATION
　□ : LIST OF A BIN ACCOMMODATION RATIO
　□ : LIST OF ERROR INFORMATION

63

○ SECURITY ATTRIBUTES
　□ SET SECURITY   → □ YES  □ NO

□ SECURITY MODE
　　□ : PASSWORD
　　□ : USER ID
　　□ : SMOKY CASE
　　□ : KEY

64

○ SET BIN ATTRIBUTES

| 1 BIN | → | □ USER NAME : ___ | □ GROUP NAME : ___ | □ FREE TYPE |
|       |   | □ OVERFLOW TYPE | □ PASSWORD : ___ | |
| 2 BIN | → | □ USER NAME : ___ | □ GROUP NAME : ___ | □ FREE TYPE |
|       |   | □ OVERFLOW TYPE | □ PASSWORD : ___ | |
| 3 BIN | → | □ USER NAME : ___ | □ GROUP NAME : ___ | □ FREE TYPE |
|       |   | □ OVERFLOW TYPE | □ PASSWORD : ___ | |
| 4 BIN | → | □ USER NAME : ___ | □ GROUP NAME : ___ | □ FREE TYPE |
|       |   | □ OVERFLOW TYPE | □ PASSWORD : ___ | |
| n n n BIN | → | □ USER NAME : ___ | □ GROUP NAME : ___ | □ FREE TYPE |
|       |   | □ OVERFLOW TYPE | □ PASSWORD : ___ | |

FIG. 45

| 61a | 61b | 61c | 61d | 61e | 61f | 61g |
|---|---|---|---|---|---|---|
| ID | DISK ADDRESS | FILE NAME | SIZE | EMULATION | OVERLAY | FLAG |
| 1 | 1111 | AAAA | 1111 | PS | FORMAT 1 | 3 |
| 2 | 2222 | BBBB | 2222 | PCL | FORMAT 2 | |
| 3 | 3333 | CCCC | 3333 | PS | FORMAT 1 | . |
| 4 | 4444 | DDDD | 4444 | PS | FORMAT 3 | . |
| . | . | . | . | . | . | . |

FIG. 57

| 61a | 61b | 61c | 61d | 61e | 61f | 61g | 61h |
|---|---|---|---|---|---|---|---|
| ID | DISK ADDRESS | FILE NAME | SIZE | EMULATION | OVERLAY | FIRST FLAG | SECOND FLAG |
| 1 | 1111 | AAAA | 1111 | PS | FORMAT 1 | 4 | 3 |
| 2 | 2222 | BBBB | 2222 | PCL | FORMAT 2 | | 4 |
| 3 | 3333 | CCCC | 3333 | FM | FORMAT 1 | | |
| 4 | 4444 | DDDD | 4444 | PS | FORMAT 1 | | |
| . . . | . . . | . . . | . . . | . . . | . . . | . . . | . . . |

FIG. 62

NETWORK PRINTER APPARATUS AND LAN NETWORK SYSTEM

This is a continuation, of application Ser. No. 08/292,110, filed Aug. 17, 1994.

BACKGROUND OF THE INVENTION

1. Field of the Invention

The present invention relates to a network printer apparatus and a LAN network system and, more particularly, to a network printer apparatus which realizes the communication function and a full-scale server function between the network printer apparatus and a LAN by adding a LAN adapter portion (Front End Processor) to the printer apparatus itself, and a LAN network system comprising such a network printer apparatus.

2. Description of the Related Art

A network printer apparatus is an apparatus connected to a plurality of personal computers or work stations through a LAN so as to store printing files (printing information) transferred from the personal computers or work stations in a storage unit, to register printing jobs in a printing job table, to form an image on the basis of the printing information which corresponds to the printing job, and to print the image on paper.

Such a conventional network printing apparatus executes printing operations in the order of receipt of printing information from a client or user (personal computer or work station).

The ways of description of printing data are different in personal computers or workstations which are produced by different makers. As a countermeasure, a network printer apparatus is provided with emulation programs for interpreting various types of printing data, and when printing information is transferred to the apparatus, the apparatus starts the emulation program designated by the printing information (emulation designation data) so as to interpret the printing data. In order to switch emulation programs, it is necessary to initialize the contents of the memory, which takes a considerable time.

The network printer apparatus has a printing function using a form overlay (a blank form, sometimes called merely overlay). This is a function of printing an image on paper overlayed with the form which is stored in advance. The form overlay is not constant but is changed in accordance with the printing job. When the overlay is changed, it is necessary to download the corresponding form overlay from a form overlay storing device of a hard disk or the like or a personal computer or the like for storing form overlays, which takes a considerable time.

When the printing jobs having the same emulation and the same overlay are executed in series, it is not necessary to change the emulation programs or overlays.

However, since personal computers or work stations made by different makers are connected to a LAN, and the form overlays differ with clients, it is scarcely the case that printing operations having the same printer emulation and the same form overlay are registered in series. It is therefore often necessary to switch emulation programs or change a form overlay for each printing job so that the efficiency of use of the network printer apparatus is lowered and the high speed printability of the apparatus is not fully utilized.

Information processing systems have changed from the processing form using a large computer system (mainframe) shown in FIG. 3a to a processing form using a PC/WS (personal computer/work station) as a nucleus shown in FIG. 3b. Referring to FIG. 3a, the symbol HST represents a large computer system, and DT designates a dumb terminal (nonintelligent terminal) connected to the large computer system.

As the processing forms using a PC/WS as the nucleus, there are a stand-alone system and a network system in which a multiplicity of PCs/WSs are connected to a LAN network so as to constitute a network for the purpose of using resources and peripheral equipments in common. The stand-alone system is widely used by individuals and small-scale users, while the network system is widely used by large-scale users. FIG. 3b shows the stand-alone system comprised of individual dumb terminals each provided with a printer. The symbol PRT represents a printer connected to a PC/WS. In this system, each pair of PC/WS and printer is independent of another pair.

In the large computer system, one maker provides all equipments so as to sell the system in the market. In contrast, in the field of the LAN network system, various makers in the world compete with each other so as to sell a high-performance PC/WS at a low price in the market. In such a market environment, it is necessary to provide products which answer the needs for network, open system, downsizing and multivendor.

As shown in FIGS. 4a to 4c, in the conventional LAN network system, in a PC environment, PCs (personal computers) are connected to a LAN so as to constitute a network, in a WS environment, WSs (work stations) are connected to a LAN so as to constitute a network, and in a mixed environment, PCs and WSs connected to a LAN are now in wide use. Printers used in the mixed environment are connected in one of the forms (1), (2) and (3) as shown in FIG. 4(c). In the form (1), a printer PRT 1 may be locally connected to each of the PCs/WSs so as to print printing data supplied from the corresponding PC/WS. In the form (2), a printer PRT 2 is connected to a high-performance PC/WS as a host server SVR, and the PCs/WSs use the printer PRT2 connected to the server SVR in common. In the form (3), a printer PRT3 is connected to LAN via adapter AD and the PCs/WSs use the printer PRT3 connected to the LAN in common.

However, the conventional system in which printers are accommodated in a LAN network has the following problems.

(a) When printers are connected in the form (1), the availability of printers themselves is low, and since a printer is connected to each PC/WS, this system is disadvantageous in that the same number of printers as the number of PC/WS and the space for each printer are required.

(b) When a printer is connected in the form (2), printing data (e.g., complicated graphic design and graph) which takes a long time for producing an image exerts an influence on the CPU of the host server during the printing operation, which leads to a great deterioration of the performance of the host server.

(c) When a printer is connected in the form (3), if the PCs/WSs connected to the LAN network are produced by the same maker, in other words, the printing data have the same format, there is no problem. This is because the emulation program (e.g., Postscript and FM sequence) provided in the printer for interpreting the printing data can be used in common among the PCs/WSs. However, if the formats of the printing data are different and, hence, the emulation programs are different, a printing miss may sometimes be caused due to an interpretation miss of the printer.

In addition, when the communication protocol between the printer and a client is different, the printing data cannot be received from the client, so that the printing operation is impossible.

(d) With the spread of the LAN network, a vertical linkage, namely, the system in which a mainframe is connected to the LAN of PCs/WSs is used as well as a horizontal linkage, namely, the system in which PCs/WSs are connected to the LAN network. However, the format of the printing data in the mainframe is different from the format of printing data in PCs/WSs. It is therefore necessary to install a plurality of printers for printing the respective data. In other words, one printer cannot print all printing data required in such systems.

(e) With the development of printing technique, the printing using continuous paper has been replaced by the printing using cut paper. In response to the demand for the printing output which enables printing on printing on a large number of sheets of paper in one cycle, a high-speed cut paper printer which is capable of printing 130 sheets/min has been realized. In such a high-performance in high-speed printer, since printing of a multiplicity of printing jobs is executed in a short time, it is necessary to identify printed cut paper for each printing job. For this purpose, a method of stacking printed cut paper in two alternate directions for each printing job is known and is referred to as offset stack. In this method, however, since the signals for stacking printed cut paper in one direction are alternately output, if only the stack of the printed paper for one printing job is taken out, the printed sheets of paper for the preceding and the subsequent printing jobs are stacked in the same direction, so that identification of a specific printing job is difficult. Thus, there is a problem in the post-processing mechanism of a high-speed printer, and a speedy solution thereof is demanded.

(f) The UNIX environment, i.e, the LAN network environment used in the related art has the following problems, and an amelioration is demanded.

When a printer is used as a remote printer (refer to FIG. 4(b)), a client is not fully informed of the end of the printing operation, details of a trouble caused in the printer or the like.

When a PC/WS such as a print server exclusively for controlling a printer is used, the system becomes expensive, so that a LAN network system which can dispense with a PC/WS server exclusively for a printer is highly demanded.

In the print server, a line command is used to request printing, enquire about a printing job, know the state of the printer, etc., so that expert knowledge is necessary. A LAN network environment which can be utilized without the need for expert knowledge is demanded.

SUMMARY OF THE INVENTION

Accordingly, it is a first object of the present invention to eliminate the above-described problems in the related art and to provide a high-speed network printer apparatus which can be used in common by LAN terminals having different communication protocols, and a LAN network system comprising such a network printer apparatus.

It is a second object of the present invention to provide a network printer apparatus which can be installed at any place in a LAN network, and a LAN network system comprising such a network printer apparatus.

It is a third object of the present invention to provide a network printer apparatus which enables a client (PC/WS) to know the state (error such as jamming and shortage of paper, the printing attributes of the printer, printing operation state, etc.) of the printer with easiness, and a LAN network system comprising such a network printer apparatus.

It is a fourth object of the present invention to provide a network printer apparatus which can interpret and print printing data of any format, and a LAN network system comprising such a network printer apparatus.

It is a fifth object of the present invention to provide a network printer apparatus which facilitates the creation of a command for a request for printing and a command for enquiry, and a LAN network system comprising such a network printer apparatus.

It is a sixth object of the present invention to provide a network printer apparatus which is provided with a post-processing function for sorting printing jobs (printed sheets of paper) into the order of user or into the order of group, and a LAN network system comprising such a network printer apparatus.

To achieve these and other objects, there is provided a network printer apparatus connected to a LAN network system and to a plurality of personal computers or work stations through the LAN network system, the apparatus comprising:

a connector provided in common with a plurality of communication protocols;

a LAN adapter means including a LAN interface driver for receiving printing information from a client through the LAN network system, and a multiprotocol controller for identifying the communication protocol and controlling the communication between the apparatus and a client in accordance with the communication protocol;

a printer controller for forming an image on the basis of the printing information received; and a printing mechanism for printing the image on paper.

BRIEF DESCRIPTION OF THE DRAWINGS

The present invention will be understood and appreciated more fully from the following detailed description, taken in conjunction with the drawings in which:

FIG. 14 is an explanatory table of BUS commands;

FIG. 22 shows a list of line commands;

FIG. 27 shows a list of commands to a client;

FIG. 45 shows an example of the menu screen of a mailbox manager in the mailbox shown in FIG. 44;

FIG. 57 shows a job table used in the printer apparatus of FIG. 56;

FIG. 62 shows a job table of a further embodiment;

DETAILED DESCRIPTION OF THE PREFERRED EMBODIMENTS

Figure 1:
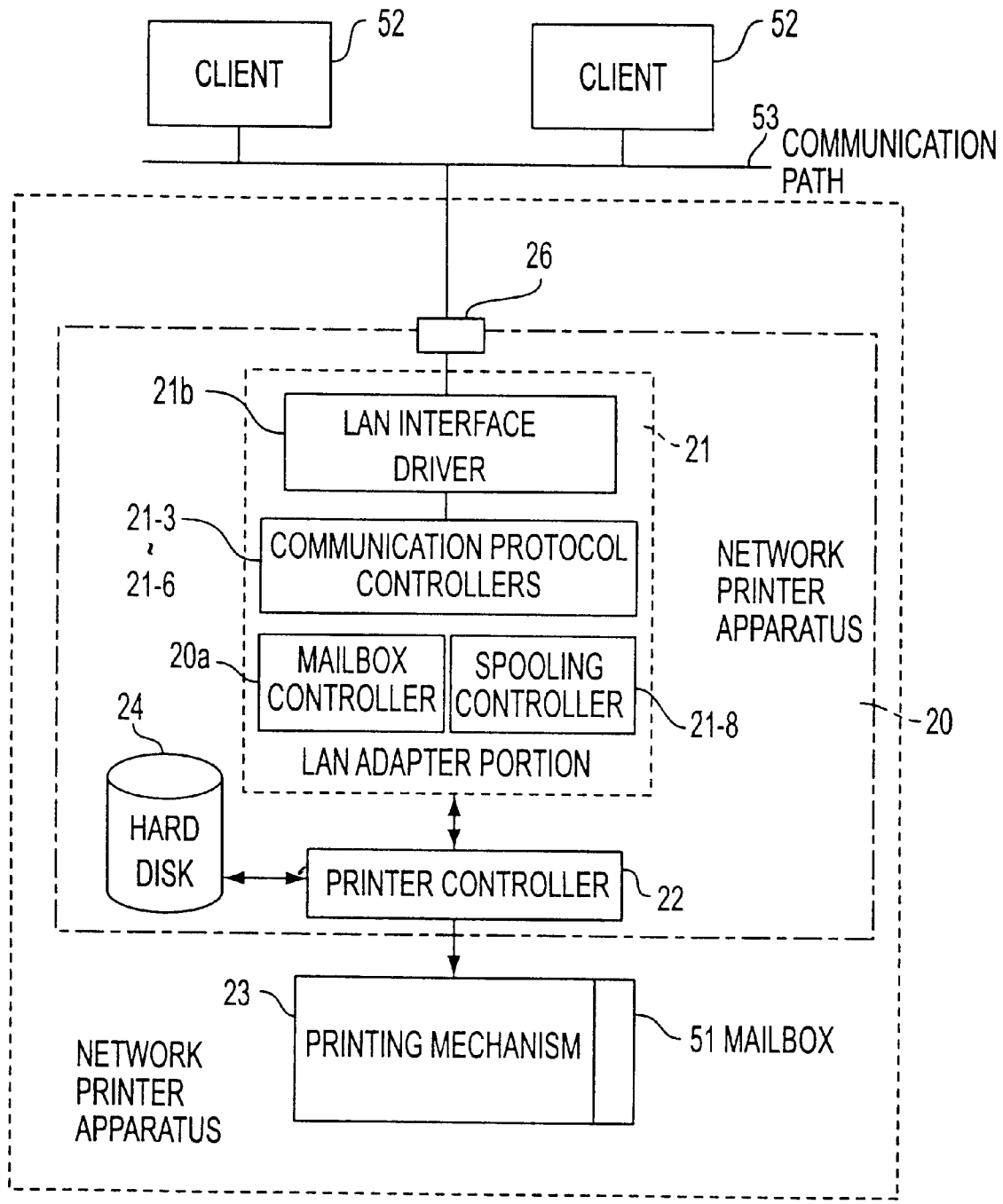
FIG. 1 is a diagrammatic view of the network printer apparatus connected to a LAN system of the present invention in accordance with one embodiment.

The principle of the present invention will be explained with reference to FIG. 1 showing one embodiment of the invention. In FIG. 1, the reference numeral 20 represents a network printer apparatus, 23 is a printing mechanism composed of a recording system and a paper feeding system, 51 is a mailbox provided with bins for accommodating printed paper so as to store printed paper in a designated bin, 52 is a client (PC or work station), and 53 is a communication path such as Ethernet. In the network printer apparatus 20, the reference numeral 21 denotes a LAN adapter (Front End Processor: FEP), 22 a printer controller, 24 a storage means (hard disk) for storing printing data (SPOOL information), font, form overlay, account log information, mailbox control information files, etc., and 26 is a connector for connecting the network printer apparatus 20 to a LAN. Here, "SPOOL" is abbreviation of "Simultaneous Peripheral Operation On-Line".

In the LAN adapter portion 21, the reference numeral 21b represents a LAN interface driver constituted by a transceiver and the like, 21-3 to 21-6 are communication protocol controllers, 21-8 is a spooling controller and 20a is a mailbox controller.

The printing information supplied from the client 52 through the connector 26 is received by the LAN interface driver 21b, which identifies the communication protocol. The communication protocol controller 21-3, 21-4, 21-5 or 21-6 corresponding to the identified communication protocol controls communication in accordance with the predetermined protocol and receives printing data. The spooling controller 21-8 performs "Spool", namely stores the printing information in the hard disk 24 and creates a queue for printing jobs. The printer controller 22 reads out of the hard disk 24 the printing information corresponding to the printing job of the highest priority which is designated by the queue, and forms a dot image for each page on the basis of the printing information. The printing mechanism 23 prints the image on paper.

If the mailbox 51 is provided, the mailbox controller 20a obtains the number of the bin which is to store the printed paper directly or indirectly from the printing information, and store the printed paper in the bin.

The client 52 creates printing data, data for enquiry about the state of the apparatus and the job information, a change of the printing attributes and data to be registered by the operation on the menu screen, and these data are supplied to the network printer apparatus 20 through the LAN. The client 52 also receives the response to the enquiry and displays the response data. In addition, the client 52 receives and displays the information such as the shortage of paper, a trouble of the hardware which is automatically supplied from the network printer apparatus 20. Furthermore, the client 52 is also capable of operation of the attributes of each bin of the mailbox 51 and other operations on the menu screen.

Figure 2:
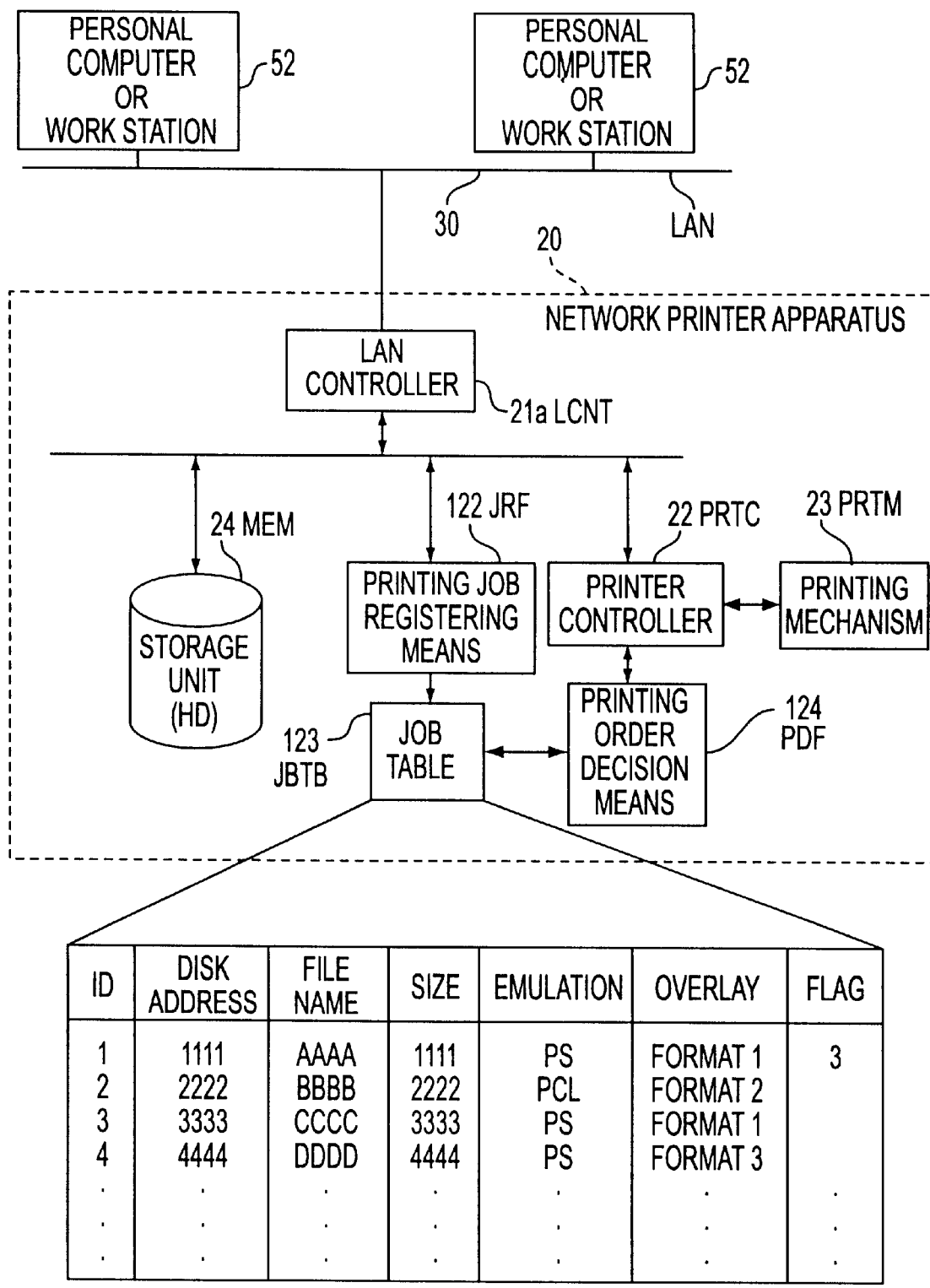
FIG. 2 is a diagrammatic view showing a network printer apparatus of the present invention in accordance with another embodiment.
Figure 3A:
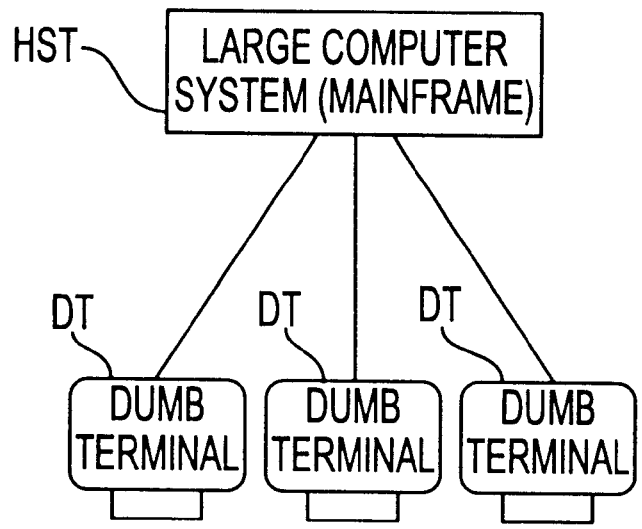
FIG. 3a is an explanatory view of the processing form of a large computer system (mainframe)
Figure 3B:
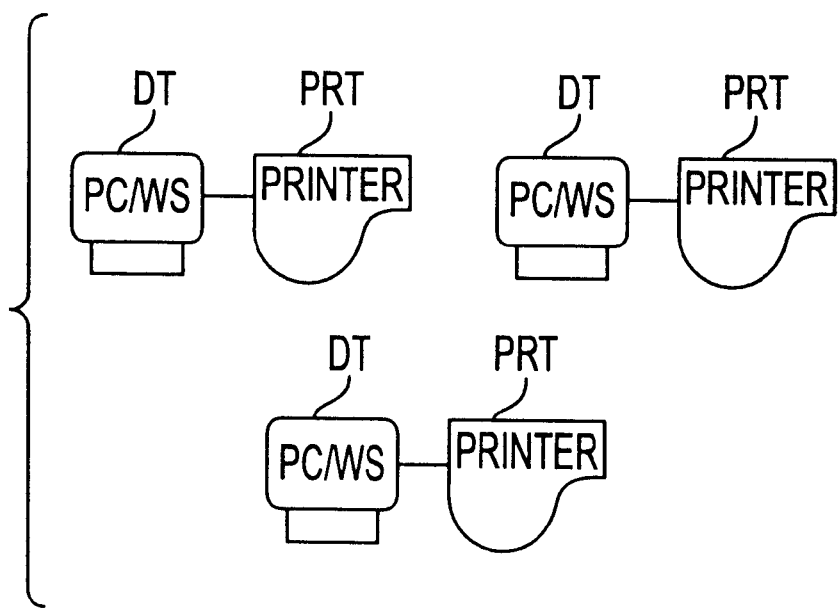
FIG. 3b is an explanatory view of the processing form of a stand-alone system.
Figure 4A:
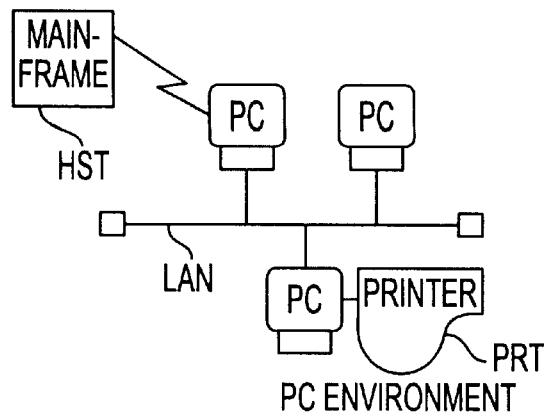
FIGS. 4a to 4c schematically show LAN network systems using PCs/WSs as a nucleus.
Figure 4B:
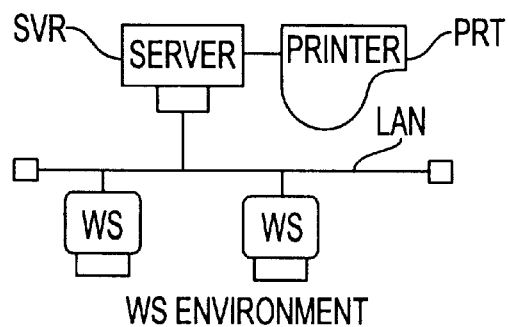
Figure 4C:
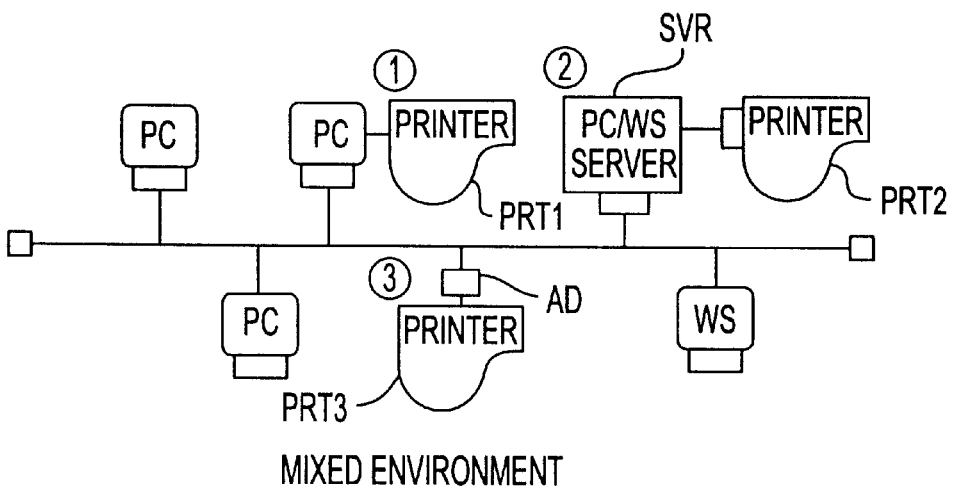

FIG. 2 shows a principle view of another embodiment of the printer apparatus.

In FIG. 2, the reference numeral 52 represents clients, namely personal computers or work stations, 20 is a network printer apparatus and 30 is a LAN network system.

In the network printer apparatus 20, the symbol LCNT represents a LAN controller 21a, PRTC is a printer controller 22, PRTM is a printing mechanism 23, MEM is a storage means 24 (a hard disk), JRF is a printing job registering unit 122, JBTB is a job table 123 and PDF is a printing order decision unit 124.

Each row of the job table JBTB is allotted to one printing job and includes a field for storing the printing job name (ID), a field for storing the storage location in the storage unit at which the printing information is stored, a field for storing the file name, a field for storing the file size, a field for storing the name of the emulation program for interpreting the printing information, a field for storing the form overlay name, and a job designation field (flag field) for storing the data which designates another printing job using the same emulation program and the same form overlay as those of the printing job entered in the row.

When a user (client) inputs new printing information, the printing information is stored in the storage unit MEM. The printing job registering means JRF extracts the emulation program name and the form overlay name from the new printing information and judges whether or not there is a printing job having the same emulation program name and the same form overlay name as the extracted emulation program name and form overlay name in the job table JBTB. If the answer is YES, the printing job retrieves the printing job, then enters the printing job name corresponding to the new printing information in the job designation field of the row of the retrieved printing job and registers the printing job corresponding to the new printing information in the job table JBTB. When a printing operation is finished in accordance with a predetermined printing job, the printing order decision means PDF judges whether or not another printing job is designated in the job designation field (flag field) of the row of the predetermined printing job. If the answer is YES, the printing order decision means PDF commands the printer controller PRTC and the printing mechanism PRTM to execute the printing operation in accordance with the designated printing job, while if the answer is NO, the printing order decision means PDF commands the printer controller PRTC and the printing mechanism RRTM to execute printing operations in series in the order of receipt of printing information, and eliminates the printing job which has been finished from the job table JBTB.

According to above-described, when there is a printing job using the same emulation program and the same form overlay as those of the printing job which has been finished printing, the job is executed irrespective of the order of receipt. It is therefore possible to reduce, as much as possible, the number of times emulation programs are to be switched and the number of times a form overlay is to be changed, thereby enhancing the efficiency of the use of the network printer apparatus.

Each row of the job table JBTB may be further provided with a second designation field for designating another printing job using a different emulation program but the same form overlay as that of the printing job entered in the row. When a user inputs new printing information, the printing job registering means JRF extracts the emulation program name and the form overlay name from the new printing information and judges whether or not there is a printing job having a different emulation program name but the same form overlay name as the extracted form overlay name in the job table 21a (JBTB). If the answer is YES, the printing job registering means JRF retrieves the printing job and then enters the printing job name corresponding to the new printing information in the second job designation field of the row of the retrieved printing job. When a printing operation is finished in accordance with a predetermined printing job, the printing order decision unit PDF judges whether or not another printing job is designated in the first job designation field of the row of the predetermined printing job. If the answer is NO, the printing order decision means PDF judges whether or not another printing job is designated in the second job designation field of the row of the predetermined printing job. If the answer is YES, the printing order decision means PDF commands the printer controller PRTC and the printing mechanism PRTM to execute the printing operation in accordance with the designated printing job, while if the answer is NO, the printing order decision unit PDF commands the printer controller PRTC and the printing mechanism PRT to execute printing operations in series in the order of receipt of printing information.

According to this structure, it is possible to further reduce the number of times a form overlay is to be changed, thereby enhancing the efficiency of the network printer apparatus.

Alternatively, the second job designation field of the job table JBTB may designate another printing job using a different form overlay but the same emulation program as that of the printing job entered in the row. When a user inputs new printing information, the printing job registering unit JRF extracts the emulation program name and the form overlay name from the new printing information and judges whether or not there is a printing job having a different form overlay name but the same emulation program name as the extracted emulation program name in the job table JBTB. If the answer is YES, the printing job registering means JFR retrieves the printing job and then enters the printing job name corresponding to the new printing information in the second job designation field of the retrieved printing job. When a printing operation is finished in accordance with a predetermined printing job, the printing order decision means PDF judges whether or not another printing job is designated in the first job designation field of the predetermined printing job. If the answer is NO, the printing order decision means PDF judges whether or not another printing job is designated in the second job designation field of the predetermined printing job. If the answer is YES, the printing order decision means PDF commands the printer controller PRTC and the printing mechanism portion PrT to execute the printing operation corresponding to the designated painting job, while if the answer is NO, the printing order decision means PDF commands the printer controller PRTC and the printing mechanism portion PRT to execute printing operations in series in the order of receipt of printing information.

FIGS. 5a to 5d schematically show a LAN network system comprising a network printer apparatus according to the present invention.

Figure 5A:
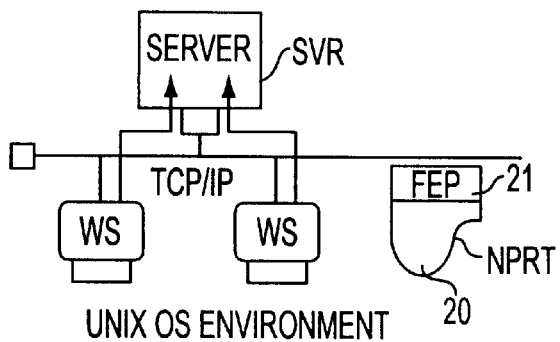
FIG. 5a to 5d are schematic views of a LAN network systems comprising a network printer apparatus according to the present invention.

In FIG. 5(a), a network printer 20 is incorporated in a UNIX OS (Operating System) environment. The symbol WS represents a work station (client), SVR a server, and NPRT a network printer connected 20 to a LAN network system. Each element is provided with a TCP/IP protocol and communicates with another element in accordance with the TCP/IP protocol.

Figure 5B:
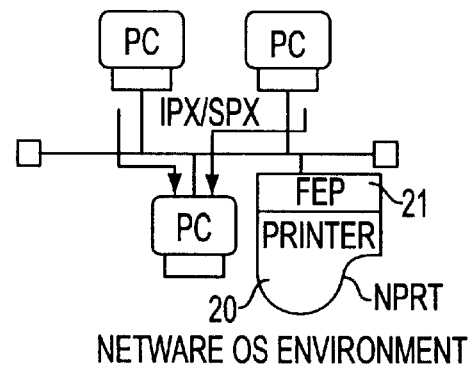

In FIG. 5(b), a network printer 20 provided with the LAN adapter 21 is incorporated in a Netware OS environment. The symbol PC represents a personal computer, and NPRT a network printer apparatus connected to the LAN network system. Each element is provided with an IPX/SPX protocol and communicates with another element in accordance with the IPX/SP protocol.

The network printer apparatus NPRT is composed of printer apparatus 20 and LAN adapter (Front End Processor: FEP) 21 which is provided with a function of communicating with the LAN and a full-scale server function. The FEP is provided therein with TCP/IP, IPX/SPX and other communication protocols so as to communicate in accordance with a predetermined communication protocol as occasion demands. In other words, the FEP is provided with a multiprotocol control function. The network printer apparatus NPRT is therefore usable in the UNIX OS environment and the Netware OS environment in common without the need for separately designing network printers in accordance with the respective environments.

Figure 5C:
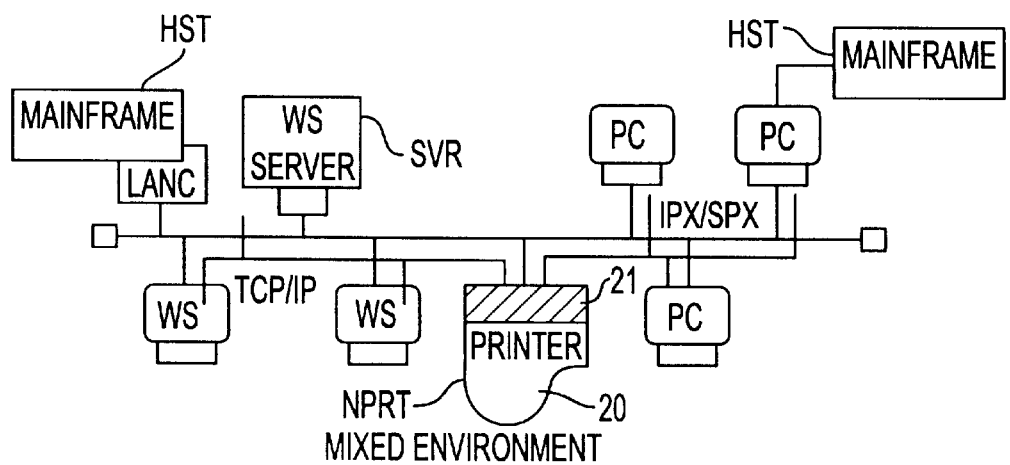

In FIG. 5(c), the network printer apparatus 20 of the present invention is used in a mixed environment of a UNIX OS (Operating System) environment and a Netware OS environment. The FEP (LAN adapter) 21 of the network printer apparatus NPRT receives a request for printing from the UNIX environment and a request for printing from the Netware environment, judges whether the communication protocol is the TCP/IP protocol or the IPX/SPX protocol from the ID of the header portion of the packet, and transmits the request to the corresponding protocol processing part. Each protocol processing part has a multitask structure for processing data in parallel. It is therefore possible to greatly shorten the queue time for printing jobs as compared with a conventional LAN network system. In addition to the above-described horizontal linkage, a vertical linkage is also possible. That is, a mainframe HST is connected to a communication path through a LAN controller LANC or a personal computer PC and printing operation is conducted in response to a request received from the main frame HST.

Figure 5D:
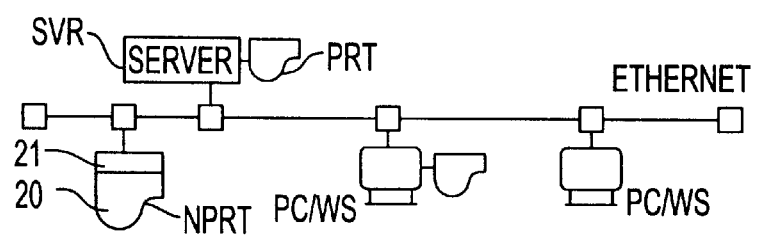

In FIG. 5(d), the network printer apparatus 20 (NPRT) of the present invention is connected to the communication path of a conventional LAN network system. In this way, it is possible to connect the network printer apparatus NPRT of the present invention as it is to the existing system so that the existing PC/WS can use the network printer NPRT in common.

Figure 5E:
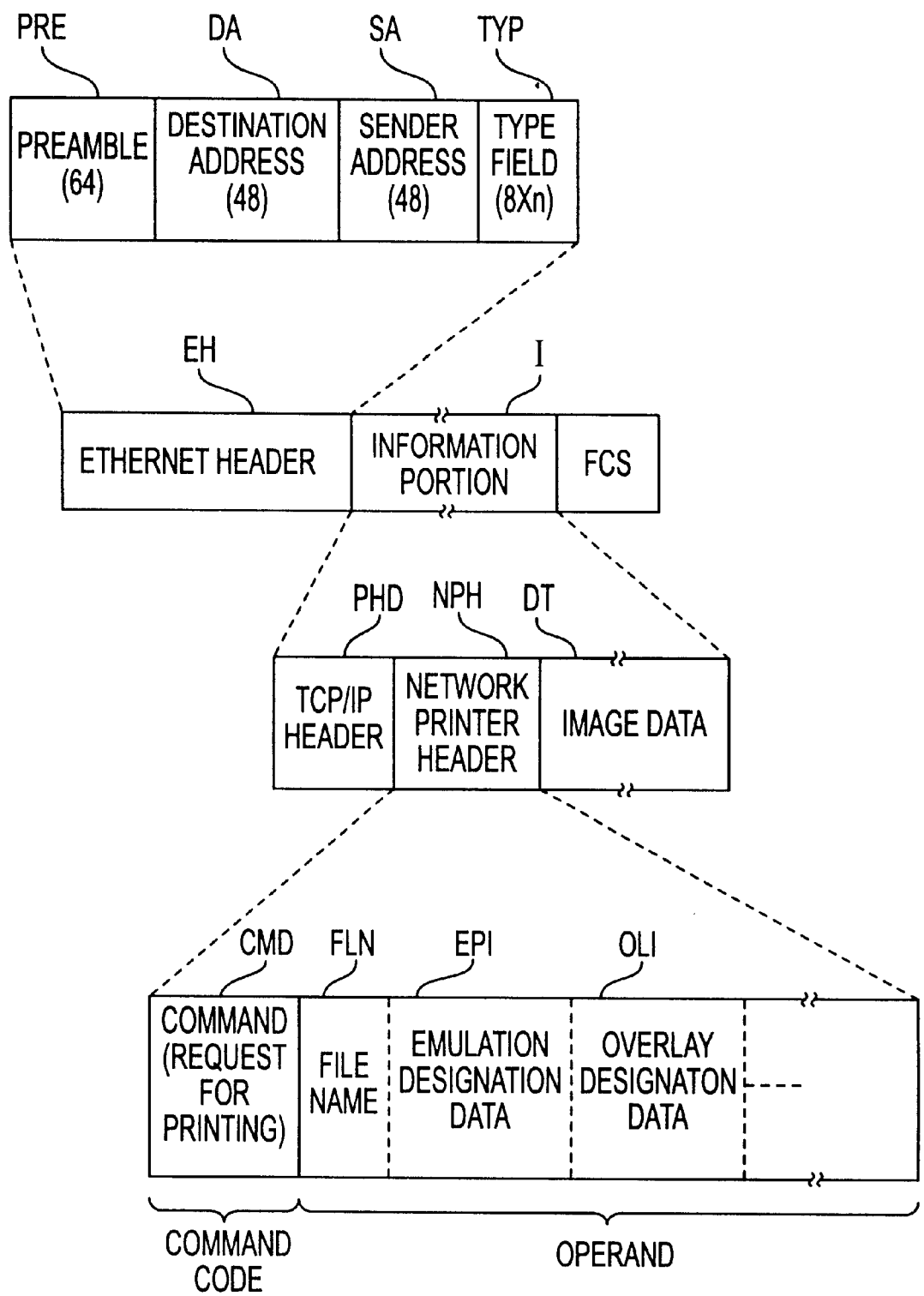
FIG. 5e shows an Ethernet frame.

Referring to FIG. 5e, an Ethernet frame is shown, which is composed of an Ethernet header EH, an information portion I and a frame check sequence portion FCS. The Ethernet header EH includes a preamble PRE for establishing synchronism, a destination address DA, a sender address SA and a type field TYP in which the type of communication protocol (TCP/IP, IPX/SPX) is written. In the information portion I, the header of each communication protocol (e.g., TCP/IP header) PHD, a network printer header NPH and printing data (image data) DT are written. The network printer header NPH includes a command CMD such as a request for printing, a file name FLN, emulation designation data EPI for designating the emulation to be used, overlay designation data OLI for designating the overlay to be used, etc.

Printing information is transmitted through the LAN for each frame, and when the frame is transmitted in the form of a packet, it is called a "packet". "Packet" and "frame" in this specification are therefore substantially the same.

First embodiment of a network printer apparatus of the invention.

Figure 6:
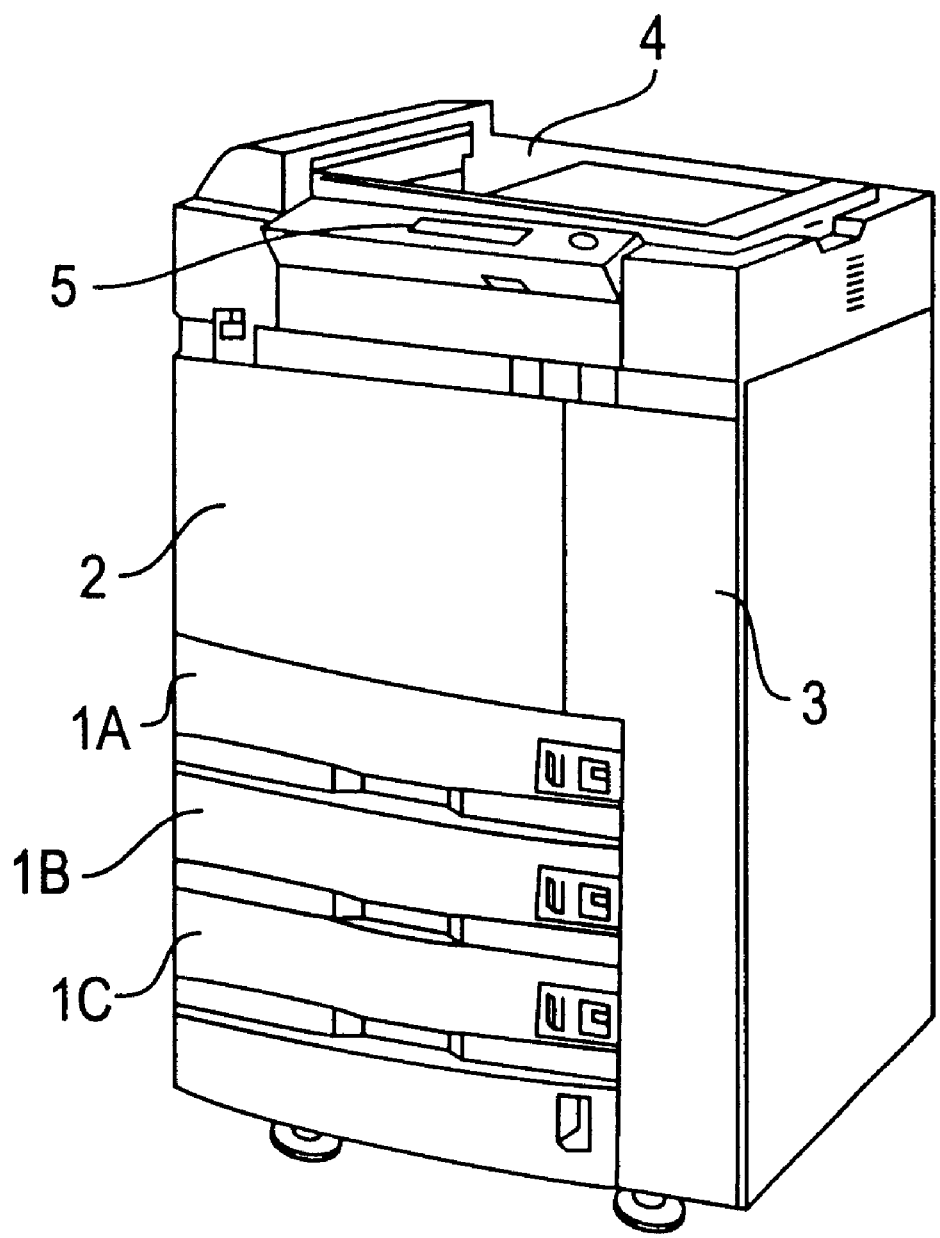
FIG. 6 is a perspective view of a network printer apparatus according to the present invention.
Figure 7:
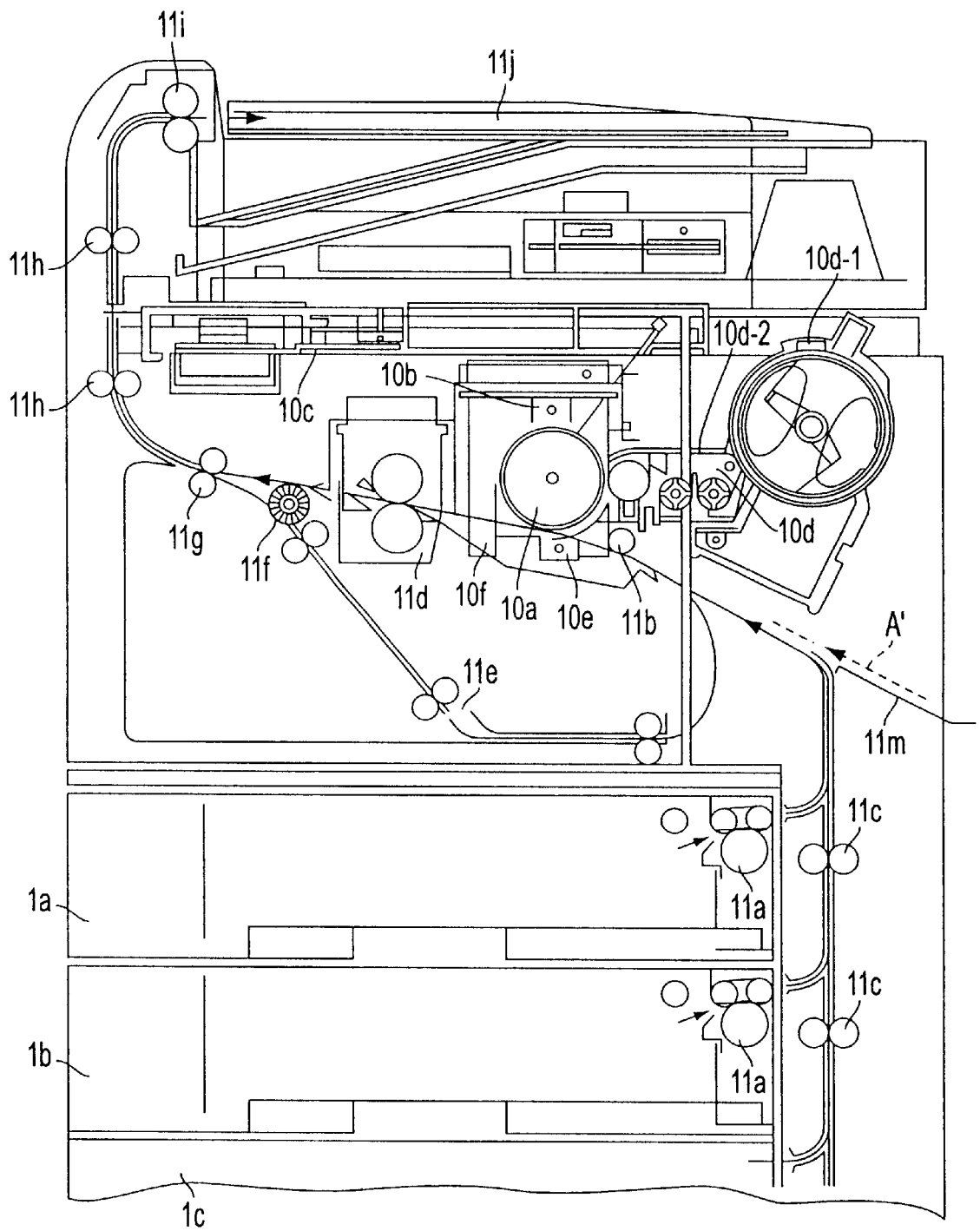
FIG. 7 shows a diagrammatic side view of the structure of the printing mechanism of the apparatus shown in FIG. 6.

FIG. 6 is a perspective view of a first embodiment of a network printer apparatus according to the present invention. FIG. 7 diagrammatically shows the structure of the printing mechanism of the embodiment of the apparatus shown in FIG. 6. In FIG. 6, the reference numerals 1a to 1c represent three hoppers for accommodating paper (cut paper), and 2 and 3 represent a left door and a right door, respectively. When the left door 2 or the right door 3 is opened, the interior is seen. The reference numeral 4 represents a stacker provided at the upper portion of the printer for accommodating discharged paper, and 5 an operation panel.

The printing mechanism is composed of a processing system and a paper feeding system. The processing system is composed of a photosensitive drum 10a, a pre-electrifier 10b for uniformly electrifying the photosensitive drum 10a, an optical exposure unit 10c for projecting an optical image onto the photosensitive drum 10a so as to form an electrostatic latent image, a developer portion 10d for developing the electrostatic latent image with a toner so as to form a toner image, a transfer and separation portion 10e for transferring the toner image onto the fed paper and separating the paper from the photosensitive drum 10a, and a static eliminator and cleaner portion 10f for eliminating the charges on the photosensitive drum 10a and removing the toner remaining on the photosensitive drum 10a with a cleaner. The developer 10d is provided with a cartridge 10d-1 for supplying a toner, and a developer 10d-2 which electrifies the toner and developing the electrostatic latent image with the toner by rubbing the toner over the photosensitive drum 10a with a developing roller (not shown). The transfer and separation portion 10e is provided with a transfer electrifier and a separation electrifier. The transfer electrifier produces corona discharge from the back side of the paper so as to electrify the paper to the opposite polarity to that of the toner image and transfer the toner image onto the paper.

The paper feeding system is composed of a pick roller 11a for picking the cut paper from the hopper 1a, 1b or 1c, a stand-by roller 11b, a feed roller 11c for feeding the picked paper to the stand-by roller 11b, a heat fixing roller 11d, a conveyor passage 11e for feeding the paper to the stand-by roller for the purpose of printing on the reverse side of the paper, a runner 11f for directing the rear end of the paper supplied from the heat fixing roller toward the conveyor passage 11e, a switchback roller 11g for conveying the paper supplied from the heat fixing roller 11d first in the direction of discharge and then conveying it to the conveyor passage 11e, a guide roller 11h for guiding paper in the direction of discharge, a discharge roller 11i, and a stacker 11j for accommodating the discharged paper. The reference numeral 11m represents a conveyor passage for introducing the printing paper supplied from a later-described large-capacity hopper to the processing system in the direction indicated by the arrow A'.

Operation of the printing mechanism.

The pick roller 11a picks the printing paper supplied from the paper hopper 1a, 1b or 1c, and the feed roller 11c feeds the paper to the stand-by roller 11b. The stand-by roller 11b conveys the printing paper to the transfer electrifier at a predetermined timing so that the toner image and the printing paper are simultaneously received by the transfer electrifier.

In parallel to the paper feeding operation, the photosensitive drum 10a is electrified by the pre-electrifier 10b, and the optical exposure unit 10c projects an optical image onto the photosensitive drum 10a so as to form an electrostatic latent image. The developer portion 10d then develops the electrostatic latent image with a toner so as to form a toner image.

The printing paper is conveyed to the transfer and separation portion 10e in synchronism with the formation of the toner image under the control of the stand-by roller 11b. The toner image is transferred to the printing paper, and the paper is then separated from the photosensitive drum 10a and fed to the heat fixing roller 11d so as to fix the toner image on the paper. The paper is then conveyed toward the switchback roller 11g, which conveys the paper toward the stacker 11j.

In the case of single-side printing, the paper is fed to the guide roller 11h and the discharge roller 11i so as to be discharged into the stacker 11j. In the case of double-sided printing, when the rear end of the printed paper reaches the runner 11f, the switchback roller stops the conveying operation. When the paper is stopped, the runner 11f, which rotates counterclockwise, directs the rear end of the paper toward the conveyor passage 11e. The conveyer roller of the conveyor passage 11e feeds the paper to the stand-by roller 11b and turns over it. Thereafter, in the same way with the top side printing, a toner image is transferred onto the back side of the paper fed from the stand-by roller 11b by the transfer and separation portion 10e, and fixed with the heat fixing roller 11d. The printed paper is then conveyed toward the switchback roller 11g, which conveys the paper toward the stacker 11j. The discharge roller 11i discharges the paper into the stacker 11j.

According to this printing mechanism, the paper hoppers 1a to 1c are mounted on the printer apparatus from the front side thereof, and printed paper is discharged into the stacker 11j at the upper portion. Therefore, no space for paper hopper and stacker is necessary on both sides of the printer apparatus which results in small-sized printer apparatus. In addition, since the discharge passage is utilized for switchback, both-sided printing is also possible by the small-sized printer apparatus.

It is also possible to attach a large-capacity hopper for holding about 2000 sheets at most into the network printer apparatus shown in FIG. 6. The network printer apparatus provided with large-capacity hopper is shown in FIGS. 8 and 9.

Figure 8:
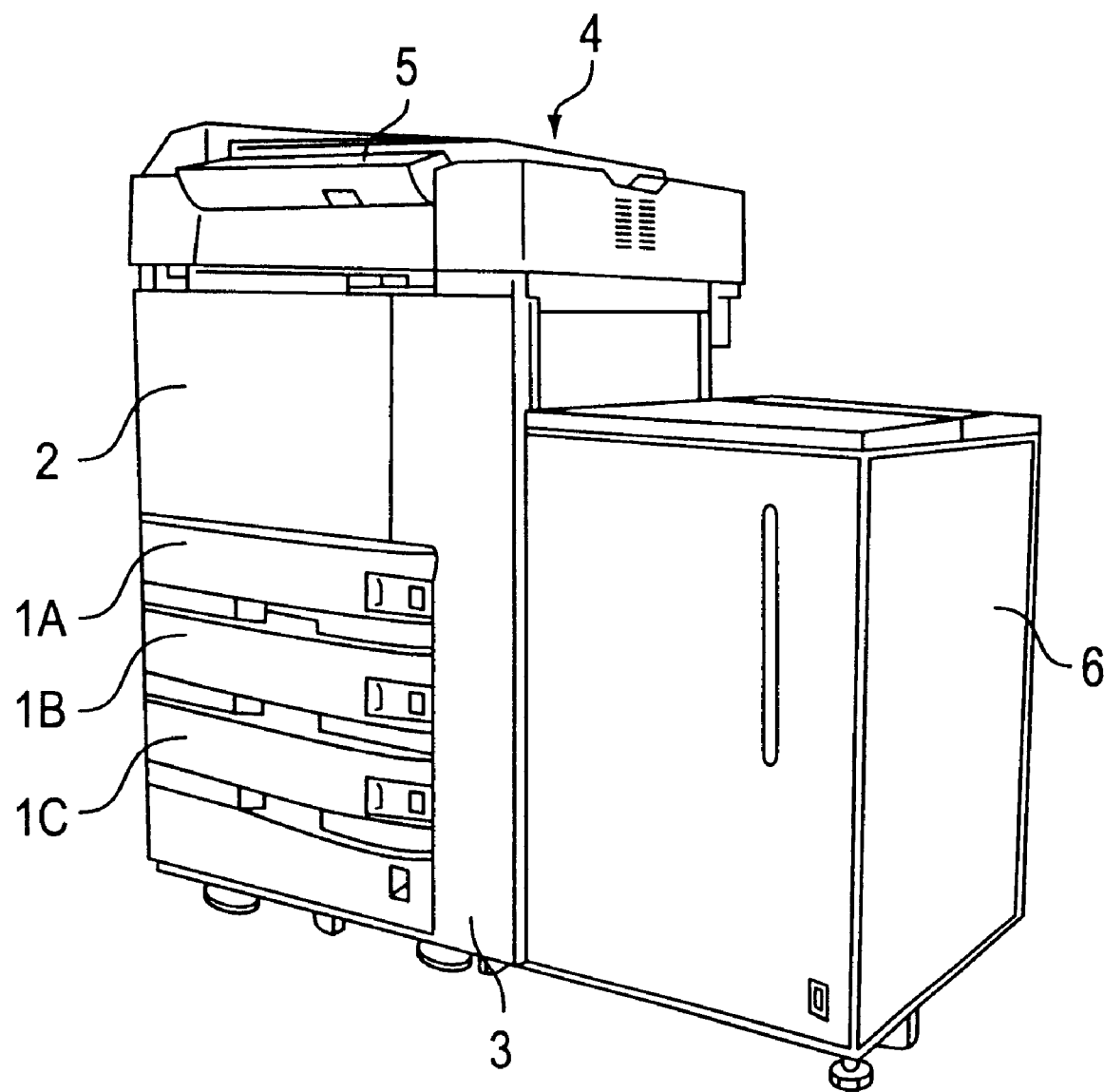
FIG. 8 is a perspective view of a network printer apparatus which is provided with a large-capacity hopper.

FIG. 8 is a perspective view of the network printer apparatus provided with a large-capacity hopper. In FIG. 8, the reference numerals 1a to 1c represent three hoppers for accommodating paper (cut paper), 2 and 3 a left door and a right door, respectively, 4 a stacker provided at the upper portion of the printer for accommodating discharged paper, 5 an operation panel and 6 a large-capacity hopper.

Figure 9:
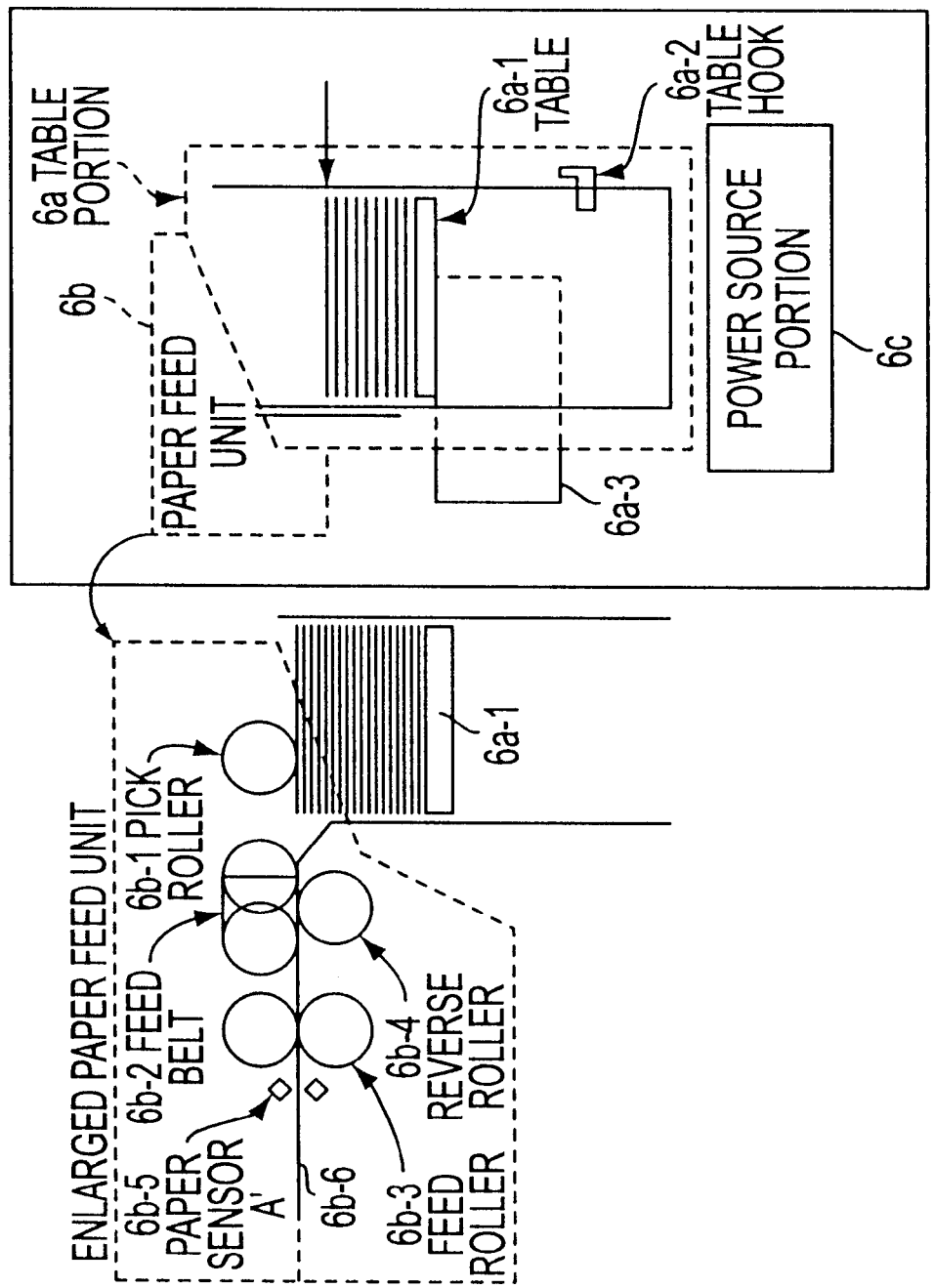
FIG. 9 schematically shows the structure of an interior of the large-capacity hopper shown in FIG. 8.

FIG. 9 is a schematic view showing the interior of the large-capacity hopper of FIG. 8. The reference numeral 6a denotes a table portion for accommodating paper, 6b a paper feed unit for feeding sheets of paper one by one and 6c a power source portion. In the table portion 6a, 6a-1 represents a table on which paper is stacked, 6a-2 a table hook for positioning the lower portion of the table 6a-1, and 6a-3 a controller for vertically moving the table 6a-1 so as to enable sheets of paper to be picked one by one by a pick roller (which will be described later). In the paper feed unit 6b, the reference numeral 6b-1 represents a pick roller for picking and feeding the sheets of paper one by one from the table portion 6a, 6b-2 a feed belt, 6b-3 a feed roller, 6b-4 a reverse roller and 6b-5 paper sensor for detecting passage of the sheet of paper, 6b-6, a conveyor passage which is connected to the conveyor passage 11m of the printer body shown in FIG. 7 along the broken line A'.

Structure of the network printer apparatus of the first embodiment.

Figure 10:
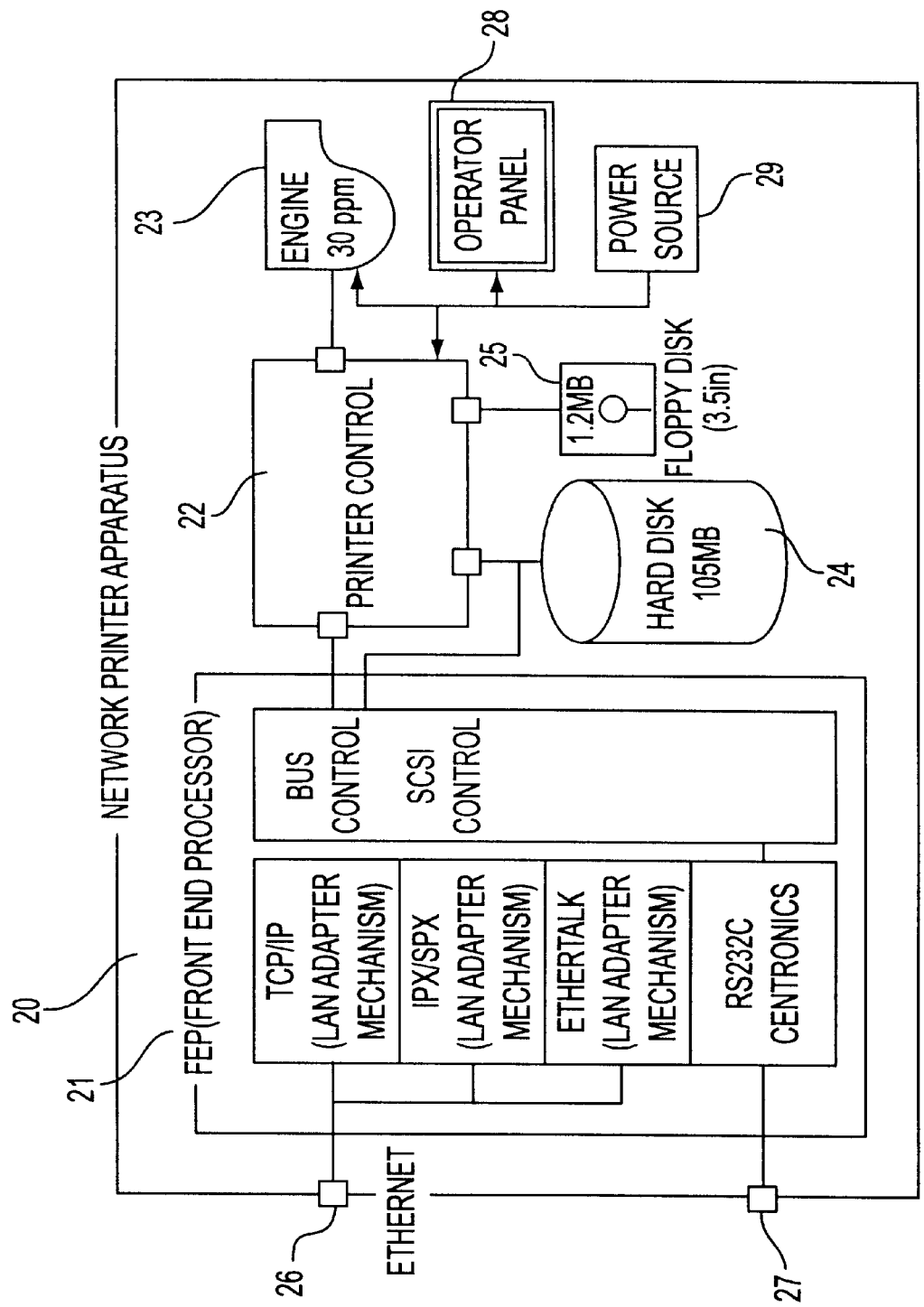
FIG. 10 a block diagram schematically showing the network printer apparatus of the present invention.
Figure 24:
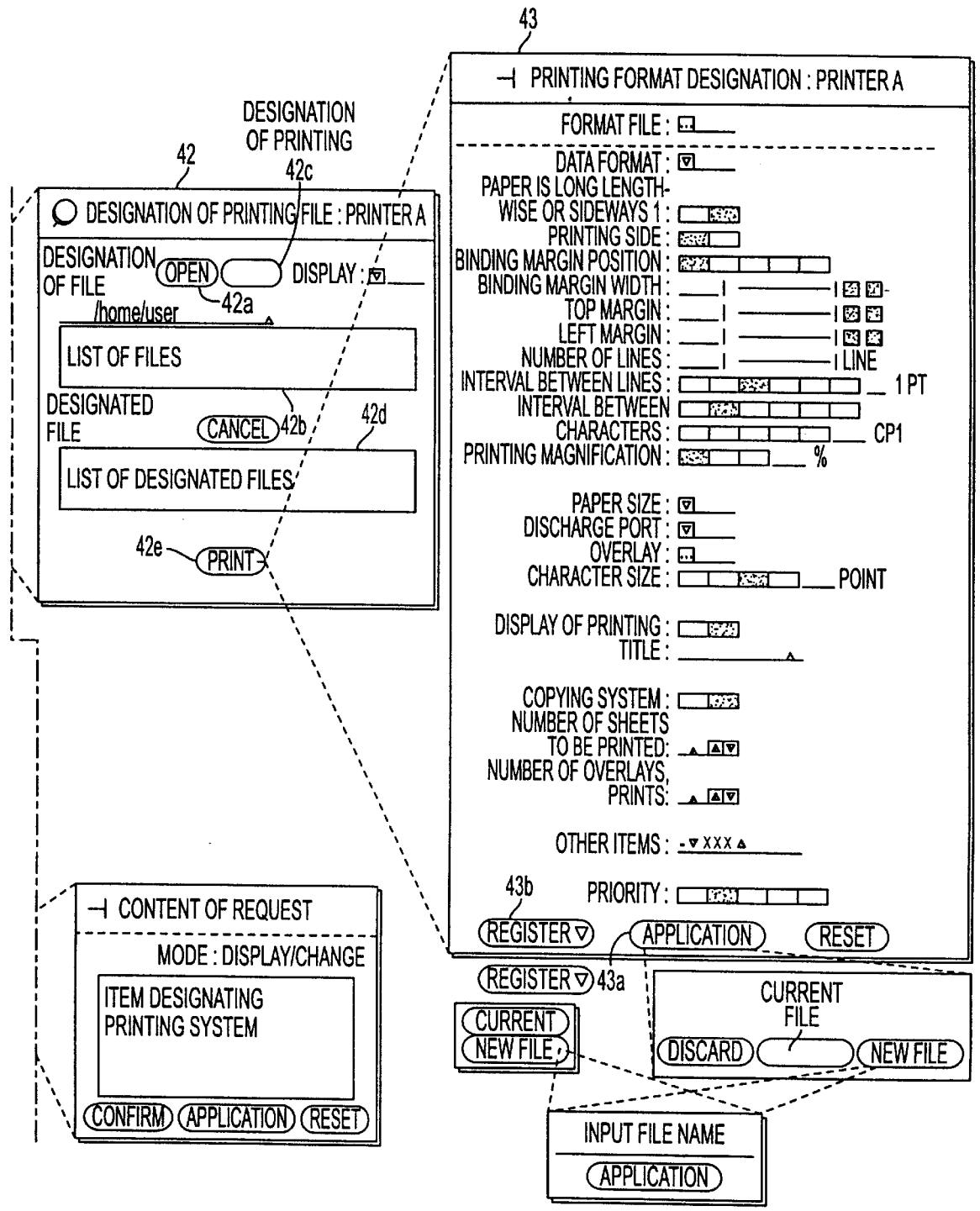

FIG. 10 is a block diagram of the network printer apparatus of the present invention. In FIG. 10, the reference numeral 20 represents a network printer apparatus, 21 a LAN adapter (Front End Processor: FEP) having a function of communicating with the LAN network system through connector 26 (as explained in connection with FIG. 1). 22 is the printer controller, 23 is an engine corresponding to the printing mechanism 23 of FIG. 1, and 24 is a hard disk for storing (1) form overlay, (2) font, (3) printing data, (4) apparatus definition information, (5) account log information, (6) error log information, etc. The reference numeral 25 denotes a floppy disk for downloading a form overlay, a font and a program to the network printer apparatus. 26 is the connector for connecting the network printer apparatus 20 to a LAN (Ethernet), 27 is a connector for RS232C or Centronics, 28 is an operator panel for displaying information supplied from the network printer apparatus, inputting designation information to the network printer apparatus and displaying the state of the network printer apparatus and 29 is a power source for supplying power to the printer controller 22, printing mechanism or engine 23, panel 28, etc.

Figure 11:
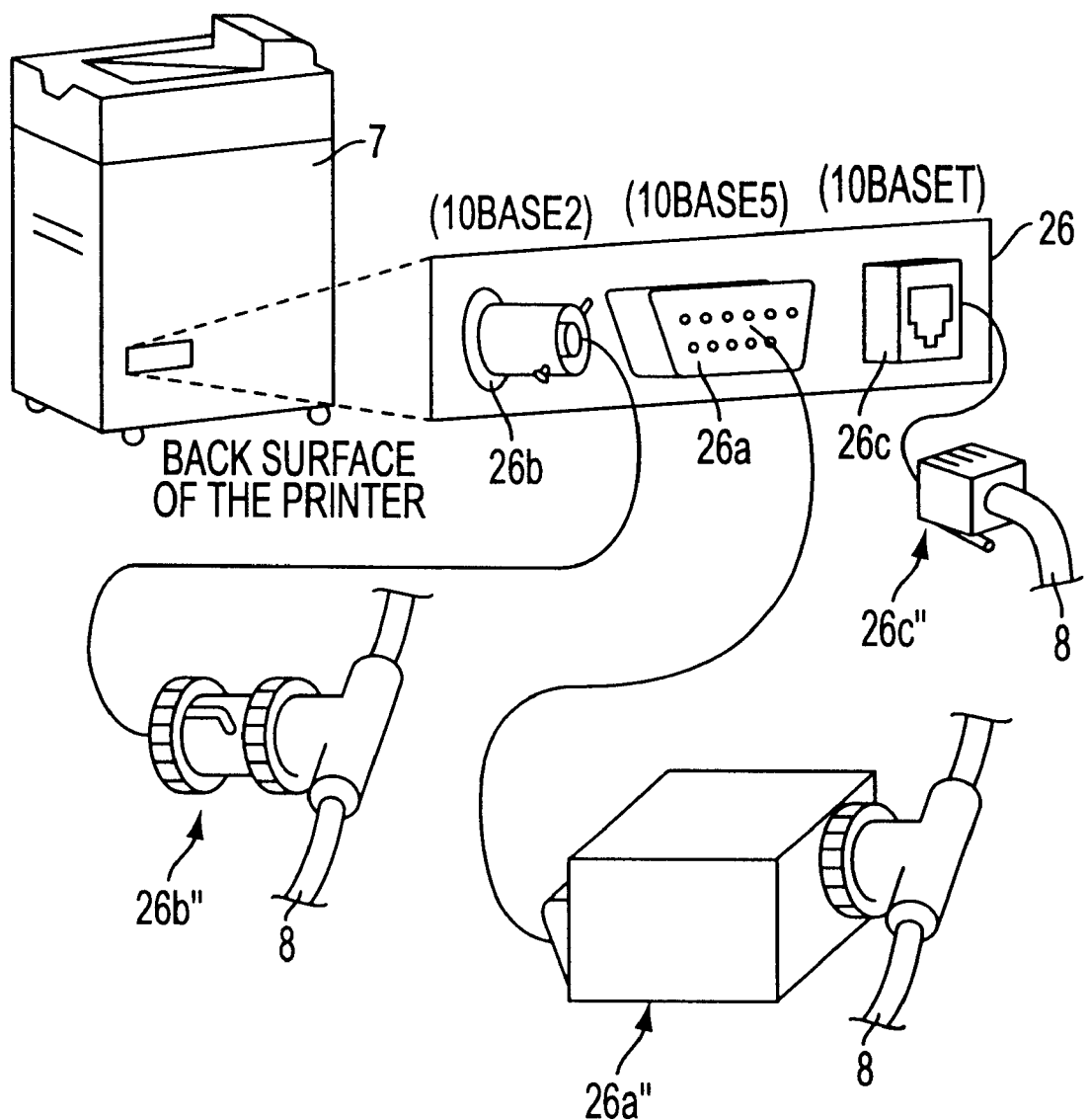
FIG. 11 shows the LAN connectors.

The FEP 21 (LAN adapter) has the function of controlling the driver such as Ethernet and Token Ring. The FEP 21 is provided with LAN connector 26 which can correspond to 10Base5, 10Base2 and 10BaseT of Ethernet. FIG. 11 shows the LAN connector in detail. The reference numeral 7 denotes a back cover of the printer apparatus 20, and connectors 26a, 26b and 26c are provided at the lower portion of the back cover 7. The reference numerals 26a", 26b" and 26c" represent physical medium attachments which are connected to the connectors 26a, 26b and 26c, respectively, and 8 a LAN cable. A predetermined attachment based on the type of Ethernet is connected to the corresponding connector. As will be described later, a transceiver is accommodated in the attachment 8a of 10Base5.

The FEP 21 has an interface connected to RS232 or Centronics, and also has a function (multiprotocol controlling function) of controlling a plurality of communication protocols. The FEP 21 can receive a request in accordance with TCP/IP, IPX/SPX, Ethertalk, RS232C, Centronics, etc.

The FEP 21 has also a function of receiving printing data through the LAN and performing Spool (Simultaneous Peripheral Operating On-Line) through a bus or a SCSI, and a function of controlling the conversation during the communication between a client 52 and the printer apparatus 20 (function of inquiry and response to inquiry). The function of performing SPOOL is equivalent to the function of connecting a request for printing data (printing job) to the queue and storing the printing data in the hard disk 24 when the request is supplied from a client. Hereinafter, the terms "spooling" or "spool" may be used to define performing SPOOL.

The main functions of the printer controller 22 is reading the printing data of the highest priority from the hard disk 24 by reference to the queue, interpreting the language (e.g., Postscript, PCL (Printer Control Language), etc.) written in the printing data on the basis of a predetermined emulation program, converting the printing data into a dot image for each page (formation of image data), and controlling the engine or printing mechanism.

The engine 23a transfers the drawable (printable) image data supplied from the printer controller 22 onto paper, thereby completing the printing operation.

Figure 12:
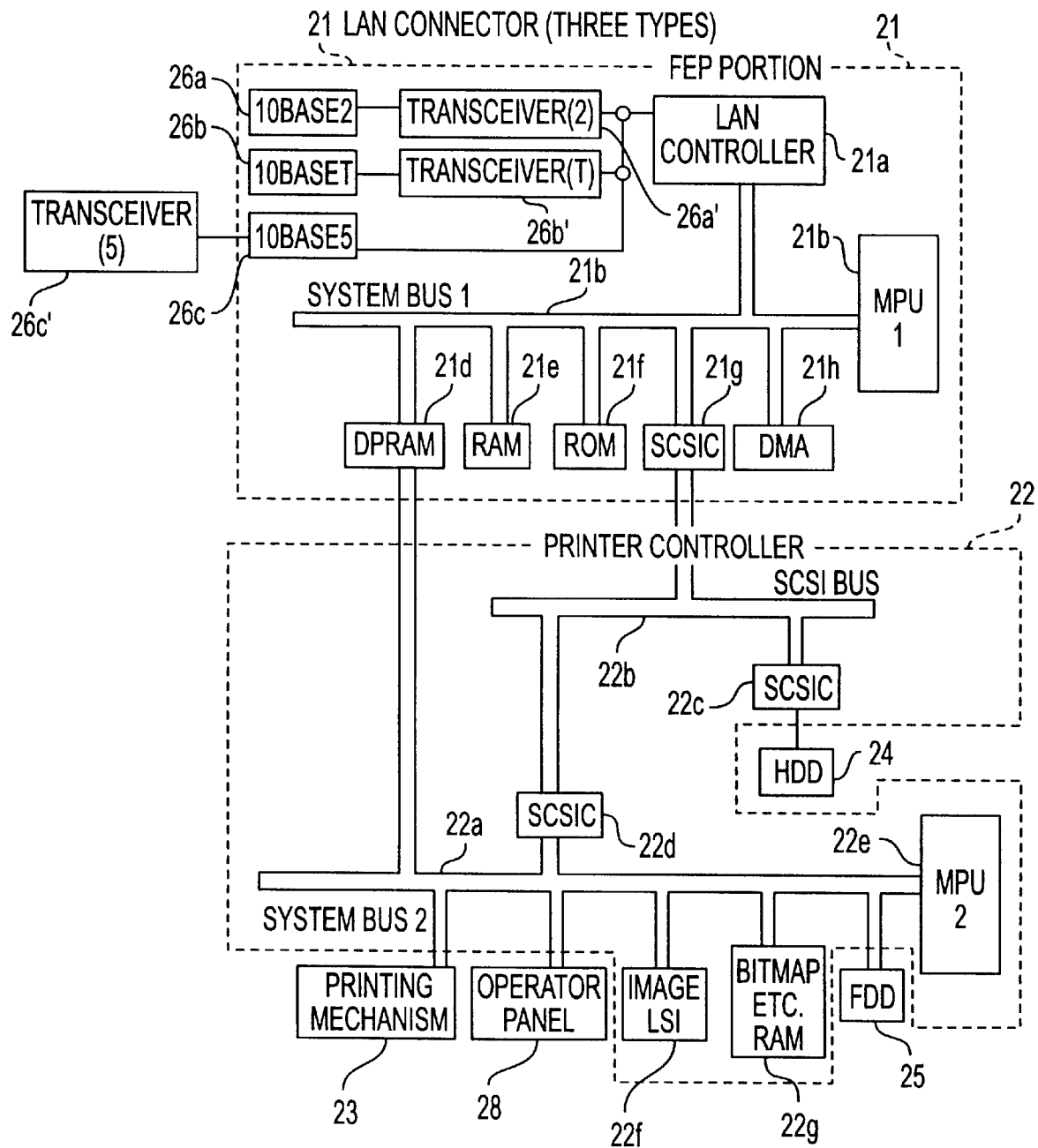
FIG. 12 shows a detailed block diagram of the network printer apparatus shown in FIG. 10.

FIG. 12 is a block diagram showing the detailed structure of the printer controller 22 and the LAN adapter of the network printer apparatus 20. The same numerals are provided for the elements which are the same as those shown in FIG. 10. The portions (e.g., RS232C) which have no relation to the LAN network system are omitted.

In the FEP (LAN adapter) 21, the reference numerals 26a to 26c denote the connectors corresponding to 10Base2, 10BaseT and 10Base5, respectively, and 26a and 26b' transceivers for 10Base2 and 10BaseT, respectively. The transceivers 26a', 26b' detect the collision in CSMA/CD (Carrier Sense Multiple Access with Collison Detection) and control the transmission and reception in CSMA/CD. A transceiver 26c' for 10Base5 is provided between the LAN and the connector 26c. The reference numeral 21a represents a LAN controller which is capable of controlling a plurality of communication protocols such as TCP/IP, IPX/SPX and Ethertalk. The reference numeral 21b denotes a system bus, 21c a microcomputer (MPU1), 21d a dual port RAM (DPRAM) for communication between the printer controller 22 and the bus, 21e a RAM for storing the job table, etc., 21f a ROM, 21g a SCSI interface portion and 21h a DMA (Direct Memory Access) controller.

In the printer controller 22, the reference numeral 22a represents a system bus, 22b a SCSI bus, 22c and 22d SCSI interface portions, 22e a microcomputer (MPU2), 22f an image LSI, and 22g a RAM for storing image data such as a bit map. The reference numeral 23 represents an engine (printing mechanism), 24 a hard disk 24, 25 a floppy disk 25 and 28 an operator panel.

Figure 13:
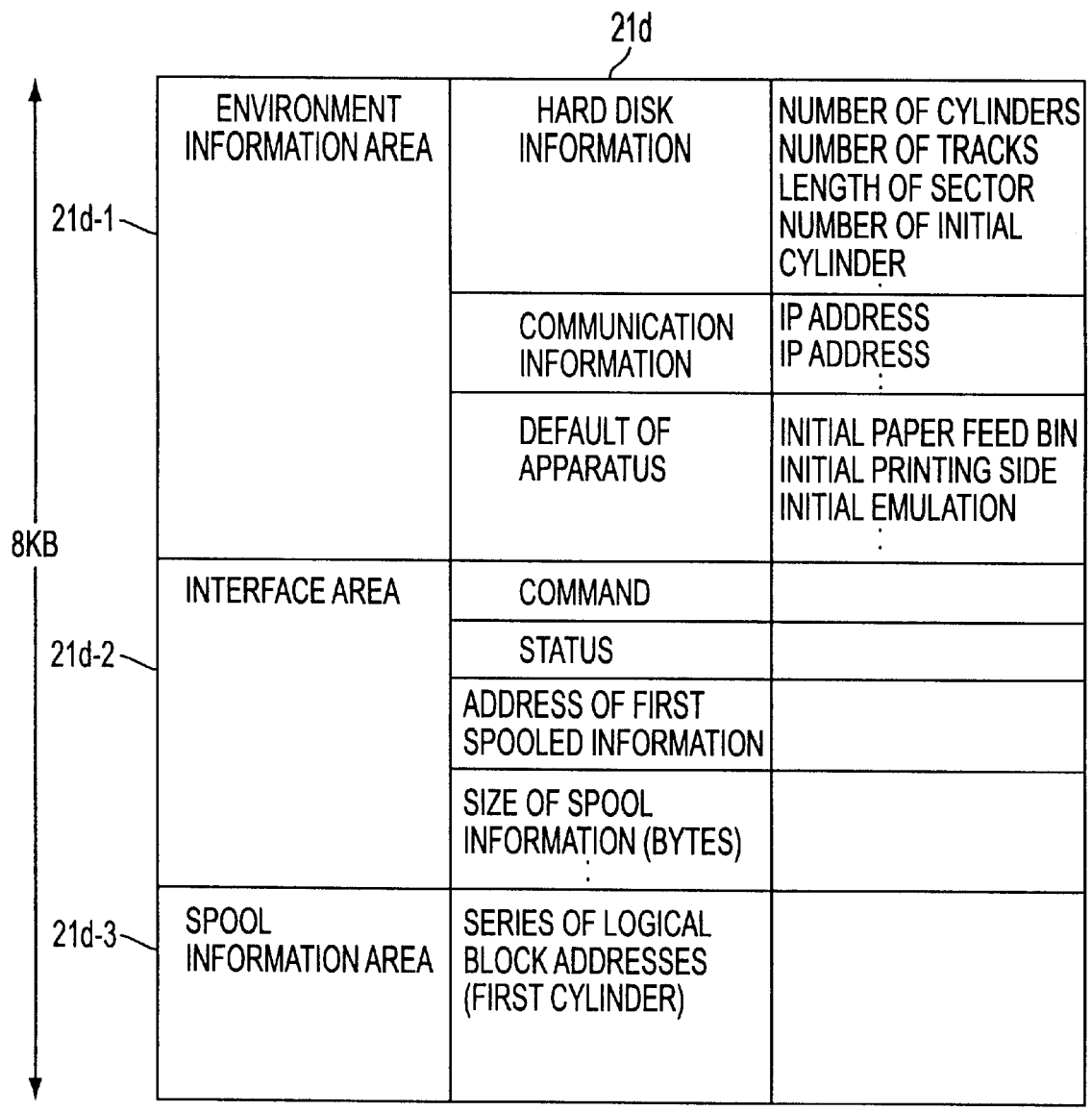
FIG. 13 is a block diagram showing the structure of the memory of the DPRAM.

FIG. 13 shows the structure of the memory of the DPRAM 21d. The reference numeral 21d-1 denotes an environment information area, 21d-2 an interface area, 21d-3 a spool information area. (1) Hard disk information (number of cylinders, number of tracks, length of a sector, number of the starting cylinder, etc.), and (2) a default value (initial feeding bin (in the case of having a mailbox controlling function), the initial printing side, the initial emulation, the paper size, etc.) are read out from hard disk 24 and set in the environment information area 21d-1. In addition, (3) the IP (Internal Protocol) addresses of the clients from which requests for printing are supplied, are stored in series as communication information in the environment information area 21d-1. The IP addresses are referred to at the time of determining to which client the notice of printing end is sent.

The interface area 21d-2 stores (1) commands from the FEP 21 to the printer controller 22, (2) the status (normal printing end, printing end due to error, etc.) of the printer controller 22 in response to a command, (3) the leading address of the spool information (printing data) stored in the hard disk 24, and (4) the size (byte) of the spool information, etc. The spool information area 21d-3 stores a series (directory) of logical block addresses at which spool information is stored.

FIG. 14 shows examples of commands transmitted and received between the FEP 21 and the printer controller 22. Commands from the FEP 21 to the printer controller 22 are shown in the left column, and commands from the printer controller 22 to the FEP 21 are shown in the right column. Examples of a command from the FEP 21 are a request for printing, elimination of a printing data or hold of a printing job or operation job, movement of a data or job, stop of the printing operation, resumption of the printing operation, shutdown (emergency stop of printing operation) and notice of error. Examples of a command from the printer controller 22 are "apparatus ready", "job end", "off line", "error off line", "on line", "test command", "keep power-off state" and "error".

Figure 15:
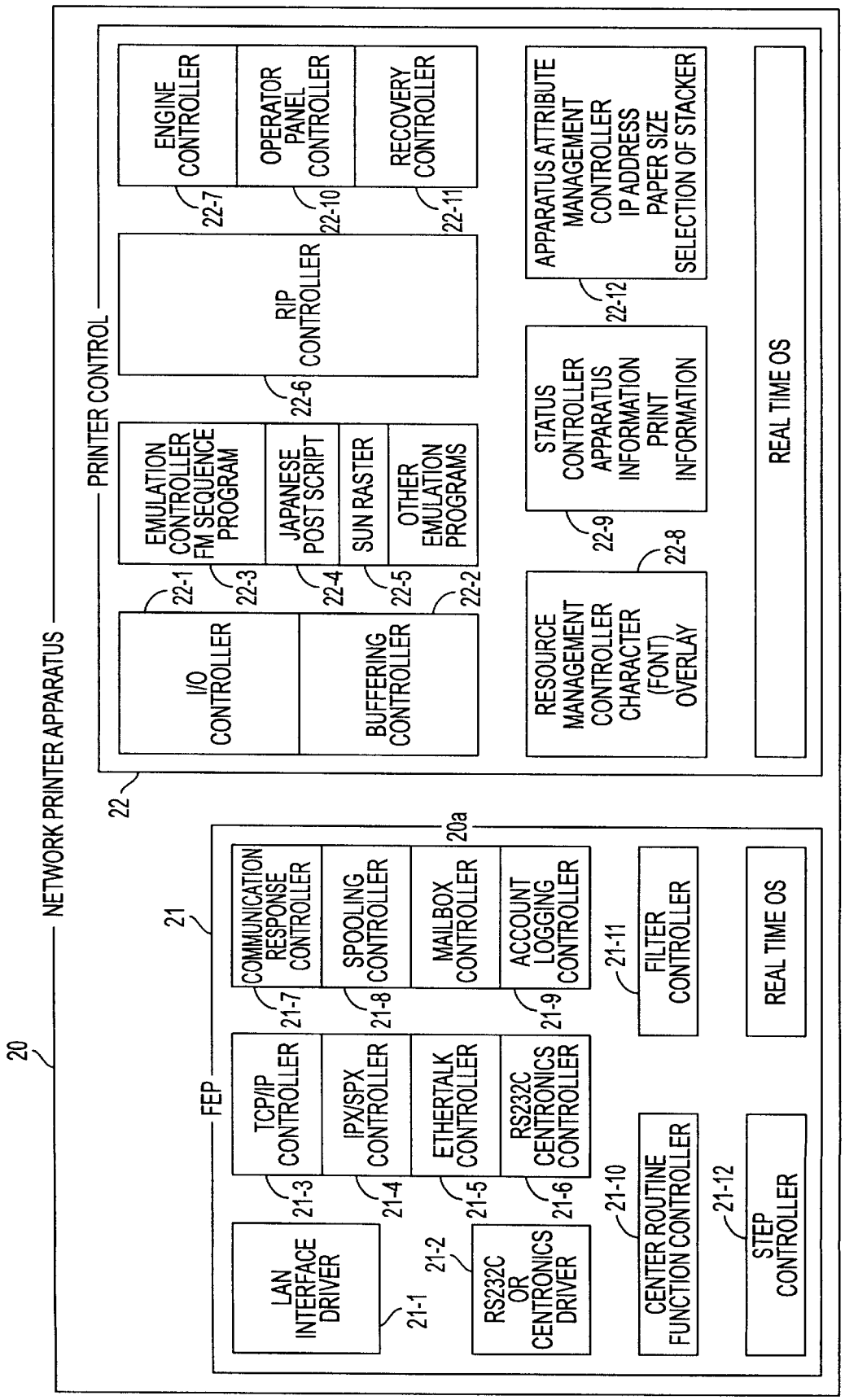
FIG. 15 is a block diagram of the LAN adapter with a printer control part and a software portion, of the network printer apparatus shown in FIG. 10.

FIG. 15 shows the LAN adapter (FEP) 21 and the printer controller which include pre-programmed elements (software) in further detail.

The FEP 21 includes the following pre-programmed elements with a software routine:

(1) a LAN interface driver (e.g., Ethernet driver) 211;
(2) a driver 21-2 for controlling the interface connected to RS232C or Centronics so as to connect the network printer apparatus 20 and an external equipment;
(3) multiprotocol controllers (TCP/IP controller, IPX/SPX controller, Ethernet talk controller and RS232C/Centronics controller, etc.) 21-3 to 21-6;
(4) a communication response controller 21-7 for processing communication to and from a network;
(5) a spooling controller 21-8 for controlling spooling;
(6) an account log controller 21-9;
(7) a center routine function controller 21-10;
(8) a filter controller 21-11 and
(9) a step controller 21-12 for controlling processing steps. In a second embodiment of the network printer apparatus which will be described later, the FEP 21 further has a mailbox controller 20a.

The LAN interface driver (e.g., Ethernet driver) 21-1 represents software contained in the transceivers 26a' to 26c' (FIG. 12), and the multiprotocol controllers (21-3 to 21-6) are softwares mounted on the LAN controller 21a.

Figure 16:
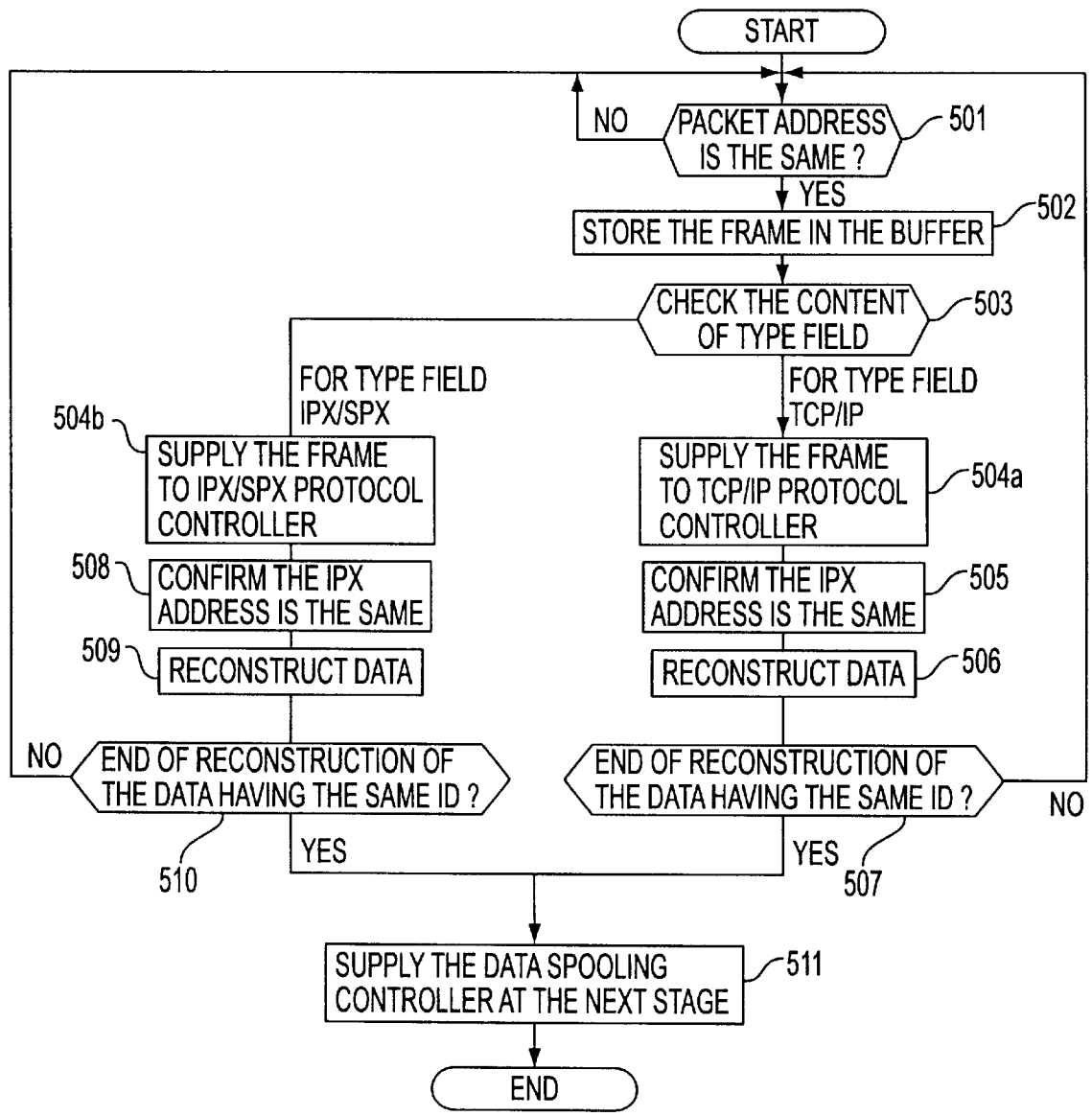
FIG. 16 is a flowchart of the processing by the multiprotocol controllers.

FIG. 16 is a flowchart showing the steps of the processing by the multiprotocol controllers (21-3 to 21-6) of FIG. 15. Although two protocol controllers are described in connection with FIG. 16, a similar processing is executed by three or more protocol controllers.

The LAN interface driver (Ethernet driver) 21-1 receives a packet (frame) from the LAN and supplies it to the multiprotocol controllers. The multiprotocol controllers judge whether or not the destination address in the packet agrees with the address of the multiprotocol controllers (Step 501).

If the answer is YES at the step 501, the packet (frame) is stored in the buffer, while if the answer is NO, the packet is discarded (Step 502). The content of the type field TYP is then checked so as to identify the communication protocol (Step 503) and the packet stored in the buffer is supplied to the protocol controller (TCP/IP protocol controller, IPX-SPX protocol controller) which corresponds to the identified communication protocol (Step 504a, or 504b).

If the identified protocol is TCP/IP, the TCP/IP protocol controller is started and confirms that the IP address contained in the frame is the address of the TCP/IP protocol controller (Step 505). In order to reconstruct the data which is composed of a plurality of frames, the data having the same ID are linked in the buffer. This process is repeated until the linkage of the data having the same ID is finished (Steps 506, 507). When the reconstruction of the data having the same ID is finished, the data (e.g., printing data) is transferred to the spooling controller 218, which is disposed at the next stage (Step 511).

On the other hand, if the identified protocol is IPX/SPX, the IPX/SPX protocol controller is started and confirms that the IPX address contained in the frame is the address of the IPX/SPX protocol controller (Step 508). In order to reconstruct the data which is composed of a plurality of frames, the data having the same ID are linked in the buffer. This process is repeated until the linkage of the data having the same ID is finished (Steps 509, 510). When the reconstruction of the data having the same ID is finished, the data (e.g., printing data) is transferred to the spooling controller 21-8, which is disposed at the next stage (Step 511).

Spooling control

The communication response controller 21-7 relays communication, collects communication information and executes other controls in order to realize the original communication passing function between a client and the printer apparatus 20. The spooling controller 21-8 has a file controlling function, and performs Spool for storing the printing data with a job number attached thereto in the hard disk 24 and simultaneously registering the printing job in the queue so as to prepare the environment for supplying the job to the printer controller 22.

Figure 17:
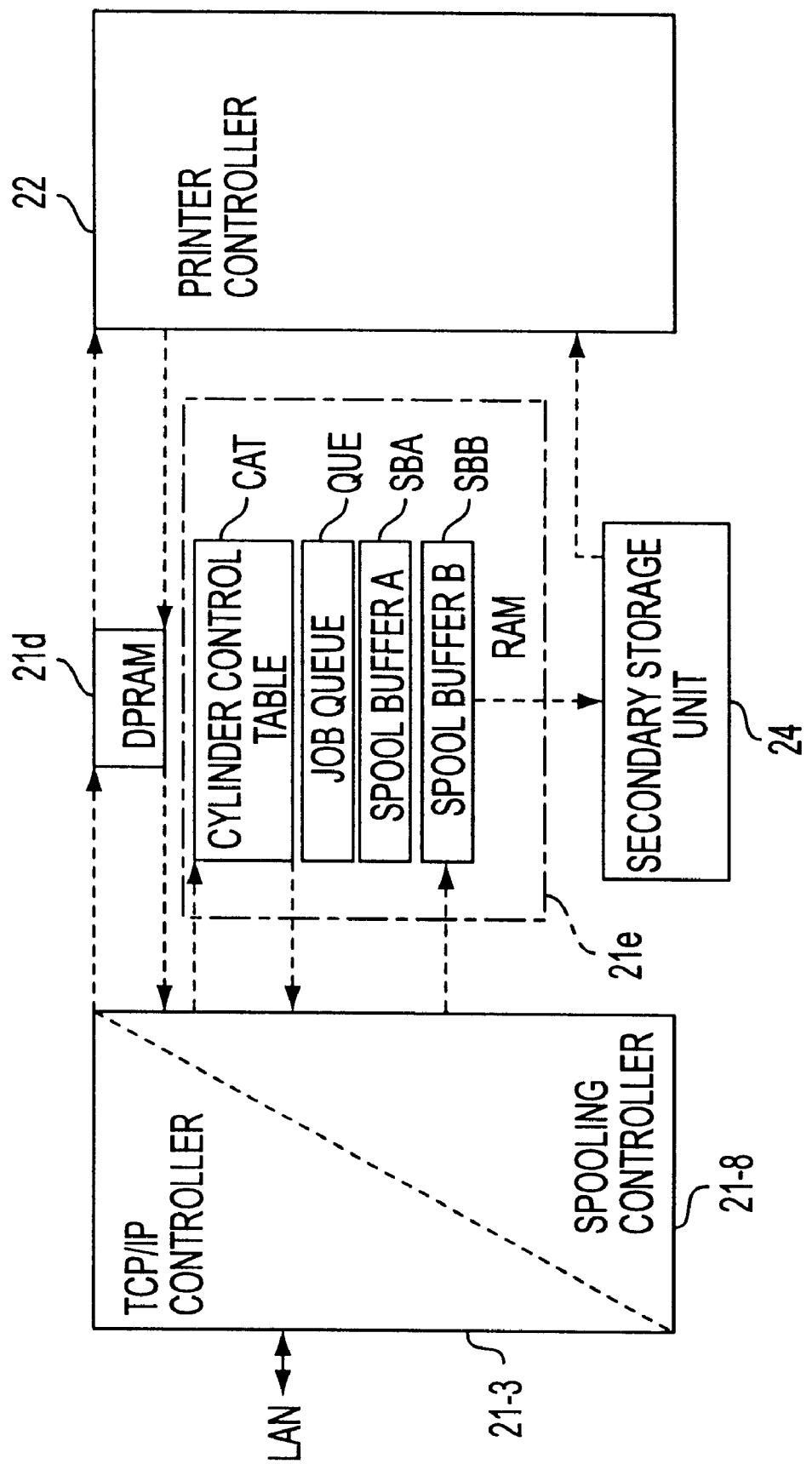
FIG. 17 is an explanatory view of the spooling operation.
Figure 18:
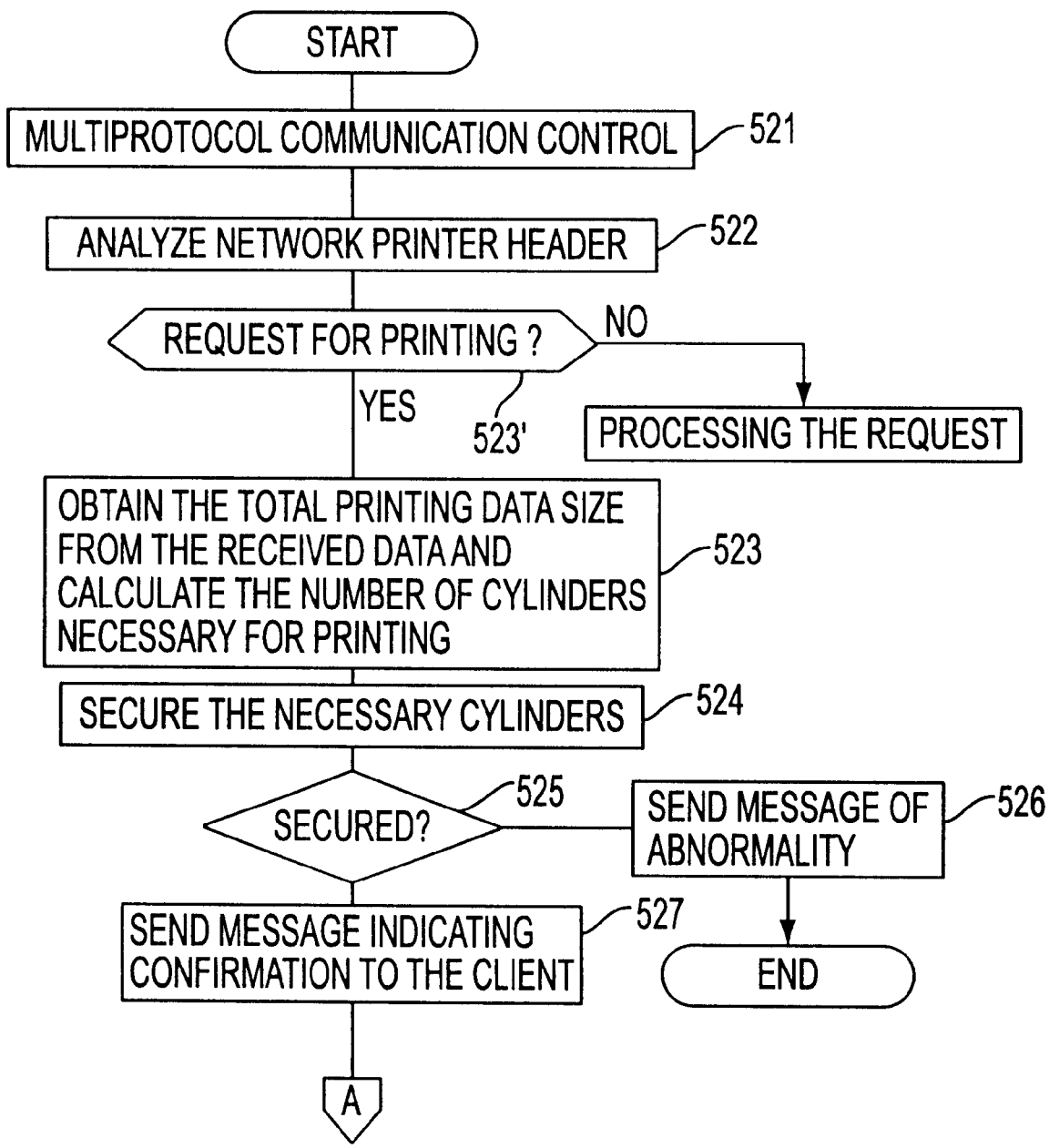
FIGS. 18 and 19 commonly show a flowchart of the spooling operation by the spooling controller.
Figure 19:
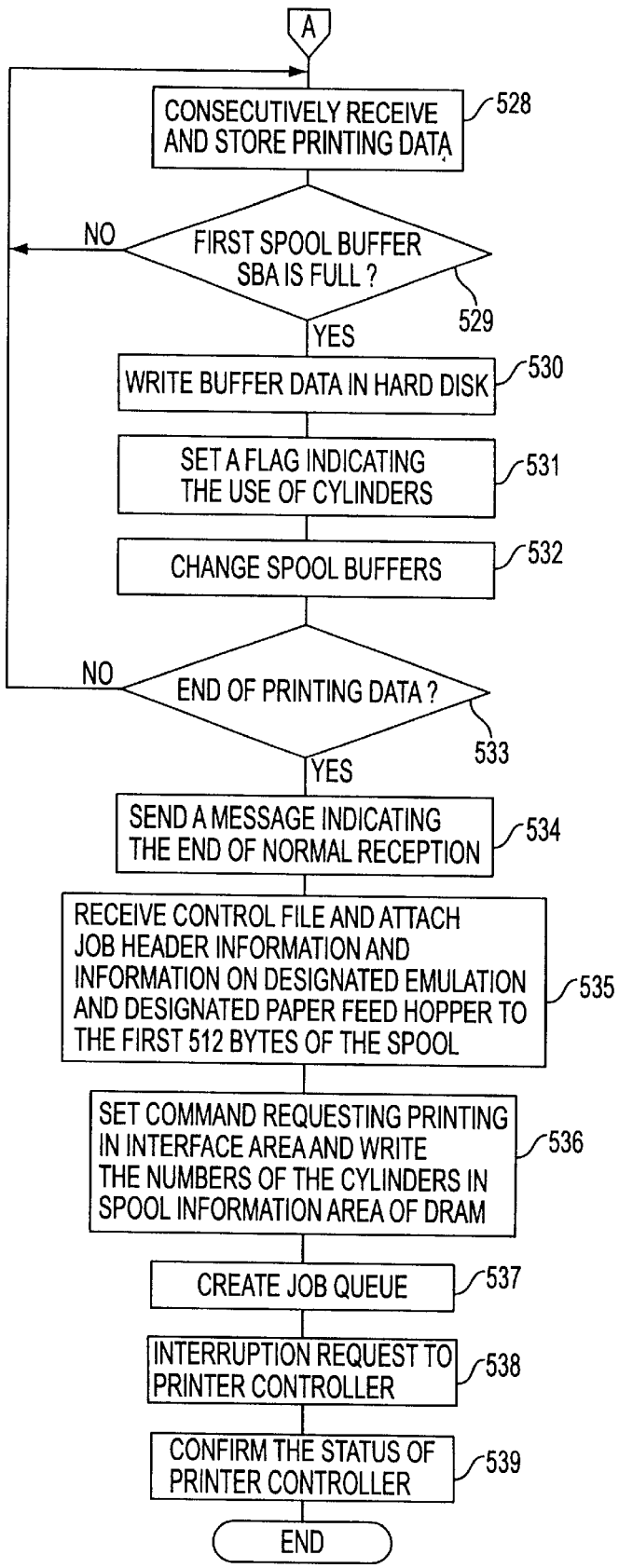

FIG. 17 shows a spooling controller 21-8 and its connections to the printer controller 22 of the network printer apparatus 20. FIGS. 18 and 19 are flowcharts of the spooling operation by the spooling controller 21-8. In FIG. 17, the reference numeral 21-3 represents a TCP/IP controller, 21-8 is a spooling controller, 21d is a dual port RAM (DPRAM) and 21e is a RAM which has two spool buffers SBA, SBB, and a region for storing a cylinder control table CAT and a job queue QUE. The reference numeral 22 represents the printer controller and 24 is the hard disk (secondary storage unit).

The printing job is registered in the following way.

The multiprotocol controllers execute a multiprotocol control on the basis of the frame (FIG. 16) received from the LAN network system and identify the communication protocol. When the communication protocol is TCP/IP, the printing data is received in accordance with TCP/IP protocol, and supplies it to the spooling controller 21-8, which is disposed at the next stage (Step 521). The spooling controller 21-8 analyzes the command of the network printer header contained in the received data (Step 522), and when the command is a request for printing, the spooling controller 21-8 obtains the total printing data size from the received data and calculates the number of cylinders necessary for printing (Step 523). Thereafter the cylinders onto which the printing data is written are secured by reference to the cylinder control table CAT (Step 524). If it is impossible to secure the cylinders, a message of abnormality is sent to the client which has requested printing, and the process is finished (Steps 525, 526).

If the cylinders are secured, a message of confirmation is sent to the client which has requested printing (Step 527). Thereafter, the printing data is consecutively received and stored in a first spool buffer SBA until the buffer becomes full (Steps 528, 529). When the first spool buffer SBA is full, the printing data is written in hard disk 24 through the SCSI interfaces 21g, 22c (see FIG. 12) and a flag indicating the use of a cylinder for data writing is set in the cylinder control table CAT (Step 531). At the same time, the second spool buffer SBB starts to store the printing data instead of the first spool buffer SBA. In this manner, storage of the printing data in the second spool buffer SBB and the writing of the printing data from the first spool buffer SBA in hard disk 24 are executed in parallel (Step 532). The processing at the step 528 and thereafter is repeated until the whole printing data is received (Step 533).

When the whole printing data is received and stored in the hard disk 24, the spooling controller 21-8 sends a message indicating that the normal reception has been finished to the client which has requested printing (Step 534). Then, the spooling controller 21-8 receives the control file from the client (PC or WS) and attaches the printing job header information, the name of the designated emulation, the name of the designated paper feed hopper, the instruction to print on both sides, etc. to the first 512 bytes of the spool information (printing data) stored in the hard disk 24 by reference to the content of the control file (Steps 535, 536).

The spooling controller 21-8 then sets a command for a request for printing, the address of the first spool information, the size (byte) of spool information, etc. in the interface area 21d-2 of the DPRAM 21d, and writes the numbers of the cylinders (a series (directory) of logical block addresses) in the spool information area 21d-3 (Step 536). Thereafter, the printing job is registered (queueing) at the end of the queue QUE (job queue) in correspondence with the priority of the printing job (Step 537). After queueing, an interruption request is supplied to the printer controller 22 (Step 538), and the status of the printer controller 22 is confirmed, thereby ending the spooling control (Step 539).

Every time a new printing job is registered in the printer job queue QUE which is stored in the RAM 21e, the printing job information is supplied to the printer controller 22 through the system bus and stored in the RAM 22g of the printer controller 22. When a predetermined printing operation is finished, and the printer controller 22 eliminates the printing job from the printing job queue QUE which is stored in the RAM 22g, this information is supplied to the FEP 21 through the system bus, so that the job queue QUE stored in the RAM 21e of the FEP 21 is updated. In other words, the FEP 21 and the printer controller 22 constantly have the same job queue. In order to prevent the job queue from being lost due to a power failure, the job queue is also stored in the hard disk 24.

Figure 20:
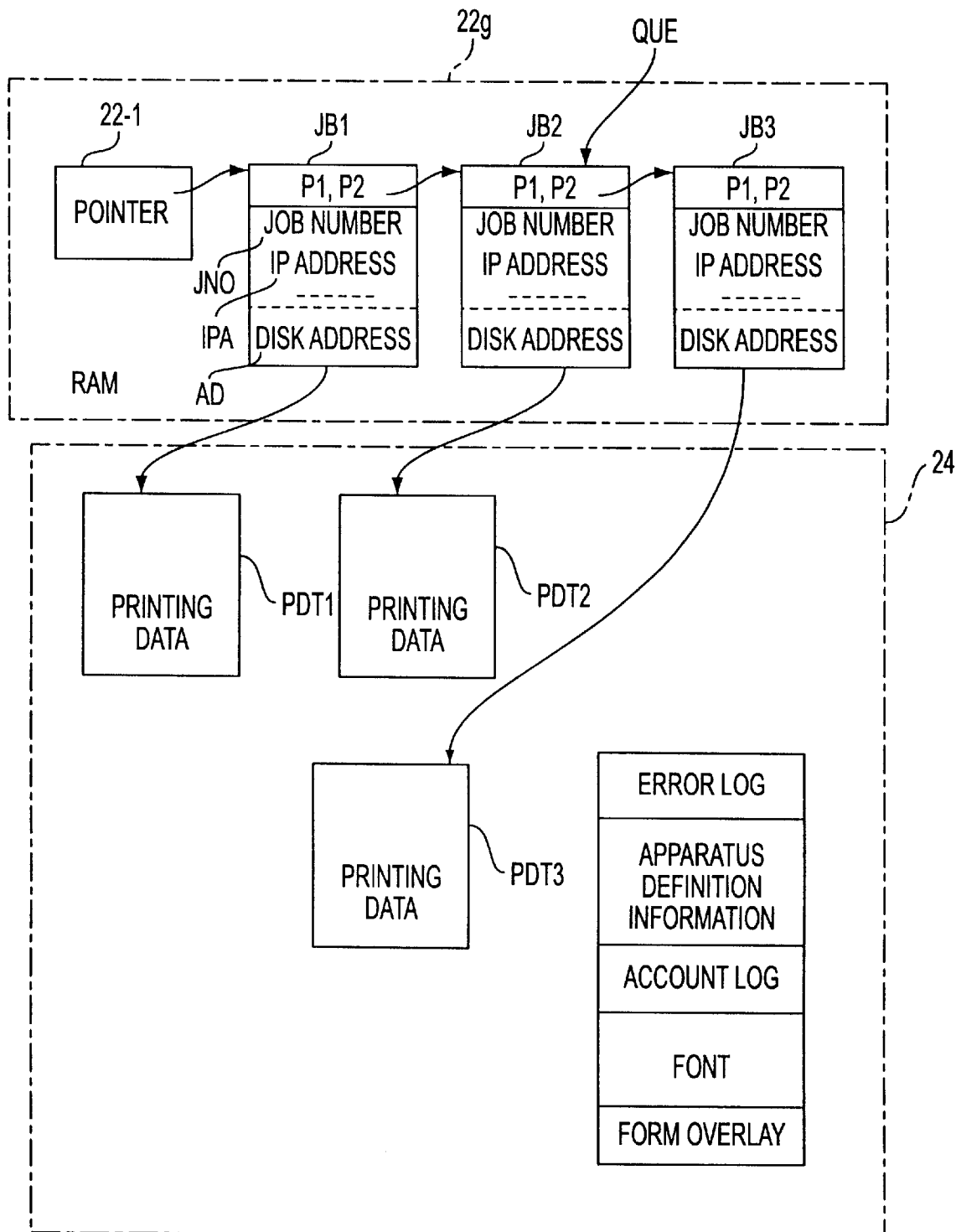
FIG. 20 shows the relationship between the job queue and the hard disk of the network printer apparatus of FIG. 10.

FIG. 20 explains the relationship between the job queue QUE and the hard disk 24.

The hard disk 24 stores the printing data DTi (i=1, 2, ... ) which has been required to be printed, and the RAM 22g stores the job queue QUE. Each job information JBi (i=1, 2, ... ) which constitutes the job queue QUE has a pointer (P1) for indicating the leading address of the next printing job information, a pointer (P2) for indicating the leading address of the preceding job information, a job number (JNO), an IP address (IPA), a storage location (disk address AD) in the hard disk 24 at which the printing data is stored, etc. A pointer 22-1 indicates the leading address of a first printing job JB1, and the pointer of each of the subsequent printing jobs indicates the leading address of the next printing +job information in the order of priority.

Account log control, center routine control and filter control.

The account log controller 21-9 (FIG. 15) has an account information collecting function, a logging function and an account controlling function with respect to the job printed by the network printer.

The center routine function controller 21-10 has a part of the full-scale server function. A user can enlarge the processing function provided as a standard function by customizing a new function. The control functions of the center routine function controller 21-10 are, for example, a reception examination function and a banner page updating function.

The reception examining function is a function of checking the qualification of the request for printing, the operation of the network printer or the like and deciding whether or not the request is to be received. The banner page updating function is a function of adding and editing the information to be printed in the banner page by the user himself. The "banner page" is a page which is inserted between printed pages in accordance with the printing job for the purpose of identifying the printing job. Good use of such a center routine control function facilitates the security of the common use of the network printer and the guarantee of the accounting processing.

The filter controller 21-11 has functions of changing the code of printing data, and checking, changing and adding various items of printing data.

The softwares for center routine control and filter control can be downloaded from the floppy disk 25 to the hard disk 24 and can also be registered from the client to the hard disk 24.

The printer controller 22 (FIG. 15) has the following pre-programmed components having software routine:

(1) an I/O controller 22-1 for taking out one printing job from the printing job queue QUE and reading out spool data (printing data) from the hard disk 24 on the basis of the job information;

(2) a buffering controller 22-2 for buffering spool data and supplying the buffered data to an emulation controller;

(3) the emulation controllers (FM sequence program 22-3, Japanese Post Script 22-4, SUN raster 22-5, etc.) for interpreting printing data ;

(4) a RIP (Raster Image Processor) controller 22-6 for forming dot image data (bit map data) on the basis of printing data;

(5) an engine controller 22-7 for outputting the dot image data to the engine;

(6) a resource management controller 22-8 for reading the font and the overlay from the hard disk 24 which are necessary for printing and supplying them to a PIP processing program;

(7) a status controller 22-9 having a function of collecting the response information to an enquiry about the status of the network printer and the job queue and supplying the information to the communication response controller 21-7 of the FEP 21;

(8) an operator panel controller 22-10 having a function of inputting the control information (IP address, constant relating to printing, etc.) to the network printer and displaying the information from the network printer;

(9) a recovery controller 22-11 having a function of automatically resuming the printing operation after a trouble in the network printer is dealt with; and (9)-i an apparatus attribute management controller 22-12 having a function of managing the standard values (IP address, paper size, selection of stacker, etc) of the printing system when the network printer is used in response to the request from a customer.

Structure of the software containing portion of a client

Figure 21:
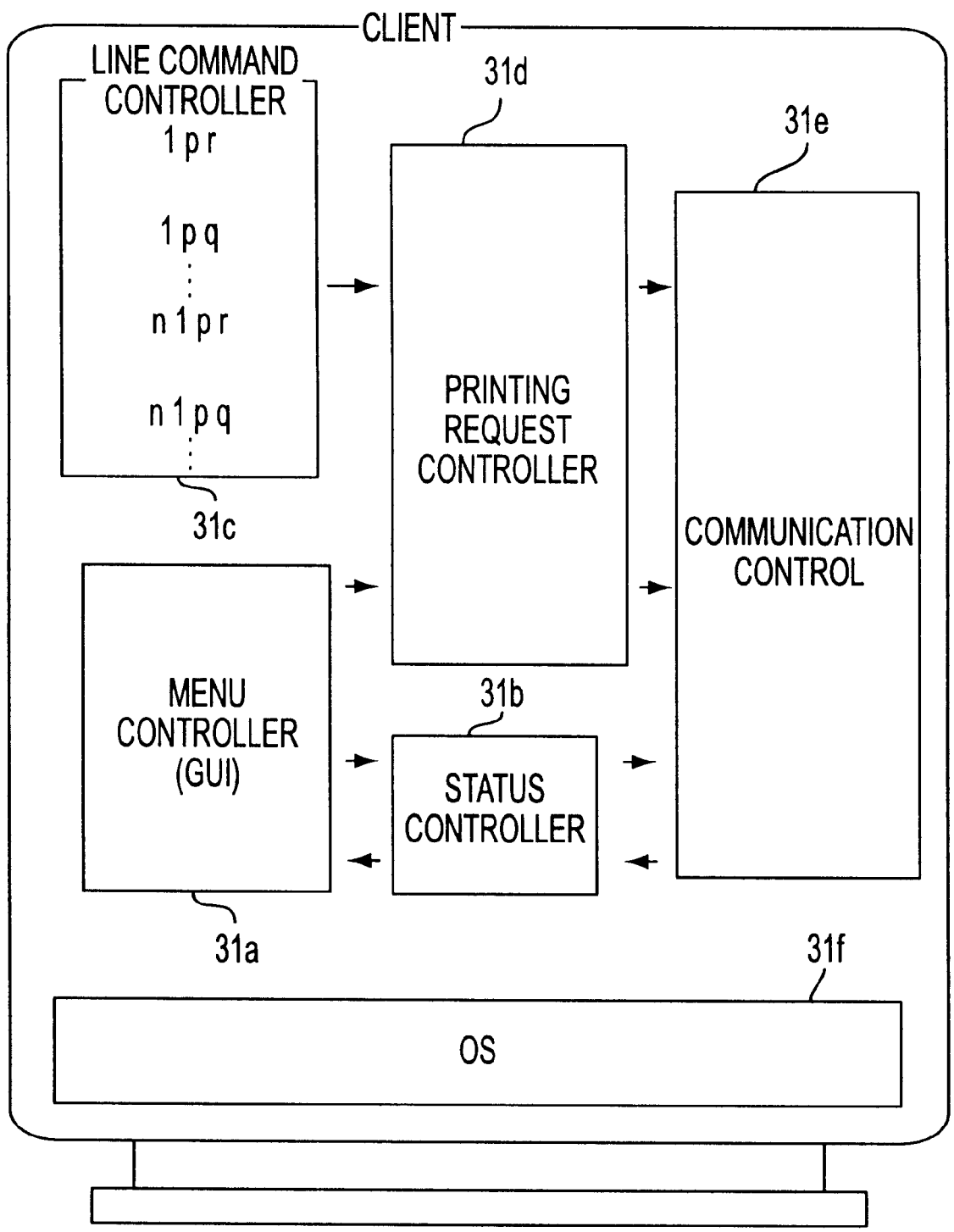
FIG. 21 shows the structure containing the software portion of a client (PC or work station)

FIG. 21 shows the structure of the pre-programmed portion of a client. Although the detailed structure of the hardware of the client is not shown, the client has a structure similar to that of a general work station WS or personal computer PC. In other words, the client is provided with a processor, a display unit, an input/output portion (keyboard, mouse, etc.), and an external storage means (hard disk, floppy disk, etc.). In FIG. 21, the reference numeral 31*a* denotes a menu controller having software for menu control. 31*b* is a status controller containing a software for status control. 31*c* is a preprogrammed line command controller, 31*d* is a pre-programmed printing request controller, 31*e* contains software for communication control (communication controller) and 31*f* is an OS.

The softwares of these parts are written in the memory of the client from a floppy disk and the like. It is also possible to write the softwares in the memory of the client by storing them in the hard disk 24 of the network printer apparatus 20 beforehand and sending them to the client from the hard disk 26 in response to the indication of the name of client and name of software which are input from the operator panel 28. Namely, the status controller 22-9 reads the indicated softwares out of the hard disk 24 and send them to the communication response controller 21-7, thereafter TCP/zp controller 21-3 sends them to the client in accordance with file transfer protocol (FTP) fo TdP/IP and the client stores them in the memory.

Menu control, status control.

The menu controller 31*a* has a software routine for controlling display such as the menu screen by using a tool kit including Openlook, Motif, etc. on the GUI (Graphical User Interface) basis. The status controller 31*b* issues a request for an inquiry about the printing job information, etc. to the network printer apparatus and receives the response to the enquiry, and error information.

The user is provided with the following functions (1) to (9) through the menu screen with respect to the network printer apparatus 20 installed at a remote place.

(1) A function of setting, referring to and updating the initialization information (structure information, printer standard value information) of the network printer apparatus 20.

The structure information treated as the initialization information includes:

IP address of the printer apparatus 20

Name of a remote printer

On line or Off line

Standard values of the system of the network printer apparatus 20

Size of the paper mounted on the hopper

Type of equipment mounted as pre-processing or post-processing mechanism (e.g., large-capacity hopper, mailbox).

The printer standard value information treated as the initialization information includes:

Printing format (single-side or both-side printing, portrait (long lengthwise) or landscape (long sideways), etc.)

Paper size

Emulation name

Type of connecting interface

Type of communication protocol

Type of form overlay

Type of font

Standard hopper

Standard stacker

Output banner page or not.

(2) The function of issuing a command for controlling the network printer apparatus 20 and receiving the result.

(3) The function of designating the printing attributes for a printing operation of the network printer and requesting the network printer to print.

(4) The function of registering, referring to, eliminating and holding the job queue in the network printer apparatus 20.

(5) The function of registering, referring to, updating and eliminating the state and the printing attributes of the job stored in the network printer apparatus 20.

(6) The function of changing the priority of the job stored in the network printer apparatus 20.

(7) The function of displaying, changing, and eliminating the printing attributes of the printing job which has been required to be printed.

(8) A function of instructing re-output after error recovery in the network printer apparatus 20.

(9) The function of collecting, displaying and outputting the maintenance information of the network printer apparatus 20. The maintenance information includes:

Usage ratio of the network printer

Amount of remaining paper

Amount of remaining toner (expendable supply information)

System log information

Memory damping

Line command control

The line command controller 31c contains a software for newly providing an additional command operand. The UNIX standard command assumes the printer to be a line printer, so that it is impossible to designate both-side printing, select a hopper, or other options which are possible in a high-speed page printer (laser printer). The present invention therefore newly adds original commands.

Figure 23:
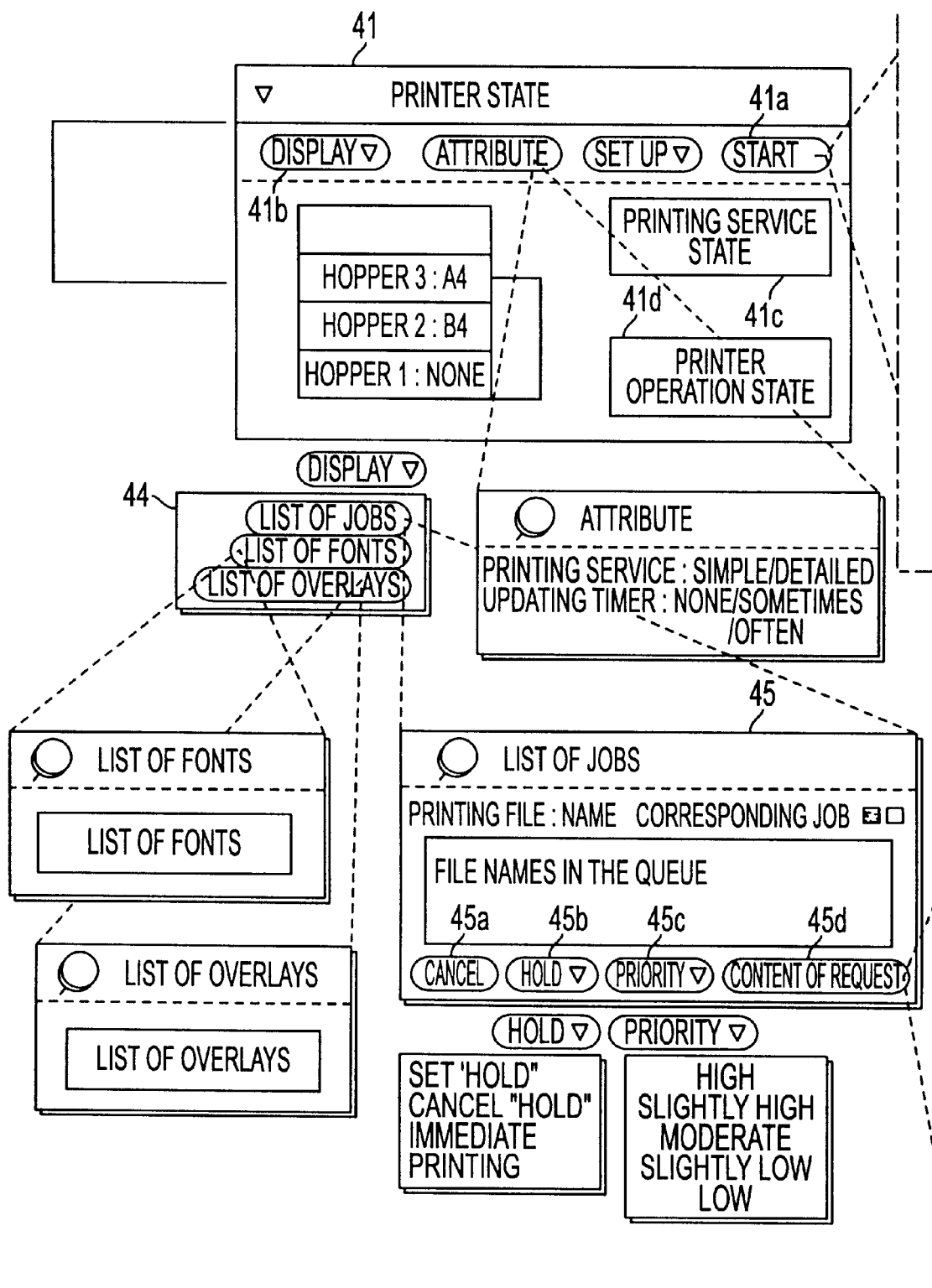
FIGS. 23 and 24 show an example of a menu screen.

FIG. 22 shows a list of commands. The upper column of the table shows the UNIX standard commands and the lower column the printing command especially for the network printer apparatus 20. As the printing system, there are an lpd compatible system and a communication filter system. Four commands lpr, lpq, lprm and lpc are prepared as the UNIX standard commands in both systems. These commands have the following functions, as shown in FIG. 23:

lpr: Transmit a job to the printer.

lpq: Display the jobs in the job queue.

lprm: Eliminate a spooling job.

lpc: Control the printer.

These existing commands are insufficient for mastering the network printer apparatus 20 having high functions. In the present invention, the following eight expanding printing commands having the respective functions are added:

nlpr: Transmit a job to the network printer apparatus 20.

nlpru: Change the contents of the job which has been required to be printed by the network printer apparatus 20.

nlpq: Display the jobs in the job queue in the network printer apparatus 20.

nlprm: Eliminate a job in the job queue in the network printer apparatus 20.

nlpj: Display the jobs which have been required to be printed by the network printer apparatus 20.

nlph: Hold/cancel the job in the network printer apparatus 20.

nlpc: Control the network printer apparatus 20.

nlpset: Set the network printer apparatus 20. Some of these printing commands can designate a filter.

According to the UNIX standard commands, a job is transmitted to the printer by issuing lpr ABC (A, B and C are operands for indicating a condition for printing).

However, if another operand D for a condition for both sided printing is added and the following command lpr ABCD is issued, an error is caused. In the present invention, therefore, the original command nlpr is used and issues the following command nlpr ABCD.

The printing request controller 31d executes this command and converts the command into lpr ABC(D)

which is allowed by the UNIX. C(D) means that C includes D.

Printing request control, communication control.

When the printing request controller 31d receives a request for printing from the line command controller 31c, the printing request controller 31d interprets the command, converts the command as occasion demands, and instructs the communication controller 31e to transmit the request for printing. The printing request controller 31d can also receive a request for printing from the menu screen. Specifically, if the menu screen is displayed on the display unit and the necessary items are picked and input as data, the menu controller 31e creates the line commands and operands in correspondence with the data and inputs them to the printing request controller 31d. The printing request controller 31d interprets the line commands.operands, converts the commands and instructs the communication controller 31e to transmit the request for printing.

The communication controller 31e has software for enabling the original communication to pass between the client and the network printer apparatus 20. The communication controller 31e also has a communication function for communicating in accordance with another communication protocol such as TCP/IP protocol. The communication controller 31e transmits the printing data which is input from the menu controller 31a and the line commander 31c through the printing request controller 31d to the network printer apparatus 20 in accordance with the TCP/IP protocol. The communication controller 31e has a function of transmitting inquiry data in accordance with the original protocol. In addition, the communication controller 31e has a function of receiving the information (response information to an inquiry, notice of printing end, error information, etc.) supplied from the network printer apparatus 20 and supplying it to the status controller 31b.

Remote control by the client.

Request for printing.

Figure 25:
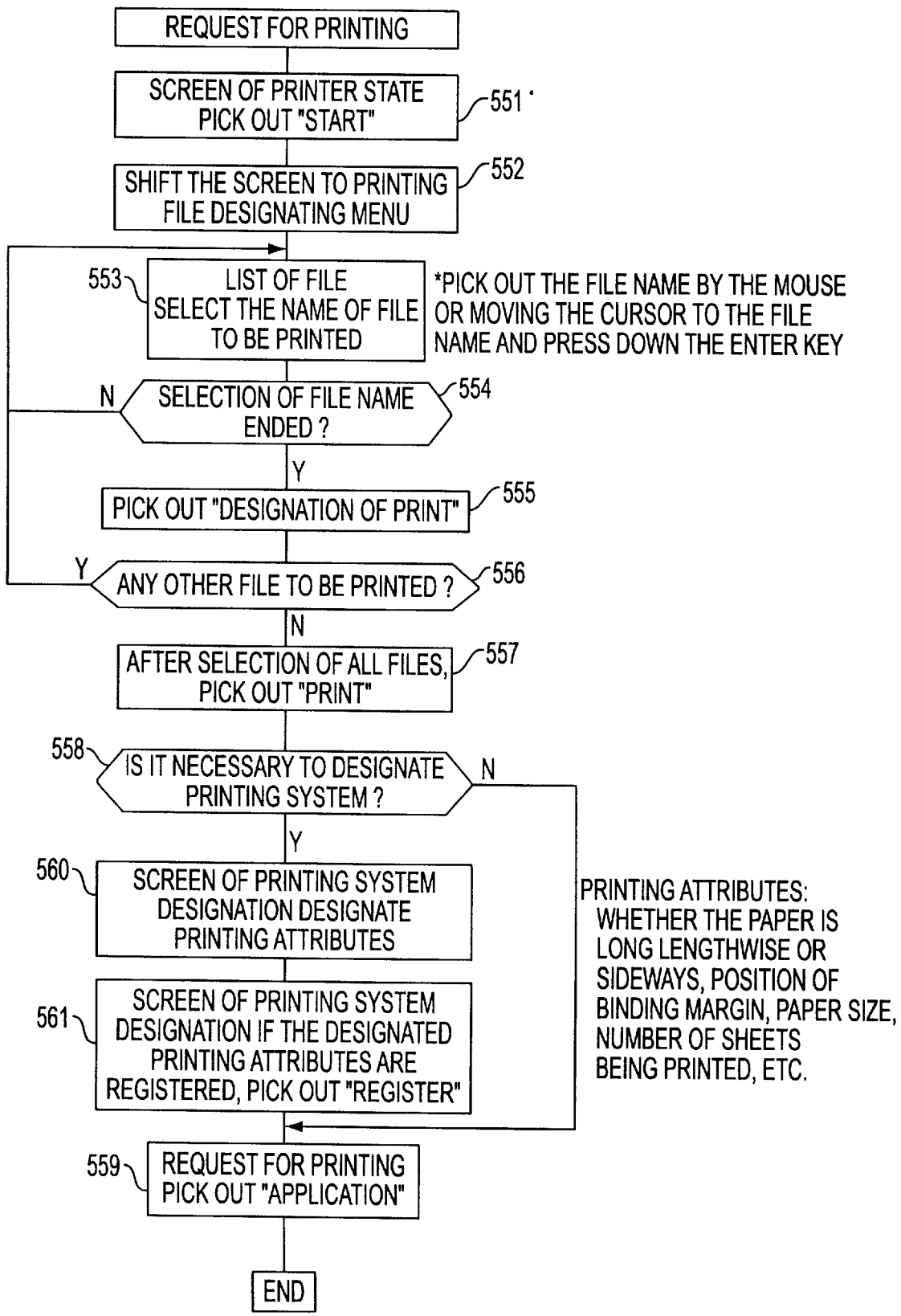
FIG. 25 is a flowchart of the processing for a request for printing.

FIGS. 23 and 24 show an example of a menu screen used (translated from Japanese) for the purpose of remote control of the network printer apparatus 20. FIG. 23 shows the left half of the screen whereas FIG. 24 shows the adjacent right side half of the screen. FIG. 25 is a flowchart of the processing for a request for printing.

When the menu control program is started, the menu controller 31a is ready for a command input. When the printer name is designated from the console window, a menu screen 41 shown in FIG. 25 is displayed. The operation of the menu screen is executed by clicking the button of a mouse. By clicking the button at a predetermined item context, the display of the menu is shifted. In order to supply a request for printing to the network printer apparatus 20 in the state in which the Japanese menu screen 41 is displayed, the item "Start" is picked out by the mouse (Step 551) and a printing file designating menu 42 is displayed (Step 552 in FIG. 25). In this menu, if the item "Open" 42a is picked out, a list 42b of files is displayed. When the file name to be printed is designated in the list 42b of files and the item "Designation of print" 42c is picked out, the designated file name is displayed in a list 42d of designated files (Steps 553 to 555). The file name is designated by picking out the predetermined file name or pressing down the execution key after moving the cursor to the predetermined file name. If there are other files to be printed, the processing at the step 553 and thereafter is repeated (Step 556).

When all the files are designated and the item "Print" 42e is picked out, the menu controller 31a displays a printing format designating menu 43 (Step 557). If it is not necessary to designate the printing format, the item "Application" 43a is picked out (Steps 558, 559). Thereafter, the menu controller 31a creates the command\operands (print file, printing attribute file, file attribute information) for a request for printing to the network printer apparatus 20 and inputs them to the printing request controller 31d. The printing request controller 31d converts the command for a request for printing and the printing data, and transmits the converted command and data to the network printer apparatus 20 through the communication controller 31e such as, for example the TCP/IP protocol.

On the other hand, if it is necessary to designate the printing format, the printing attributes (whether the paper is long lengthwise or sideways, binding margin, paper size, space, number of sheets being printed, etc.), the priority of printing job, etc. are designated in the printing format designating menu 43 (Step 560). If it is necessary to register the designated printing attributes, the item "Register" 43b is picked out. Thereafter, the item "Application" 43a is picked out (Step 559).

Displaying a list of printing jobs, a list of fonts and a list of overlays.

In order to display a list of printing jobs, a list of fonts and a list of overlays in the network printer apparatus 20, the item "Display" is picked out of the menu 41. A menu 44 of selecting a list is then displayed and a desired list is designated. The menu controller 31a creates an enquiry command\operand ("Job", "Font", "Form overlay", etc.) and inputs it to the printing request controller 31d. When the printing request controller 31d receives the inquiry command\operand, it inputs the request for inquiry about the designated list to the communication controller 31e. The communication controller 31e transmits the request for inquiry to the network printer apparatus 20 by the original communication protocol. The network printer apparatus 20 then sends the demanded list to the client. The menu controller 31a receives the list through the communication controller 31e and the status controller 31d and displays it on the display screen.

The name of the file which is being printed and the names of the files waiting for being printed are displayed in a job list menu 45. In the case of cancelling a predetermined file which is waiting for being printed, cancelling the holding state which refrains from printing a predetermined file or changing the priority or the content of the request of the job. The cancelling or changing operation is executed by picking out the item "Cancel" 45a, " "Hold" 45b, "Priority" 45c or "Content of request" 45d while the name of the file is being displayed. For example, in the case of eliminating the file which has been required to be printed, the item "Cancel" 45a is picked out. The menu controller 31a creates the job control command operand ("Delete", "Job name", etc.) and inputs them to the printing request controller 31d. The printing request controller 31d inputs a request for eliminating the printing job to the communication controller 31e, and the communication controller 31e transmits the request for elimination to the network printer apparatus 20 by the original communication protocol. In the case of changing the content of the job (e.g., changing the priority), the menu controller 31a creates the job control command operand ("Change priority", "Job name", etc.) and inputs them to the printing request controller 31d. The printing request controller 31d inputs a request for changing the content of the printing job to the network printer apparatus 20 through communication controller 31e.

Confirmation of the printing service state and the printer operation state.

In order to confirm the printing service state and the printer operation state, the item "Printing service state" 41c or the item "Printer operation state" is picked out of the menu 41. The menu controller 31a creates the inquiry command operand ("Printing service state", "Printer operation state", etc.) and inputs them to the printing request controller 31d. The printing request controller 31d inputs a request for the designate data to the communication controller 31e, and the communication controller 31e transmits it to the network printer apparatus 20 by the original communication protocol. The network printer apparatus 20 then sends the demanded data on the printing service state or the printer operation state to the client. The menu controller 31a receives the data through the communication controller 31e and the status controller 31d and displays it on the display screen.

In this example, the menu screen translated from the Japanese language is used, but the menu screen in any other language is possible.

Command between the client and the network printer apparatus.

Figure 26:
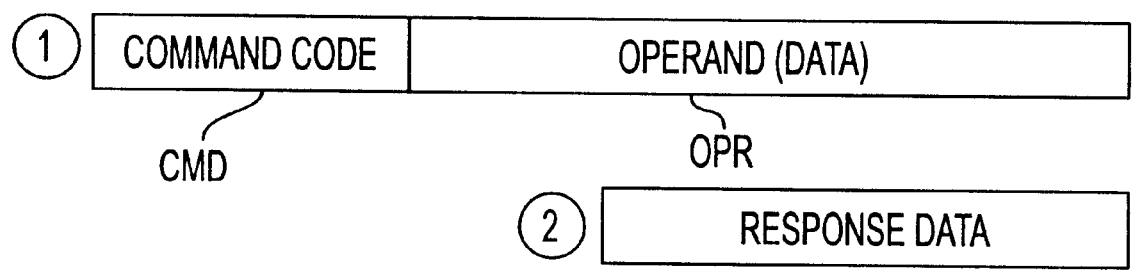
FIG. 26 shows the structure of a network printer header.

A frame has the format shown in FIG. 5e. The network printer header NPH has the structure of (1) and (2) shown in FIG. 26. The structure (1) composed of a command code CMD and an operand OPR is used when a command is transmitted from the client (PC or WS) to the network printer apparatus 20, while the structure (2) composed of only response data RPD is used when a command is transmitted from the network printer apparatus 20 to the client.

FIG. 27 shows a list of command codes and operands. The command codes include request for printing, inquiry, job control, printer control, printing environment setting, information supply, etc. The arrow directed to the right indicates that the data is to be transmitted to the network printer apparatus 20 together with the command code, while the arrow directed to the left indicates that the data is response data transmitted from the network printer apparatus in response to the command.

The user cannot operate jobs other than his own job (elimination, change of the priority, etc.), control the printer (turn off the power, stop/resume the printer, etc.), or set the printing environment of the network printer apparatus 20. Only the manager of the printer is permitted to conduct these operations.

Software processing by client.

Figure 28:
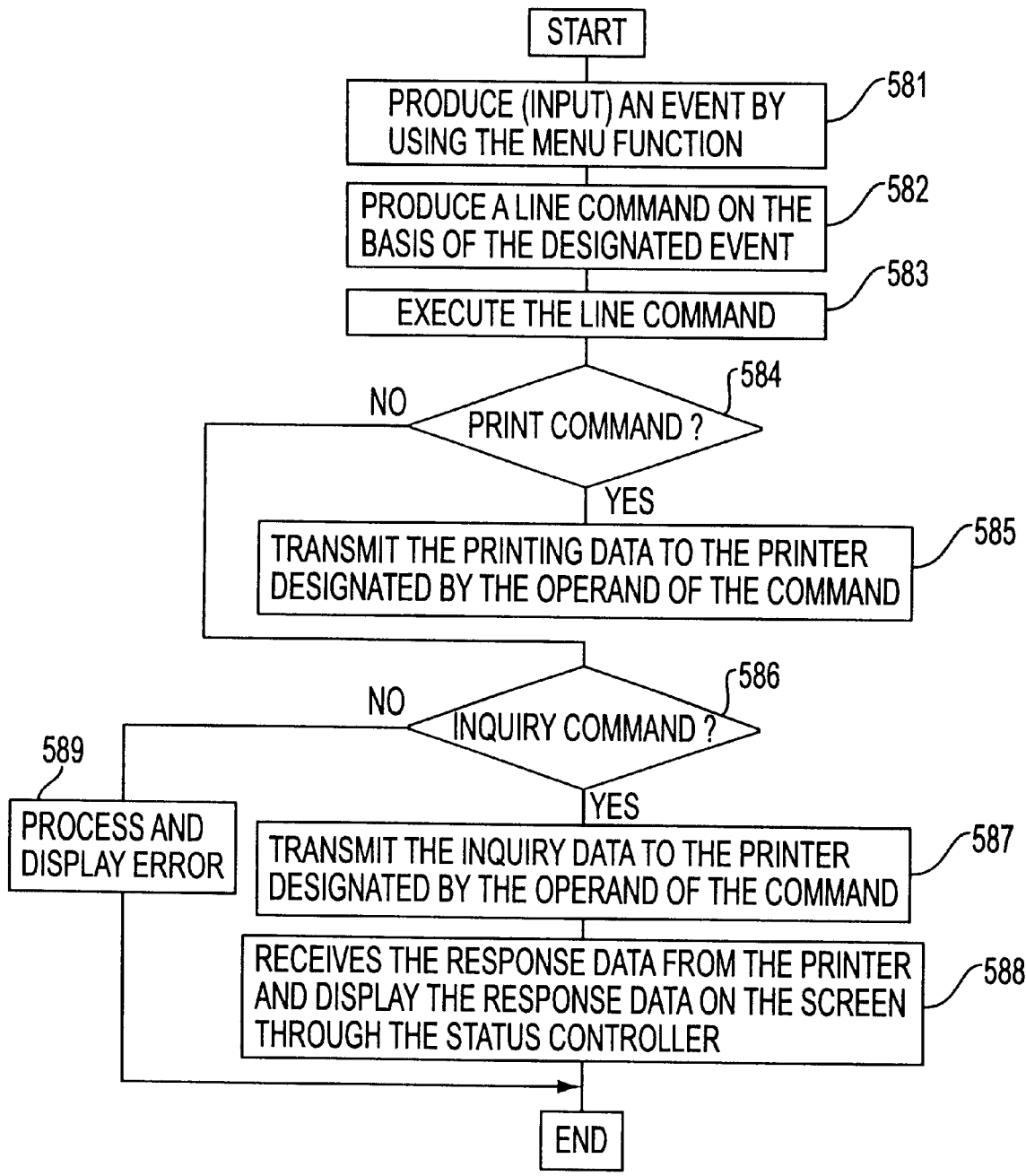
FIG. 28 is a flowchart of the processing by the client.

FIG. 28 is a flowchart of the whole software processing by the client.

The user produces (inputs) an event by using the menu function (Step 581). When the event producing operation has been completed, the menu controller 31a produces a line command on the basis of the designated event and inputs it to the printing request controller 31*d* (Step 582). The printing request controller 31*d* interprets the line command (Step 583), and if it is a print command, the communication controller 31*d* transmits the printing data to the printer designated by the operand of the command (Steps 584, 585).

On the other hand, if the line command is not a print command, whether or not it is an inquiry command is judged (Step 586). If the answer is YES, the inquiry data is supplied to the printer designated by the operand of the command through the original communication protocol (Step 587).

When the communication controller 31*d* receives the response data supplied from the network printer apparatus 20 in response to the inquiry, the communication controller 31*d* inputs the response data to the menu controller 31*a* through the status controller 31*b*, and the menu controller 31*a* displays the response data on the display screen (Step 588). If the line command is not an inquiry command at the step 586, it is an input error, so that the error is displayed and processed (Step 589).

Figure 29:
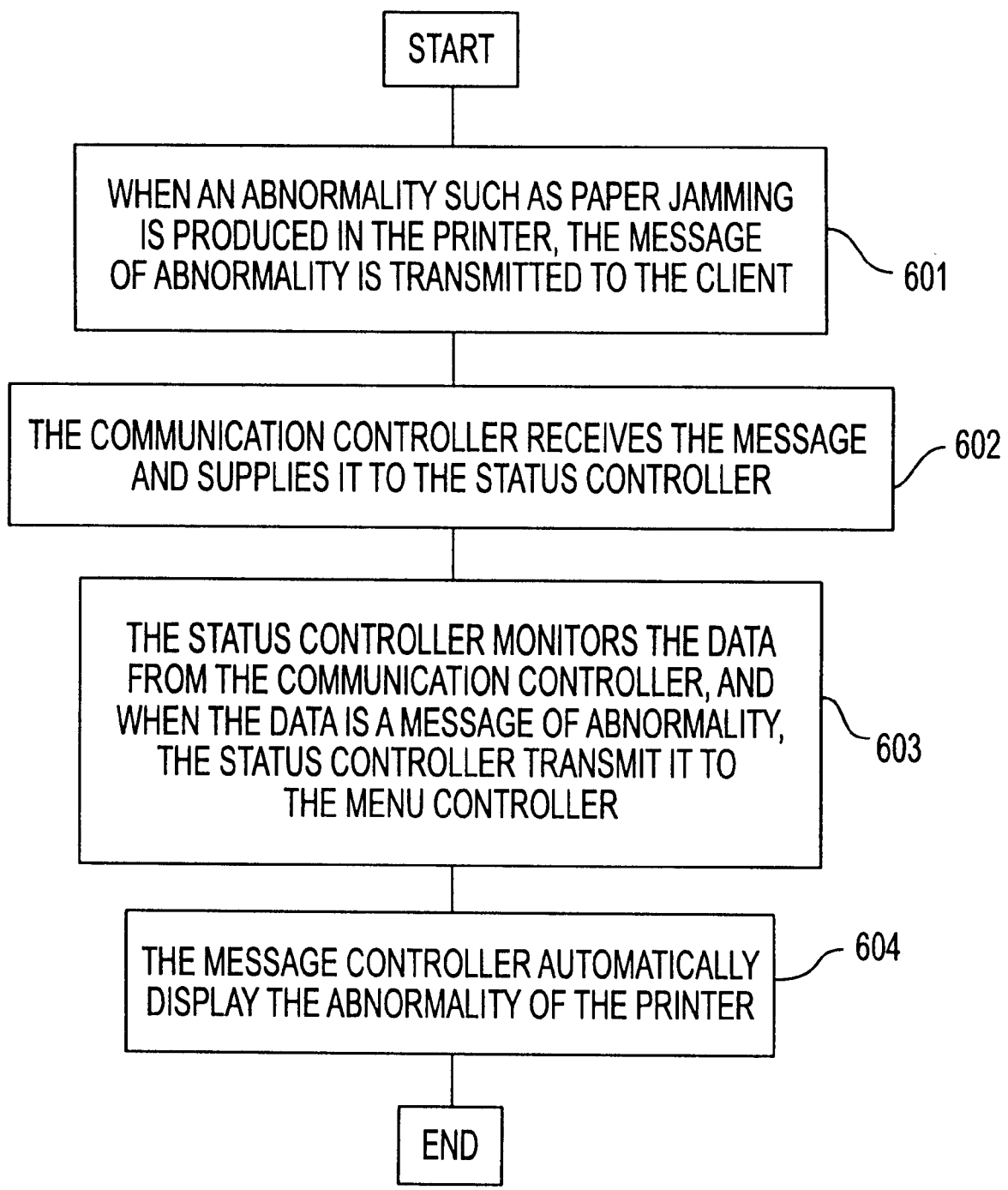
FIG. 29 is a flowchart of the processing when abnormality is notified.

FIG. 29 is a flowchart of processing when abnormality is notified.

When an abnormality, such as paper jamming, is produced in the network printer apparatus 20, the message of abnormality is transmitted to the client (Step 601). The communication controller 31*d* receives the message and supplies it to the status controller 31*b* (Step 602).

The status controller 31*b* monitors the data from the communication controller 31*d*, and when the data is a message of abnormality, the status controller 31*b* transmits it to the menu controller 31*a* (Step 603). When the menu controller 31*a* receives the message, it automatically displays the abnormality of the network printer apparatus 20 on the display screen (Step 604).

Control by the FEP.

Receipt processing by FEP.

Figure 30:
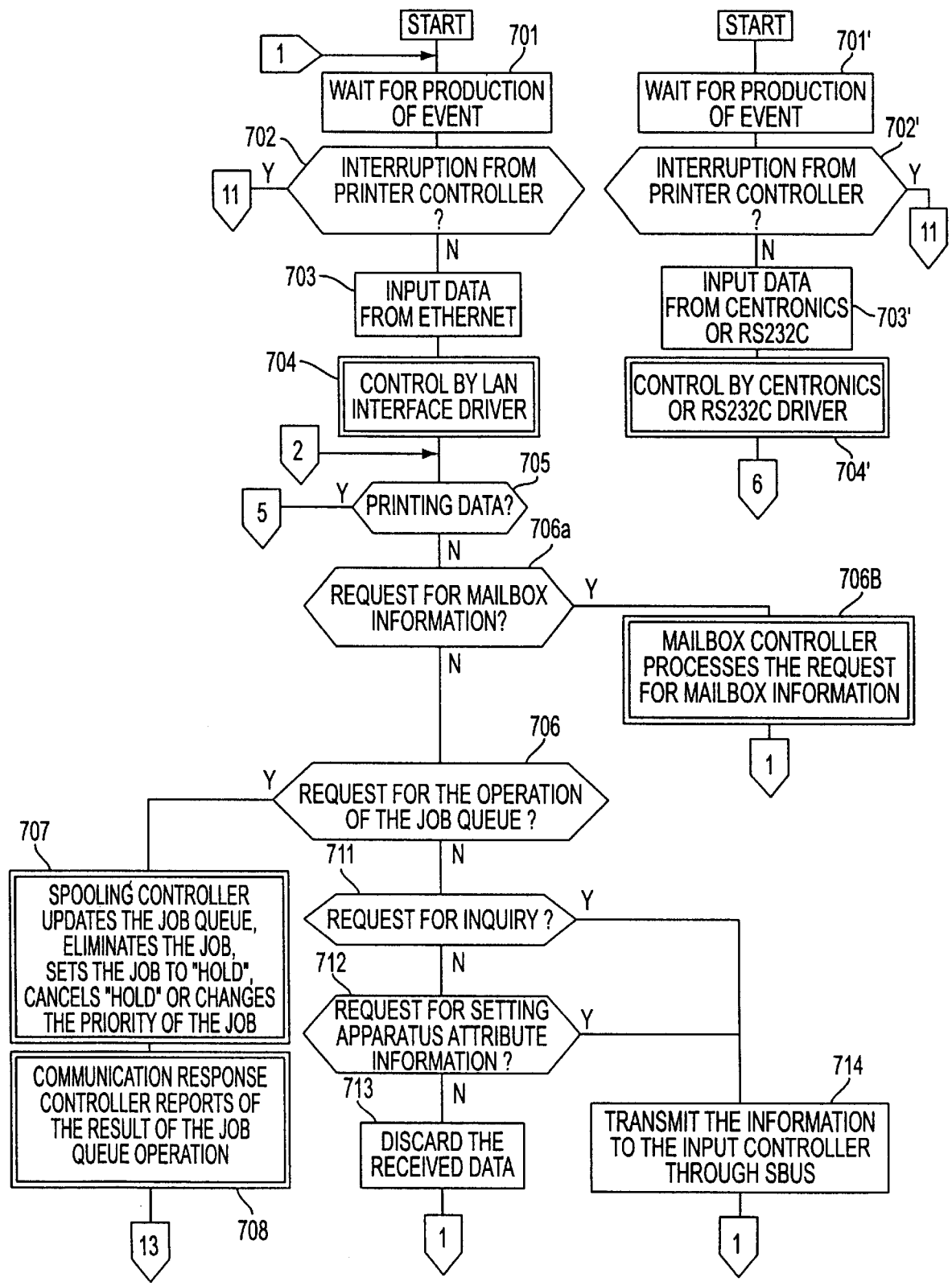
FIGS. 30 to 32 show sequential steps of a flowchart of the receipt processing by the LAN adapter (FEP)
Figure 31:
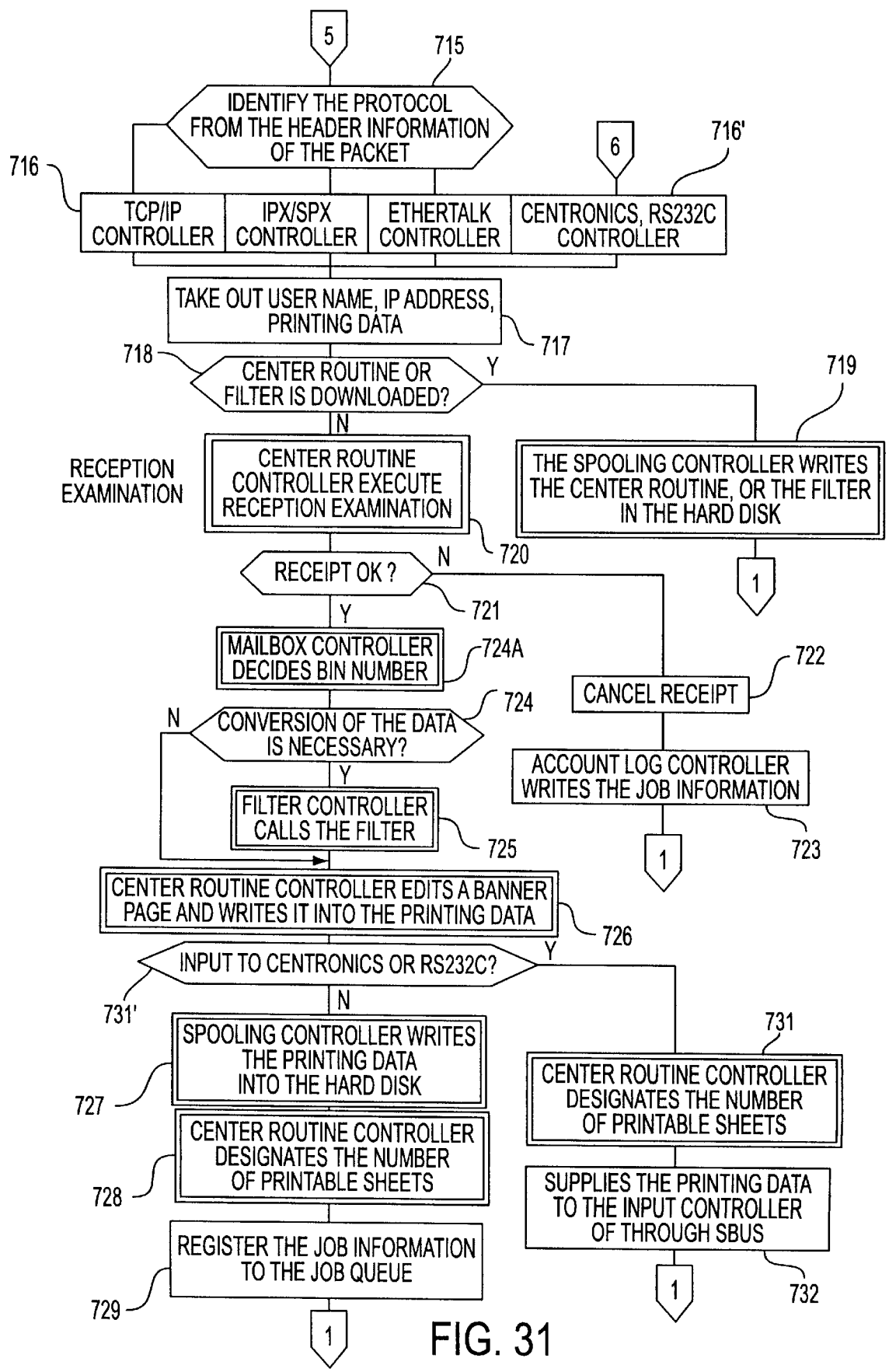
Figure 32:
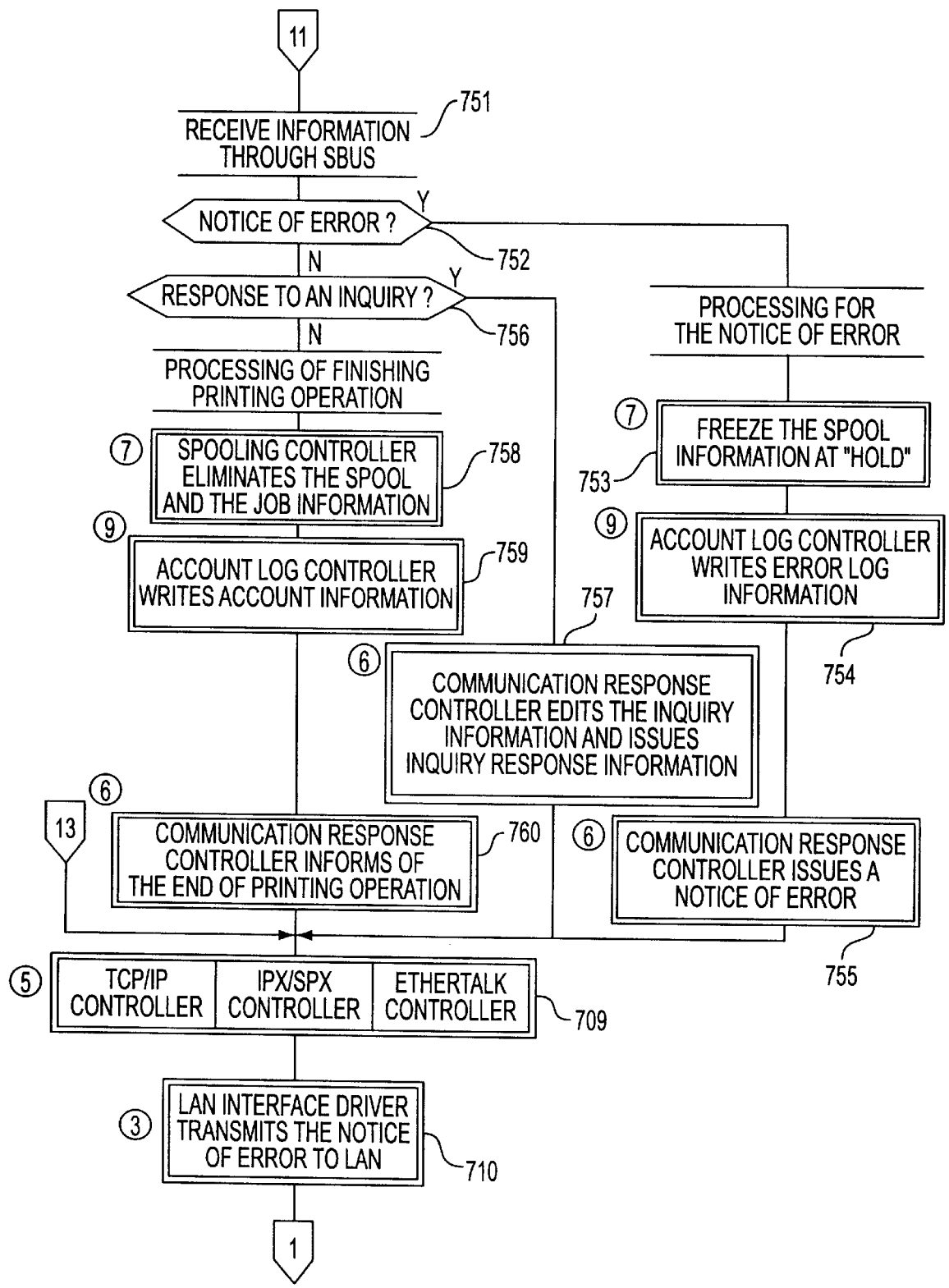

FIGS. 30 to 32 are flowcharts of the receipt processing by the FEP 21 in the network printer apparatus 20.

Production of an event is waited for (Step 701), and when an event is produced, whether or not the event is an interruption from the printer controller 22 is judged (Step 702). If the answer is NO, the LAN interface driver 21-1 receives the data from the LAN (Ethernet) (Steps 703, 704).

The step controller 21-12 then judges whether or not the received data is printing data (Step 705). If the answer is NO, whether or not the data is a request for operation of the job queue is judged (Step 706). In the case of providing a mailbox as in a second embodiment which will be described later, whether or not the data is a request for mailbox information is judged (Step 706*a*), and if the answer is YES, the mailbox controller 20*a* is started so as to execute the processing for the request for mailbox information (Step 706*b*).

If the received data is a request for the operation of the job queue at the step 706, the spooling controller 21-8 is started so as to operate the job queue QUE stored in the RAM 21*e* in accordance with the job control command. For example, (1) the job queue QUE is updated, (2) the job is eliminated, (3) the job is set to "Hold" or "Hold" of the job is cancelled, or the (4) priority of the job is changed (Step 707).

When the operation of the job queue QUE is finished, it is notified to the communication response controller 21-7 so as to report of the result of the operation of the job queue QUE through the communication response controller 21-7 (Step 708). The response data is supplied to the client which has requested through the LAN interface driver 21-1 (Steps 709, 710).

On the other hand, if the answer is negative at the step 706, the step controller 21-12 judges whether the received data is a request for inquiry or a request for setting apparatus attribute information (Steps 711, 712), and the answer is NO either at the step 711 or at the step 712, the received data is discarded (Step 713). If the answer is YES either at the step 711 or at the step 712, the request is stored in the DPRAM 21*d* and transmitted to the input/output controller 22-1 of the printer controller 22 through the system bus (Step 714).

If the received data is printing data at the step 705, the multiprotocol controllers identify the communication protocol from the header information of the received packet, (Step 715), and the corresponding protocol controller such as the TCP/IP controller 21-3 is started so as to receive the data (Step 716).

Thereafter, the user name, IP address, printing data, etc. are taken out (Step 717), and whether or not the center routine program or the filter program is downloaded is judged (Step 718). If the answer is YES, the spooling controller 22-8 is started and the center routine program or the filter program is written in the hard disk 24 through the SCSI interfaces 21*g* and 22*c* (Step 719). In order to download the center routine program or the filter program from the client, the file transfer command and the program name are input by key operation, and thereafter the execution key is pressed down.

If the answer is in the negative at the step 718, the step controller 21-12 starts the center routine function controller 21-10 so as to execute a reception examination (Step 720). The reception examination (reception control) is executed for the purpose of judging whether or not the user who has required printing is a registered as a printer user. If the user is not a registered one, the reception is cancelled (Steps 721, 722), and the account log controller 21-9 is started so as to write the job information into the hard disk 24. For example, "Cancel" is written in correspondence with the job number (Step 723).

Figure 33:
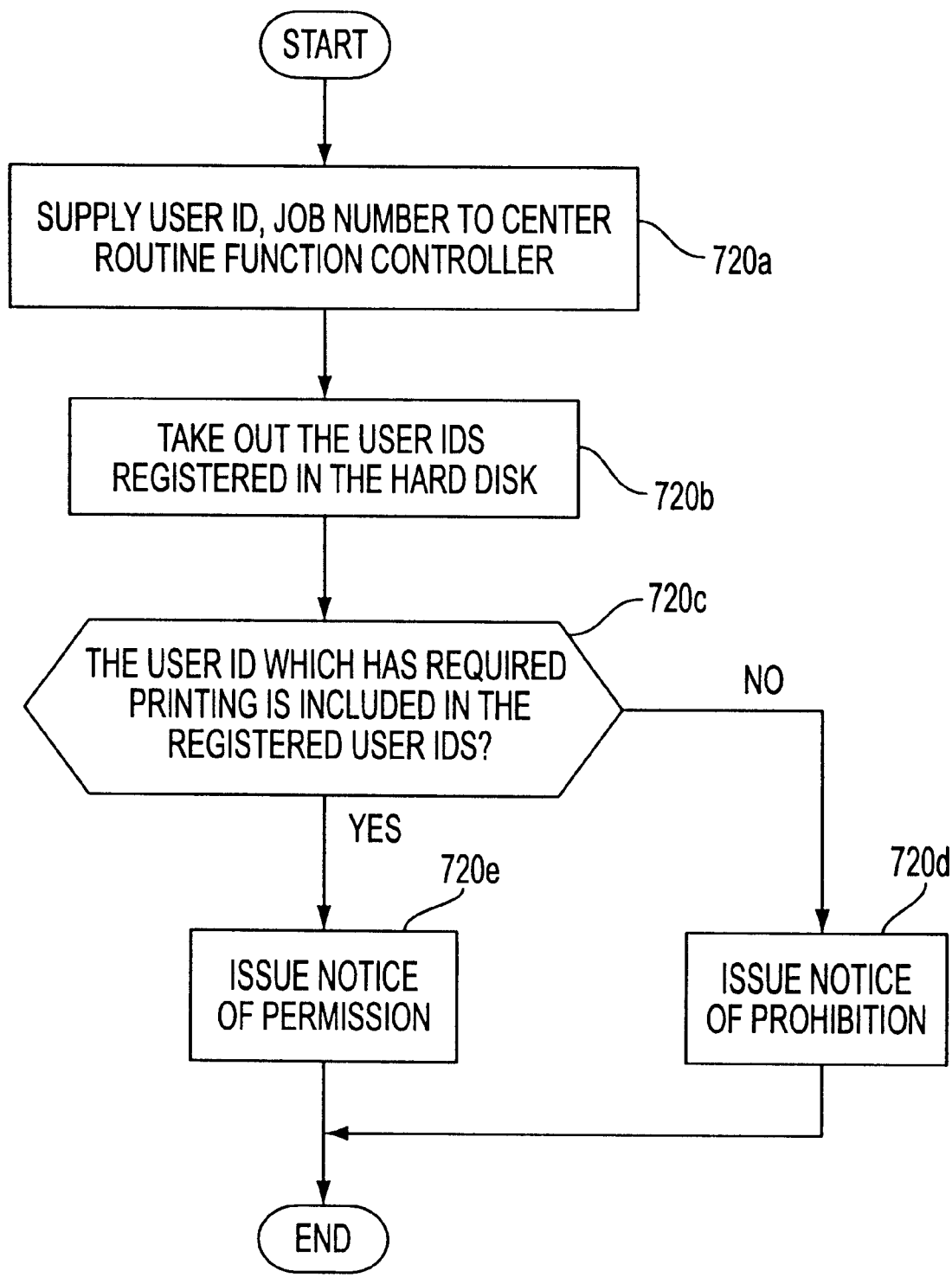
FIG. 33 is a flowchart of a reception control.

FIG. 33 is a flowchart of reception control (Step 720). The printer users are registered in the hard disk 24 in advance.

The step controller 21-12 supplies a set of the user ID (user name) and the job number to the center routine function controller 21-10 (Step 720*a*). The center routine function controller 21-10 takes out the IDs of the users which are registered in the hard disk 24 (Step 720*b*) and judges whether or not the user ID which has required printing is included in the registered user IDs (Step 720*c*). If the answer is in the negative, the center routine function controller 21-10 notifies of the impossibility of receipt (Step 720*d*), while if the answer is in the affirmative, the center routine function controller 21-10 notifies of the permission of receipt (Step 720*e*).

If the receipt is permitted, whether or not conversion of the data or the code is necessary is judged (Step 724). In the case of providing a mailbox mechanism as in the second embodiment which will be described later, the mailbox controller is started so as to decide the bin number (Step 724*a*).

If it is necessary to convert the data or the code, the filter controller 21-11 is started so as to execute the filter control such as the conversion of the printing data and the code (Step 725). Thereafter, the center routine function controller 21-10 is started so as to edit a banner page and write the edited banner page into the printing data (Step 726).

Figure 34:
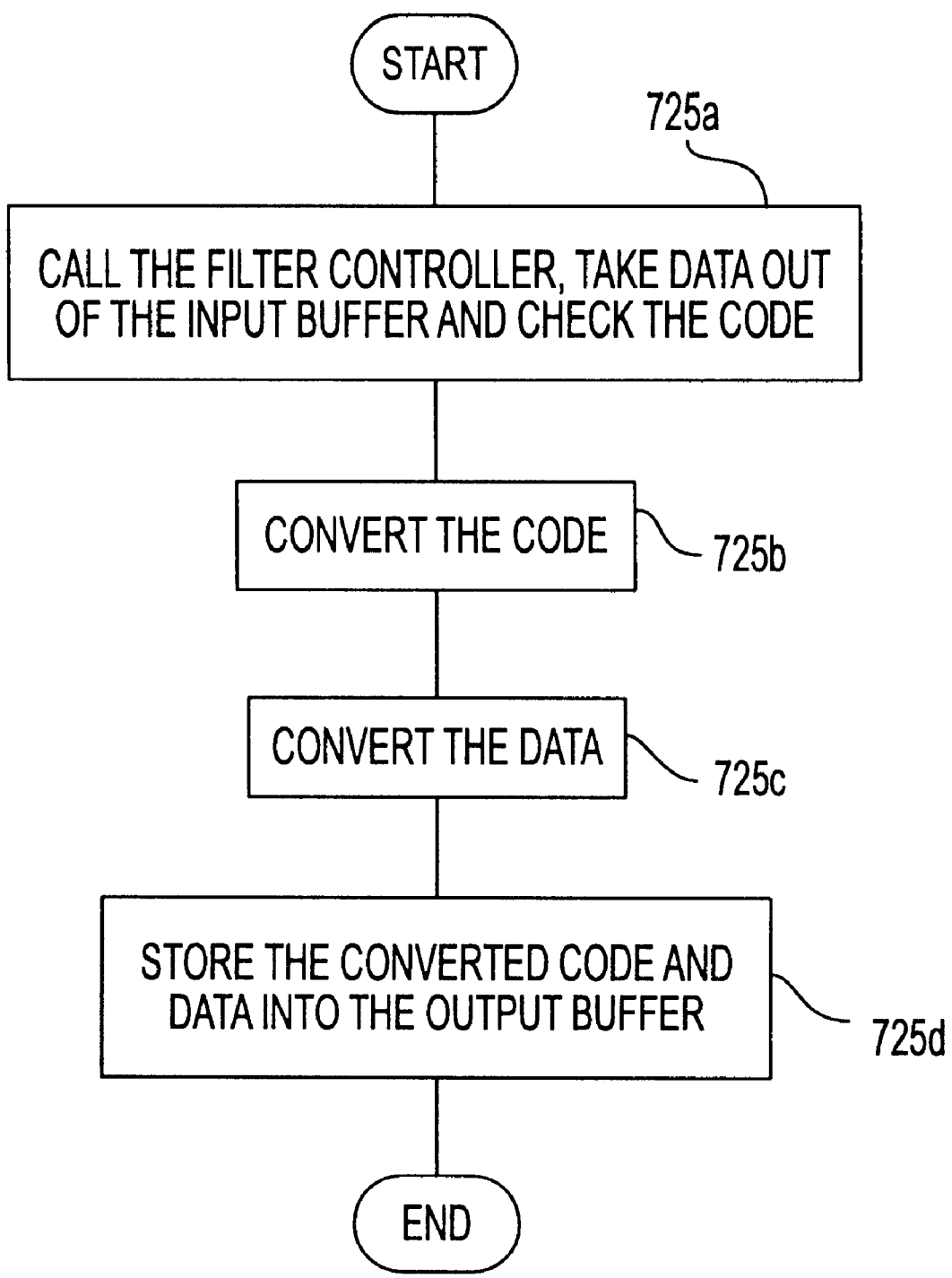
FIG. 34 is a flowchart of a filter control.

FIG. 34 is a flowchart of the filter control (Step 725).

The code conversion is an operation of converting a code into another code or replacing a wrong code by the right code. The data conversion is an operation of converting, for example, the data of an EUC (Extended Universal Code) into the data of another code, for example, the data of a JIS (Japanese Industrial Standards) code. When it is necessary to convert the data or the code, the filter controller 21-11 is called (Step 725*a*), the data or the code is taken out of the input buffer, the code is checked and converted, or the data is converted (Steps 725*b*, 725*c*), and the converted results are stored in the output buffer (Step 725*d*).

Figure 35:
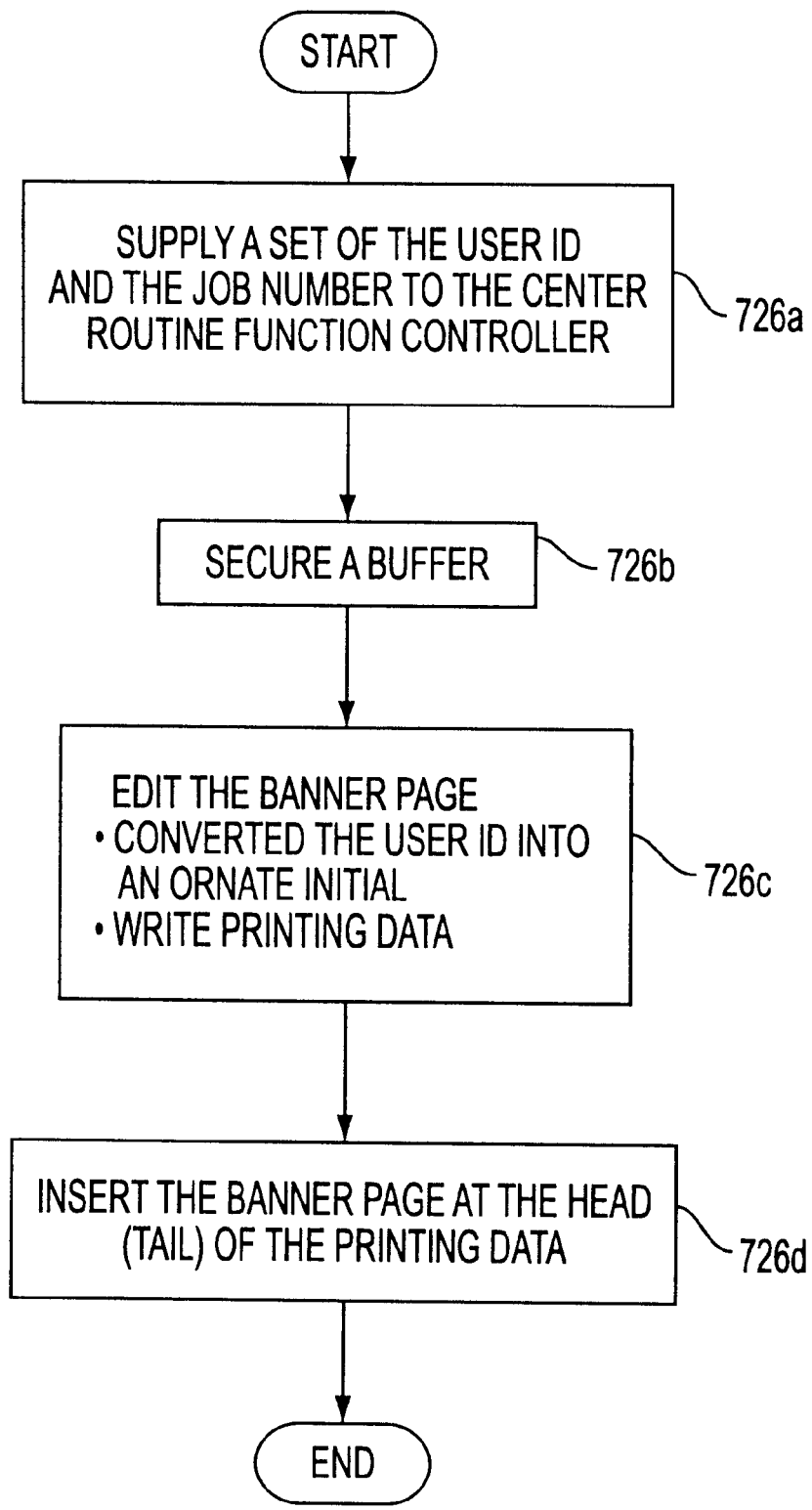
FIG. 35 is a flowchart of a banner page edition.

FIG. 35 is a flowchart of banner page edition (Step 726). A pattern for a banner page is registered in the hard disk 24 in advance.

The step controller 21-12 supplies a set of the user ID (user name) and the job number to the center routine function controller 21-10 (Step 726*a*). The center routine function controller 21-10 secures a buffer for the editing operation (Step 726*b*), and reads the pattern stored in the hard disk 24 into the buffer so as to fill in the variable portion thereof. For example, the user ID is converted into an ornate initial and the variable portion is filled with the ornate initial and the printing date, thereby ending the edition of the banner page (Step 726*c*). When the edition of the banner page is finished, the banner page is disposed at the head, the tail, or both at the head and at the tail of the printing data which is supplied from the client (Step 726*d*), thereby ending the processing of the banner page. In the case of inserting the banner page at the head and at the tail, the corresponding identification codes are attached to the respective banner pages.

When the edition of the banner page is finished, the spooling controller 21-8 is started so as to write the printing data (including the banner page) into the hard disk 24 through the SCSI interfaces (Step 727). The center routine function controller 21-10 is also started so as to decide the number of printable sheets (Step 728).

Figure 36:
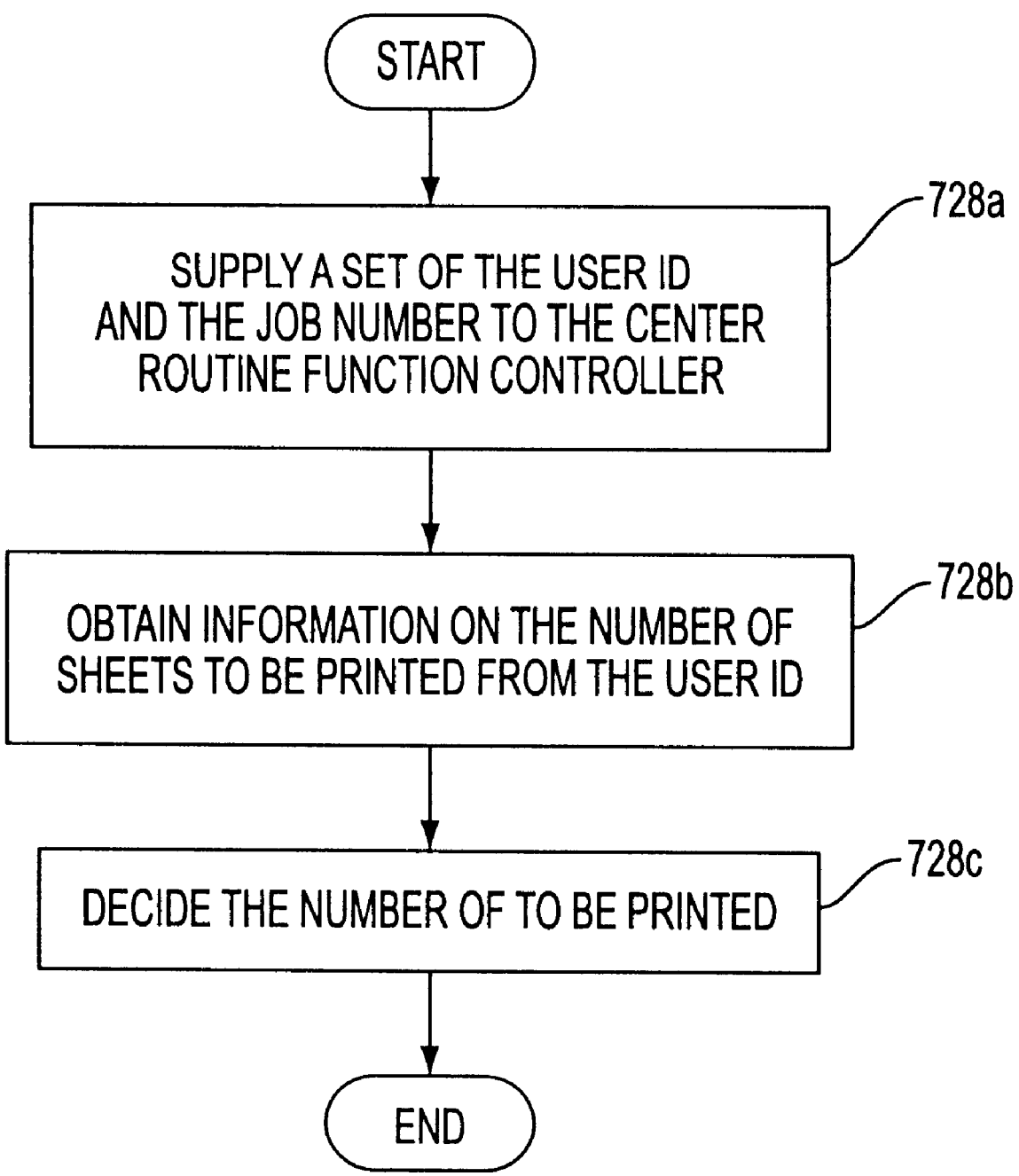
FIG. 36 is a flowchart of a center routine control for deciding the number of sheets to be printed.

FIG. 36 is a flowchart of a center routine control for deciding the number of sheets to be printed. The number N of permissible sheets to be printed in total and the number n of permissible sheets to be printed in each cycle are set in the hard disk 24 for each user or each group of users in advance. Since a rate is charged for one sheet to be printed, the user sets the number of sheets to be printed with the rate taken into consideration. The hard disk 24 also stores the number M of sheets which have actually been printed.

The step controller 21-12 supplies a set of the user ID (user name) and the job number to the center routine function controller 21-10 (Step 728*a*). The center routine function controller 21-10 reads the number N of permissible sheets to be printed in total, the number n of permissible sheets to be printed in each cycle and the number M of sheets which have actually been printed out of the hard disk 24 (Step 728*b*). The center routine function controller 21-10 then decides the number of sheets to be printed from the numbers N, n and M and the number m of pages which has been required to be printed (Step 728*c*). For example, if n>m and N>(M+m), the number of sheets to be printed is m. If n>m and N<(M+m), the number of sheets to be printed is (M+m−N). The spooling controller 21-8 then registers the job information to the end of the printing job queue QUE (Step 729).

These processes are executed when data are input from the LAN network system. Printing data may be supplied from an apparatus (serial interface apparatus) having an interface of Centronics or RS232C. In this case, production of an event is waited for (Step 701'), and when an event is produced, whether or not the event is an interruption from the printer controller 22 is judged (Step 702'). If the answer is NO, the serial interface driver 21-2 receives the data from the serial interface apparatus and supplied it to the Centronics or RS232C (Steps 703', 704', 716'). If the received data is printing data, after processing the banner page at the step 726, whether or not the data is input to the Centronics or RS232C is judged (Step 731'). If the answer is YES, the center routine function controller 21-10 decides and designates the number of printable sheets (Step 731), and supplies the number to the input/output controller 22-1 of the printer controller 22 through the system bus (Step 732).

Post-processing by the FEP

FIG. 32 is a flowchart of the post-processing by the FEP 21 of the network printer apparatus 20.

If the event when there is an interruption from the printer controller 22 at the step 702, information is received through the system bus (Step 751) or not the information is a notice of error is judged (Step 752), and if the answer is YES, the notice of error is processed. That is, the spooling controller 21-8 freezes the spool information (printing information) in the "Hold" state (Step 753), and the account log controller 21-9 writes error log information (Step 754). The communication response controller 21-7 issues a notice of error. The notice of error is transmitted to a predetermined client through the multiprotocol controllers 21-3 to 21-5 and the LAN interface driver 21-1 (Steps 709, 710).

In the "Hold" state, the hold bit of a predetermined printing job is "1". The job in the "Hold" state is connected to the job queue but it is not taken out until the "Hold" state is cancelled. It is possible to set the "Hold" time. If the "Hold" time is set, the printing job in the "Hold state" which is not cancelled after the elapse of the "Hold" time is eliminated from the job queue. This processing is executed by the center routine function controller 21-10.

If the information is not a notice of error at the step 752, then it is judged whether or not it is a response to an inquiry (Step 756). If the answer is in the affirmative, the communication response controller 21-7 edits the inquiry information and issues inquiry response information (Step 757). The inquiry response information is supplied to a predetermined client through the multiprotocol controllers 21-3 to 21-5 and the LAN interface driver 21-1 (Steps 709, 710).

If the information is not a response to an inquiry at the step 756, a processing of finishing printing is executed. The spooling controller 21-8 eliminates the spool information (printing information) from the hard disk 24 and the job information from the DPRAM 21*d* (Step 758). The account log controller 21-9 creates account information and writes it to the hard disk 24 (Step 759). The account information includes printing date, printer apparatus name, user name, job name, job number, number of printing pages, IP address, paper size, etc. for each job.

Thereafter, the communication response controller 21-7 issues a message indicating that the printing operation has been finished (Step 760). This message is transmitted to a predetermined client through the multiprotocol controllers 21-3 to 21-5 and the LAN interface driver 21-1 (Steps 709, 710).

Processing by the printer controller.

Figure 37:
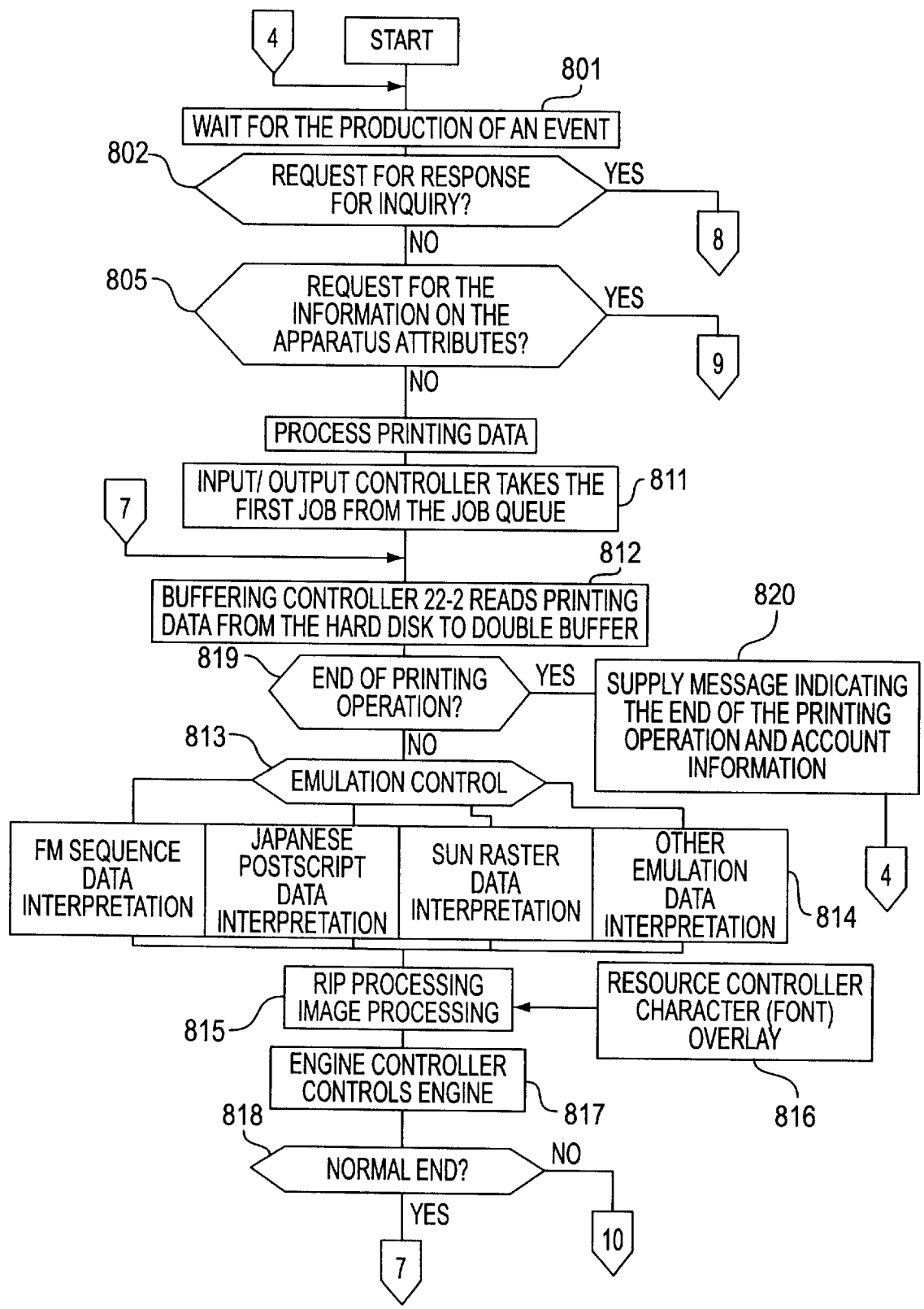
FIGS. 37 to 39 show a flowchart of the processing by the printer controller.
Figure 38:
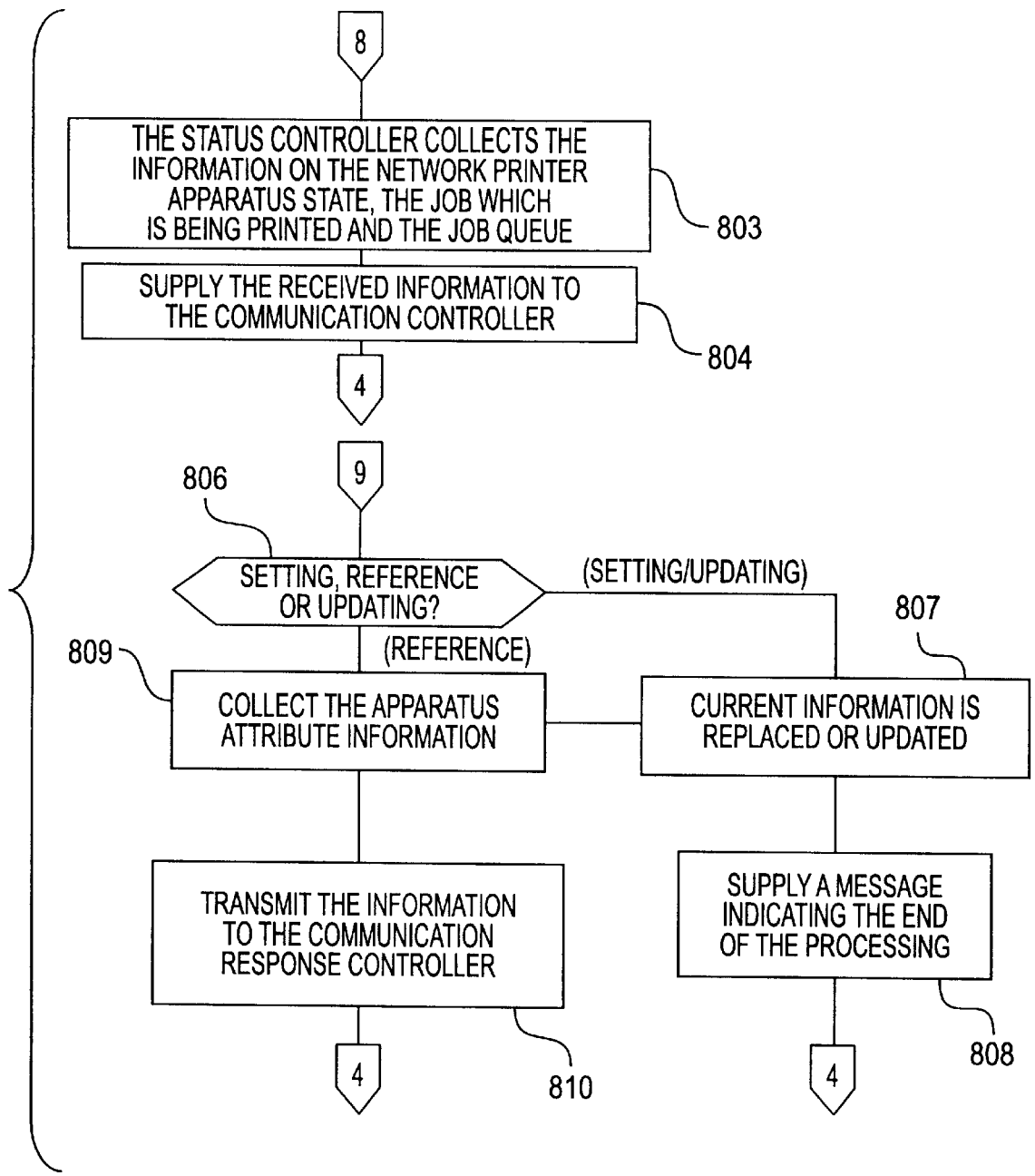
Figure 39:
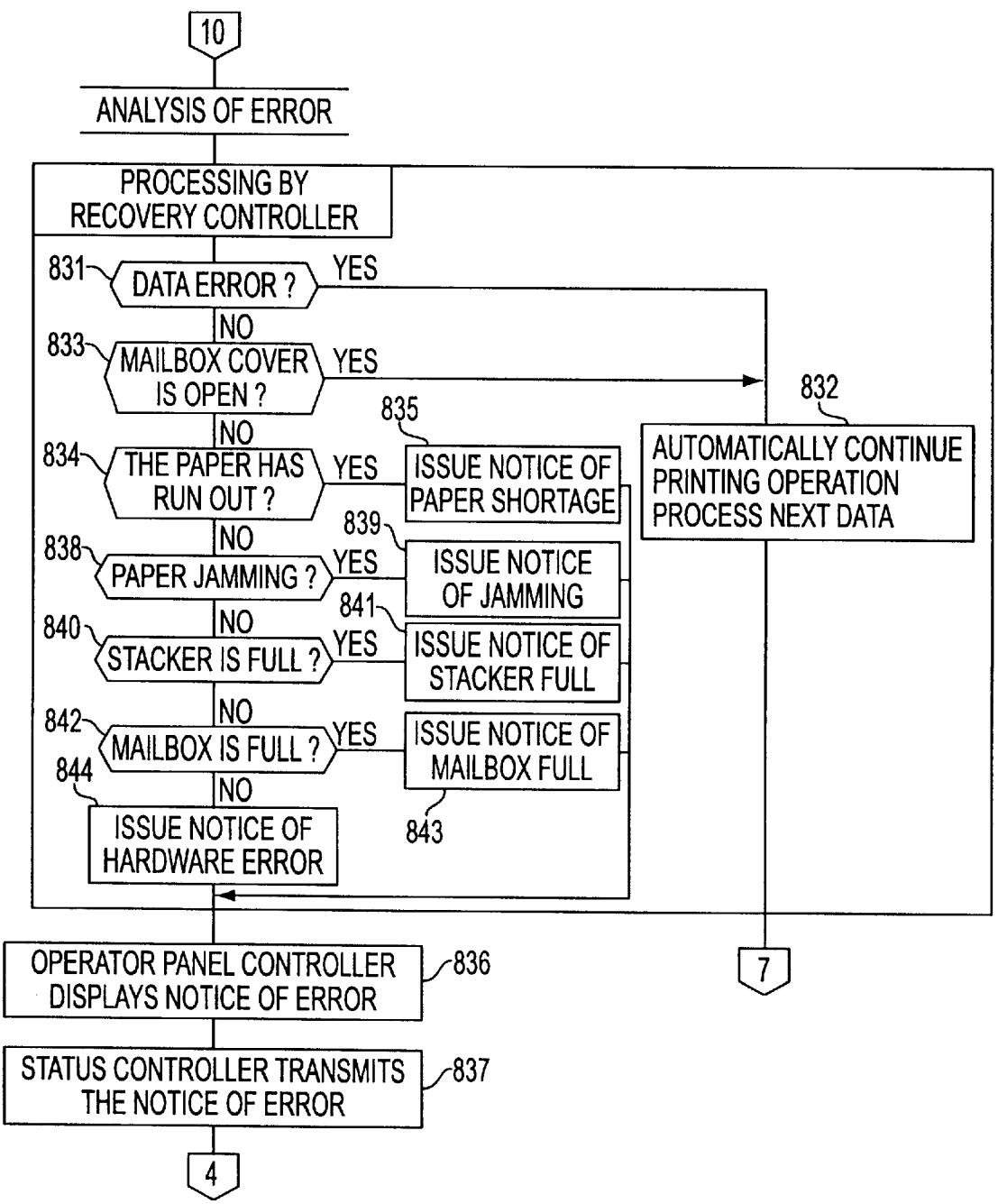

FIGS. 37 to 39 commonly show a flowchart of the processing by the printer controller 22.

The input/output controller 22-1 waits for the production of an event (Step 801), and when an event is produced, whether or not the event is a request for a response to an inquiry is judged (Step 802). If the answer is YES, the status controller 22-9 is started. The status controller 22-9 collects the information on (1) the state of the network printer apparatus 20 (outputs of various sensors), (2) the job which is being printed and (3) the job queue QUE (Step 803). The collected information is transmitted to the input/output controller 22-1. The input/output controller 22-1 supplies the received information to the communication controller 21-7 of the FEP 21 through the system bus. (Step 804)

If the answer is NO at the step 802, it is judged whether or not the event is a request for the information on the apparatus attributes (Step 805). If the answer is in the affirmative, the apparatus attribute controller 22-12 is started so as to judge what the request is (e.g., a request for setting, referring to or updating the apparatus attribute information) (Step 806). If the request is for setting or updating the information, the current information is replaced or updated by the apparatus attribute information supplied (Step 807), and a message that the setting or update of the information is finished is supplied to the input/output controller 22-1 through the system bus (Step 808). If the request is for reference, the apparatus attribute controller 22-12 collects the apparatus default in the environment information area 21d-1 on the DPRAM or the apparatus attribute information from the hard disk 24 (Step 809), and inputs the apparatus default or the apparatus attribute information to the input/output controller 22-1. The input/output controller 22-1 transmits the information to the communication response controller 21-7 of the FEP 21 through the system bus (Step 810).

If the event is not a request for the apparatus attribute information at the step 805, the printing data is processed. The input/output controller 22-1 takes the first job from the job queue which is stored in the RAM 22g (Step 811). The printing data is read out from the hard disk 24 at the address indicated by the disk address and stored in a first buffer of the buffering controller 22-2. If the first buffer becomes full, it is changed over to a second buffer so as to store the printing data. In this way, the first buffer and the second buffer are switched over to each other to store the printing data (Step 812). While the printing data is stored in one buffer, the emulation controller reads out the printing data which is stored in the other buffer, refers to the emulation designation data which is contained in the printing data, interprets and processes the printing data on the basis of the emulation (FM sequence, Japanese Postscript, SUN raster, or other emulations) designated by the data and inputs the result of processing into the image processor (RIP) 22-6 (Steps 813, 814).

The image processor 22-6 forms a dot image (unwinds the printing data) by using the result of interpretation and the font and the overlay read by the resource management controller 22-8, and the stores the dot image into the RAM 22g (Steps 815, 816). The engine controller 22-7 reads the image data of the dot image written in the RAM 22g by a raster scanning system, supplies the dot image to the engine so as to print (Step 817). If the printing operation is normal (Step 818), the printing processing at the steps 812 and thereafter is continued.

If the printing operation is finished without producing a printing error (Step 819), the input/output controller 221 supplies a message indicating the end of the printing operation and account information to the communication response controller 21-7 through the system bus of the FEP 21, and eliminates the job which has been printed from the printing job queue (820).

If the printing operation is not normally ended at the step 818, it means that an error is caused. The recovery controller 22-11 executes an error analysis. The data is first checked as to whether or not there is an error in the data (e.g., parity error) (Step 831). If there is a data error, the printing operation is automatically continued and the data at the next page is processed (step 832). The process is then returned to the step 812 to execute the subsequent processing.

If there is no data error at the step 831, whether or not the paper has run out is judged (Step 834). In the case of providing a mailbox mechanism as in the second embodiment, whether or not the cover of the mailbox is open is judged (Step 833), and if the cover is open, the processing at the step 832 and thereafter is executed.

If the paper has run out at the step 834, notice of paper shortage is issued (Step 835). The operator panel controller 22-10 displays the production of a data error (Step 836) and the status controller 22-9 transmits the notice of data error to the communication controller 21-7 of the FEP 21 through the input/output controller 22-1 (Step 837).

If the answer is NO at the step 834, whether or not there is paper jamming is judged (Step 838). If the answer is affirmative, a notice of jamming is issued (Step 839) and the processing at the step 836 and thereafter is executed. If the answer is NO at the step 838, whether or not the stacker is full is judged (Step 840). If the answer is YES, full stacker information is issued (Step 841) and the processing at the step 836 and thereafter is executed.

If there is a mailbox mechanism, whether or not the mailbox is full is judged (Step 842). If the answer is YES, full mailbox information is issued (Step 843) and the processing at the step 836 and thereafter is executed.

If the answer is NO at any of the steps 831 to 842, a notice of hardware error is issued (Step 844) and the processing at the step 836 and thereafter is executed.

The network printer apparatus described above has only the printer function, but a composite machine having a printer function and other functions such as facsimile-transferring, telephoning and copying functions is also defined as the network printer apparatus of the present invention.

In addition, although the network printer apparatus is provided with a server function in the first embodiment, it is possible to provide a network printer apparatus which is composed of a server connected to a LAN and having the server function for a printer, and a printer apparatus connected with the server.

The above-described embodiment of the present invention described above has the following advantages.

(1) Since the network printer is provided with a full-scale server function, it is possible to create an environment which can dispense with a PC/WS server. Therefore, a PC/WS server can be used for the intrinsic purpose of the server without deteriorating the performance due to the printing processing.

(2) Since the network printer apparatus is provided therein with a server function, it is possible to directly connect the network printer apparatus to Ethernet, which is a typical transmission path of a LAN network system. It is possible to connect the network printer apparatus at any place on the Ethernet. In other words, the network printer apparatus has an excellent portability.

(3) Since the network printer apparatus of the present invention is a printer for common use which is not connected to a PC/WS server, there is no limitation in the distance from a PC/WS server. A small space is therefore sufficient for the network printer apparatus. In other words, what is taken into consideration is only the area for installing the printer.

(4) Since the network printer apparatus is provided is a multiprotocol controlling function, a common connector has only to be provided between the network printer apparatus and a LAN irrespective of the communication protocol of the LAN. This is advantageous in the cost and, in addition, it is not necessary to prepare network printers in correspondence with various communication protocols. For example, even in a LAN network system in which both an environment of a UNIX server/client and an environment of Netware personal computers exist, the high-quality network printer can be utilized in common merely by connecting the connector to the LAN.

(5) Since the network printer apparatus has a center routine function, it is possible to ensure the safety of common use of the network printer in an open environment by the qualification checking mechanism. Furthermore, by using a banner page editing function, the sorting of the printed sheets is facilitated. By printing system information on the banner page, it is possible to improve the communication means to a user.

(6) The spooling function of the network printer apparatus can shorten the time which is required to request printing. As a result, the client can allot the remaining time to another operation, thereby enhancing the operation efficiency.

(7) Remote control of the printer and remote operation to provide the "spool" job from a client is possible.

(8) By using a menu exclusively for the network printer, the operability is improved. Since the menu exclusively for the network printer enables various commands to the printer to be automatically created by the operation of GUI or by Japanese, the special knowledge required in line command or the like is unnecessary.

Description of the embodiment provided with a mailbox.

A modified embodiment of a network printer apparatus according to the present invention differs from the aforedescribed first embodiment in that a mailbox mechanism is attached thereto.

Structure of mailbox mechanism

The mailbox mechanism is an apparatus exclusively for storing the paper (printed paper) discharged from the network printer apparatus 20. The mailbox contains 10 to 30 bins. One bin (a case for accommodating discharged paper) can accommodate about 100 sheets, and the number of bins constituting the mailbox is a multiple of 5 or 10. The function of the mailbox mechanism is storing the cut paper printed by the network printer apparatus in response to a request for printing from a client in the bin designated by the client. This function prevents the loss of the printed paper and facilitates the sorting of the printed paper. In addition, if each bin is used like a post-office box, the security is guaranteed.

Figure 40:
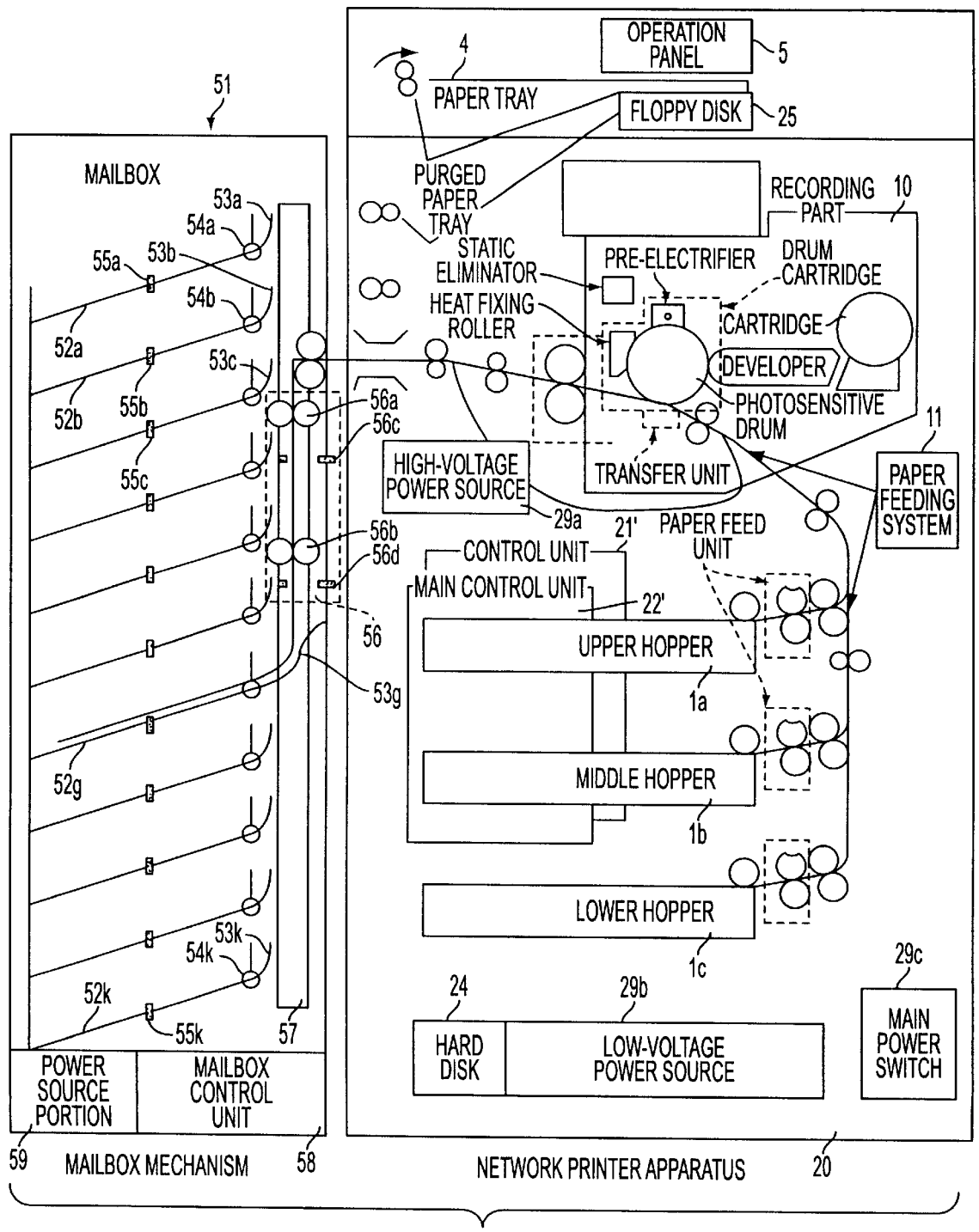
FIG. 40 shows a mailbox mechanism in conjunction with the network printer apparatus of the present invention.

FIG. 40 diagrammatically shows a mailbox in conjunction with the network printer apparatus 20. The same numerals are provided for the elements which are similar to those shown in FIGS. 6 and 7.

Reference numeral 51 denotes a mailbox. In the network printer apparatus 20, the reference numerals 1a to 1c represent cassettes (hoppers) for accommodating paper, 4 a stacker, 5 an operation panel, 10 a recording part (recording processing part), 11 a paper feeding system, 21' a board (control unit) with the FEP mounted thereon, 22' a board (main control unit) with the printer controller mounted thereon. 24 is the hard disk, 25 is the floppy disk, 29a a high-voltage power source for applying a high voltage to a pre-electrifier, the developer portion and the transfer electrifier, 29b a low-voltage power source for supplying a low voltage to the FEP 21 and the printer controller 22.

In the mailbox 51, reference numerals 52a to 52k denote bins for accommodating discharged paper, 54a to 54k rotating mechanisms which rotate paper introducing members 53a to 53k at the time of drawing discharged paper into the bins 52a to 52k, and 55a to 55k sensors provided at the bottoms of the respective bins so as to sense that the printed job (printed paper) is taken out. The reference numeral 56 represents a paper carrying block which is vertically movable while holding one sheet of discharged paper, and 57 a guide member for guiding the paper carrying block. The paper carrying block 56 is provided with a pair of paper feed rollers 56a, 56b and a pair of sensors 56c, 56d (e.g., optical sensors) for detecting paper jamming in the paper carrying block 56. In the state shown in FIG. 42, the paper introducing member 53g is rotated so as to open, and the paper carrying block 56 is positioned above the paper introducing member 53g so that paper is accommodated in the bin 52g.

The reference numeral 58 represents a mailbox control unit, and 59 a power source. The mailbox control unit 58 drives the rotating mechanism 54i of the bin 52i so as to open the paper introducing member 53i when the bin number i is designated by the network printer apparatus 20, and controls the position of the paper carrying block 56, thereby introducing, holding, moving, and discharging printed paper into the designated bin. The mailbox control unit 58 also has a function of transmitting the detection signal of each sensor to the network printer apparatus 20.

Structure of a bin.

Figure 41:
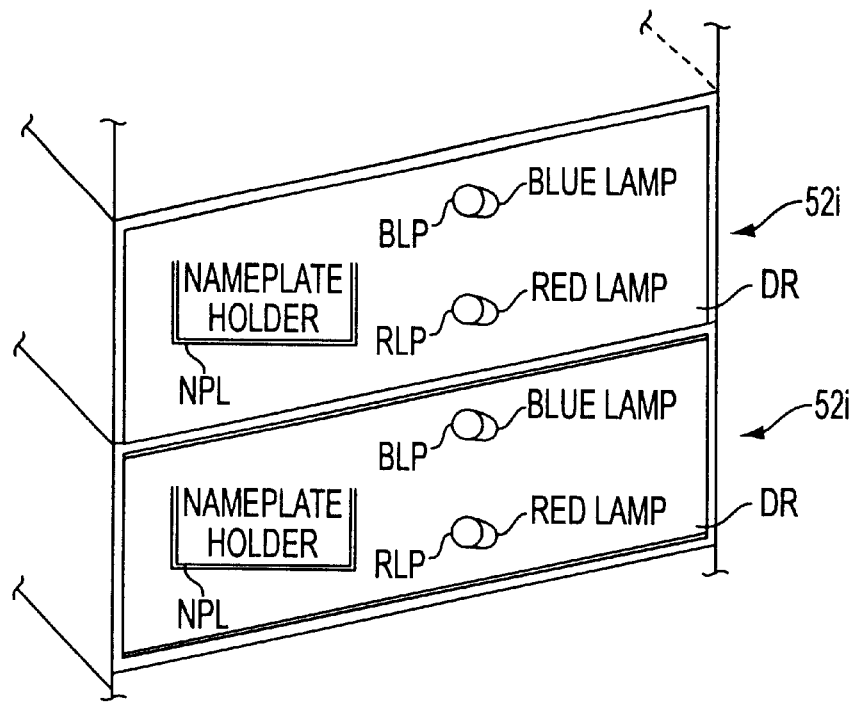
FIG. 41 shows a first embodiment of a bin with a cover closed.
Figure 42:
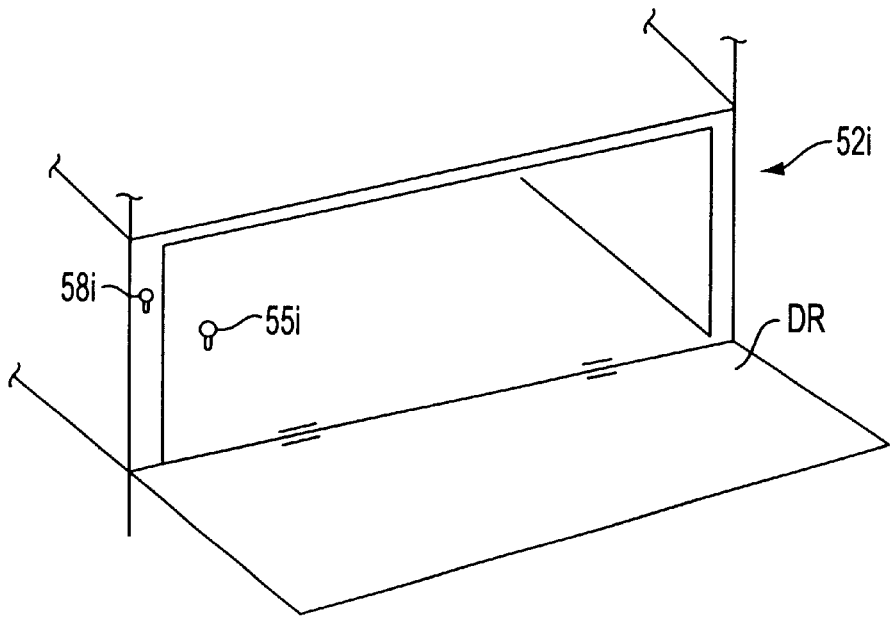
FIG. 42 shows a bin with a cover opened.

FIG. 41 is a perspective view of a bin with the cover closed and FIG. 42 is a perspective view of the bin with the cover opened. In FIGS. 41 and 42, the symbol DR denotes a cover of the bin which is freely opened and closed. A nameplate holder NPL, a blue lamp BLP and a red lamp RPL are provided on the surface of each cover. A sensor 55i which senses that the printed job (printed paper) is taken out, and a sensor 58i which detects the opening and closing of the cover are provided on each bin. When the cover is opened (printed paper is taken out), the printing operation is suspended.

A nameplate can be inserted into the nameplate holder NPL so as to enable the user of the bin to be identified. The nameplate prevents the printed job of another person from being taken out by mistake. If the blue lamp BLP is alternately on and off, it means that the job (paper) is being stored. If the lamp BLP is off, it means that the operation of the mailbox mechanism is normal and paper is not being stored. Accordingly, the user can take out the printed paper from the bin, when the blue lamp BLP is off. When the red lamp RLP is alternatively on and off, it indicates a trouble of the hardware. On the other hand, when the red lamp RLP is off, the operation of the mailbox mechanism is normal.

Although the nameplate holder NPL, the blue lamp BLP and the red lamp RPL are provided on the cover, they may be provided on the side surface of the bin instead. It is also possible to display various types of information by providing liquid crystal panels on the side surface of each bin.

Figure 43:
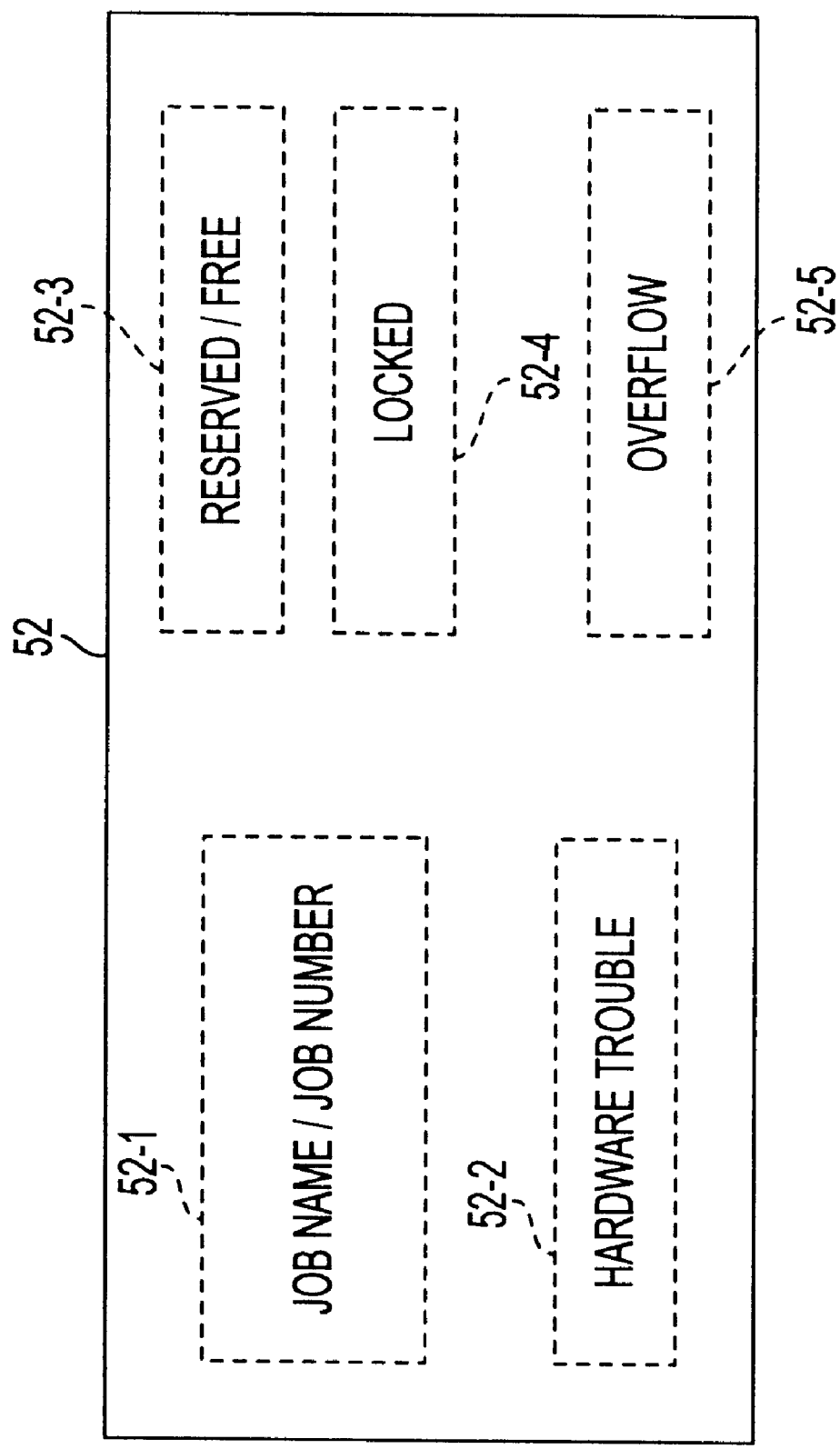
FIG. 43 diagrammatically shows liquid crystal panels on a bin of a second embodiment.

FIG. 43 shows another embodiment of a bin. In this embodiment, liquid crystal panels are provided on the side surface of the bin. The reference numeral 52-1 denotes a paper name/paper number display portion, 52-2 a hardware trouble display portion, 52-3 a reserved/free display portion, 52-4 a locking state display portion, and 52-5 an overflow display portion.

The paper name/paper number display portion 52-1 displays a paper number to be used or a user name, and the displayed characters are on and off while a paper is being stored. The hardware trouble display portion 52-2 displays the characters "Hardware trouble" and the displayed characters are switched on and off when a trouble in the hardware is caused. If no character is displayed, it means that the hardware is normal. The reserved/free display portion 52-3 displays the reserved or free state of the bin. If the characters "Reserved" are displayed, it means that the bin is reserved by a user. On the other hand, if the characters "Free" are displayed, it means that the bin is open or free without any reservation by a user. The locking state display portion 52-4 displays whether or not the bin is locked (with security). If the characters "Locked" are displayed, it means that the bin is locked (with security). On the other hand, if the characters "Locked" are not displayed, it means that the bin is not locked (without security). The overflow display portion 52-5 displays whether or not the bin overflows. If the characters "Overflow" are displayed, it means that the sheets of paper exceeds the permissible range of the bin. It is also possible to display a warning (not shown) that the number of sheets of discharged paper approaches the limitation of accommodation of the bin when the number of sheets accommodated in the bin reaches the predetermined value (80%) for warning.

The mailbox mechanism will be explained in the following on the assumption that liquid crystal panels are provided on each bin.

Figure 44:
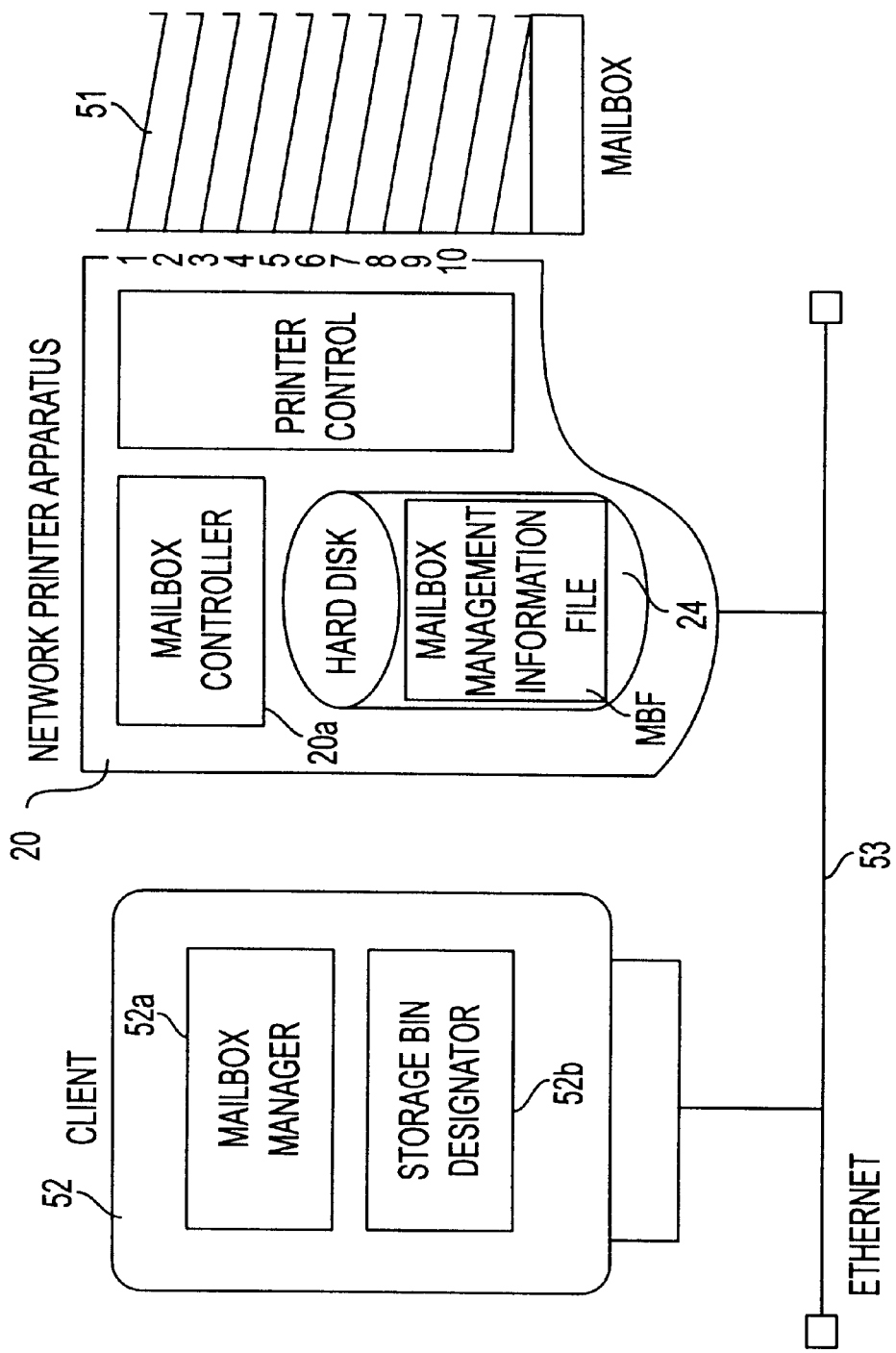
FIG. 44 diagrammatically shows a mailbox in conjunction with the printer apparatus, connected to Ethernet.

FIG. 44 shows the structure of a mailbox attached to the printer apparatus. In FIG. 44, the reference numeral 20 represents the network printer apparatus. 51 is the mailbox provided with a multiplicity of bins for accommodating discharged paper as a post-processing mechanism of the network printer apparatus, 52 is a client (PC/WS connected to a LAN environment), and 53 is a LAN such as Ethernet described above.

The reference numeral 52*a* denotes a mailbox manager, which is a software provided in the client 52 so as to manage the mailbox 51. The mailbox manager 52*a* has a function of informing a user of a method of using the mailbox 51, allotting a bin to a user, etc. The reference numeral 52*b* denotes a storage bin designator, which is a software for designating a bin in which discharged paper is to be stored. The reference numeral 20*a* denotes a mailbox controller, which is a software provided in network printer apparatus 20 so as to control the mailbox 51.

The symbol MBF denotes a mailbox management information file which is stored in the hard disk 24 provided in the network printer apparatus 20. The contents of the mailbox management information file MBF can be referred to and updated as desired by the system manager or a user by operating the client 52. The mailbox management information file MBF is operated under the control of the mailbox manager 52*a* of the client 52.

In this example, the mailbox management information file MBF is stored in the hard disk 24 provided in the network printer apparatus 20. Alternatively, it may be placed in the PC/WS having a file server function. It is also possible to take out necessary information from a server by a data communication procedure and store the information in the storage unit of the network printer apparatus 20.

FIG. 45 shows an example of the menu screen of the mailbox manager 52*a*. The mailbox manager 52*a* is composed of a software for registering, referring to, updating and eliminating management information in the mailbox management information file MBF, and has the following functions:

Operation in correspondence with the menu screen: A user is informed of a method of using the mailbox 51, allotting a bin to a user, etc. with reference to the menu screen.

Management of the number of bins and the order of allotting the bins for storing paper: the number of bins, an increase of the number of bins, removal of bins and the order of allotting the bins for storing paper (in a descending order or in an ascending order) are designated by using a menu 61.

Classification and management of attributes of a bin: The attributes such as (1) user name, (2) group name, (3) bin number, (4) free type (no user or group is designated) or not, (5) overflow type (bin which is prepared so as to store discharged paper when another bin becomes full) or not, etc. are attached to a bin.

The system manager inputs in a menu 64 the user name or the group name allotted to each bin, whether the bin is a free type or not, the password for preventing the bin from being opened by a wrong person, and whether the bin is an overflow type or not.

Setting of security attributes: Attributes for setting security and a security mode are attached to a bin in a menu 63. As the security mode, there are (1) password, (2) user ID, (3) smoky case and (4) key systems. The password system is a security mode which allows the cover of a bin to be opened only when the preset password is input. The user ID system is a security mode which allows the cover of a bin to be opened only when the preset user ID is input. The smoky case system is a security mode which keeps the contents of printing from sight by using a cloudy bin case. The key system is a security mode which uses a key. The password in the security mode is set in the menu 64.

Management of logging information: As the logging information, there are a list of bin allotment information, a list of job information stored in a bin, a list of a bin accommodation ratio and a list of error information. When the desired logging information is designated in a menu 62, and the outputting systems (systems of display, print and transfer, and the destination of transfer) are designated, the logging information is output by the designated system and managed.

Operation of the mailbox management information file MBF:

The system manager can manage the mailbox without limitation. For example, the system manager can freely allot bins, set the number of bins, output logging information, and set security. However, a user is allowed only to operate a part of information, set security, and the like. The mailbox manager 52*a* sets in advance the permissible range within which a user can operate.

Function corresponding to an increase in the number of bins:

With the increase in the number of bins, the management information is updated and the menu screen is customized. It is possible to register, refer to, update and eliminate management information to and from the mailbox management information file MBF, as occasion demands.

Software containing systems for designating a bin for storing discharged paper (storage bin designator).

Figure 46:
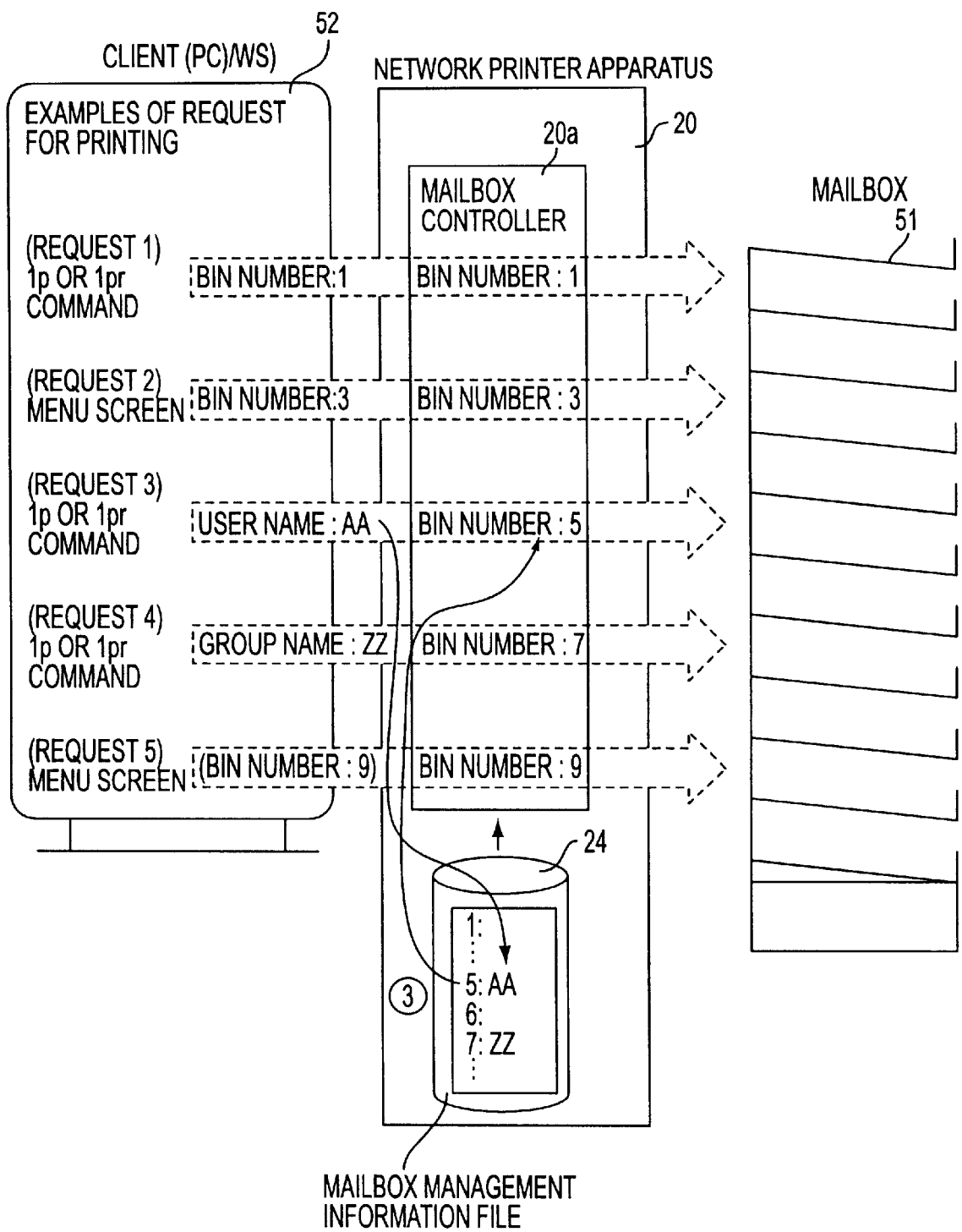
FIG. 46 shows commands for designating a bin in the mailbox for storing discharged paper.

There are two systems, i.e., a direct designation system and an indirect designation system for designating a bin in which the cut paper printed in the network printer apparatus 20 is to be stored. FIG. 46 shows these systems.

The direct designation system is a system for directly designating the number of the bin in the mailbox for storing paper by using a command for a request for printing (e.g., lp or lpr in UNIX). When the mailbox controller 20*a* receives the lp or lpr which designates the bin number from the client 52, the mailbox controller 20*a* so controls that the bin designated by the bin number stores printed paper. When a bin number is designated by the direct designation system, printed paper is stored in that bin even if the bin number is allotted to another user.

Figure 47:
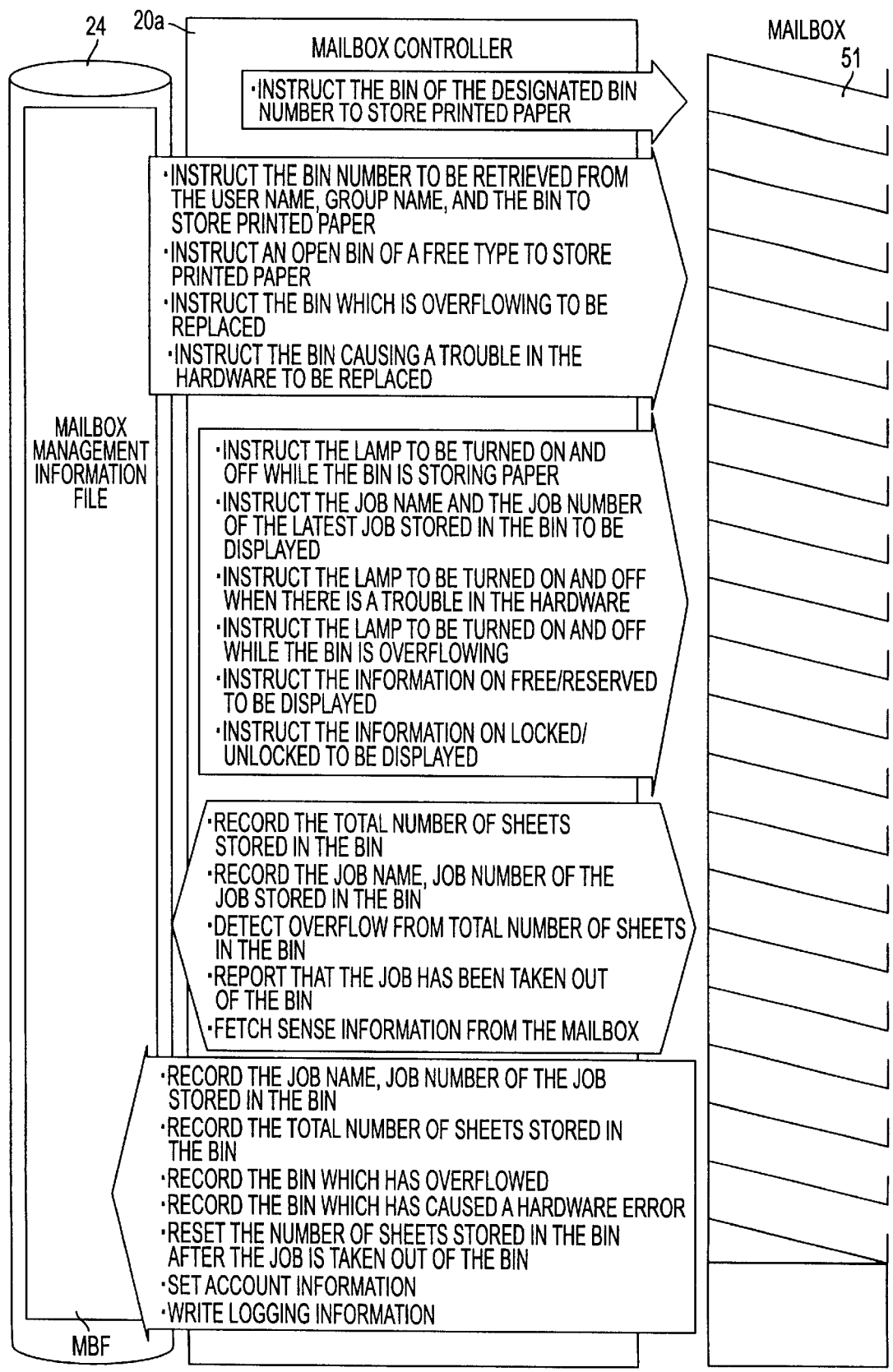
FIG. 47 diagrammatically shows functions of the mailbox controller for controlling the mailbox.

The indirect designation system is a system in which the correspondence between a user name or a group name and a bin is registered in the mailbox management information file MBF in advance, so that designation of the bin in the mailbox for storing paper is not necessary at the time of requesting printing. As shown in FIG. 47, the correspondence between a user name or a group name (AA, ZZ, ...) is registered in the mailbox management information file MBF in advance. The bin number is obtained from the user name or the group name which has requested printing with reference to the correspondence, and printed paper is stored in the bin designated by the bin number. The correspondence is registered (a bin is allotted) by using the menu 64 shown in FIG. 46 by the system manager. The storage bin designator 52b has a function of requesting printing by using the menu screen of the client, and transmits a command for a request for printing with the user name or the group name attached thereto.

Software for controlling the mailbox.

The software for controlling the mailbox (mailbox controller 20a) is a program operating in the FEP 21 of the network printer apparatus 20, and has a function of accessing the mailbox management information file MBF and a function of controlling the mailbox 51. FIG. 47 is an explanatory view of the functions of the mailbox controller 20a which has the above program.

The processes and the instructions of the mailbox controller 20a to the mailbox 51 are as follows:

Instructing the bin of the bin number designated by the direct designation system to store printed paper.

Deciding the bin number on the basis of the user name or the group name and instructing the bin of the bin number to store printed paper.

Deciding an open bin which can store paper and instructing the bin to store printed paper when the bins are free type (bins are not designated).

Deciding a spare bin for replacing the bin having a trouble and instructing the replacement.

Checking the total number of sheets of printed paper accommodated in the bin, detecting overflow and instructing the bin to be replaced at the time of overflow.

Instructing the bin to be replaced when a trouble is caused in the hardware.

Instructing the paper/user name and the paper/user number of the latest paper stored in the bin to be displayed on a liquid crystal panel of the bin (FIG. 44).

Instructing various types of information (user name or group name, paper name or paper number, reserved/free, overflow, locked/unlocked) to be displayed on liquid crystal panels so as to enable the state of the bin used to be clearly known or the bin having a trouble to be identified with easiness.

Instructing lamps to be turned on and off so as to identify the bin storing paper at a glance, detect a trouble in the hardware and detect overflow.

Processing at the time of taking a paper out of a bin.

Processing of fetching sensor information from the mailbox and process corresponding to the sensor information.

The mailbox controller 20a has a function of writing the paper storage information and various types of information supplied from the mailbox 51 into the mailbox management information file MBF. Such information includes:

Paper name, paper number or a user name stored in the bin.

Total number of sheets stored in the bin.

Record of the bin which has overflowed.

Record of the bin which has caused a hardware error.

Record of the operation of resetting the number of sheets stored in the bin after the paper has been taken out of the bin (recorded number of sheets: 0).

Account information.

Log information.

Security information.

(3) Collection of information

The mailbox controller 20a collects the information so as to display the bin information and the storage information.

The following information is collected so as to display the bin information.

Information for collectively displaying bin information.

Information for displaying the bin information corresponding to the user name or the group name.

Information for displaying the paper bin information corresponding to the paper number or the paper name.

Information on the bins of a free type.

Information on the bins replacing the bin which has overflowed (including information as to whether or not there is a bin which is overflowing).

The following information is collected so as to display the storage information:

Information for collectively displaying jobs stored in all the bins.

Information for displaying the paper stored in the bin corresponding to the user name or the group name.

Information for displaying the bin information corresponding to the paper number or the paper name.

Information for displaying the paper stored in the bin corresponding to the bin name.

Information for displaying the number of a bin of a free type and the paper stored in the bin.

Information for displaying the paper stored in a bin replacing the bin which has overflowed.

Figure 48:
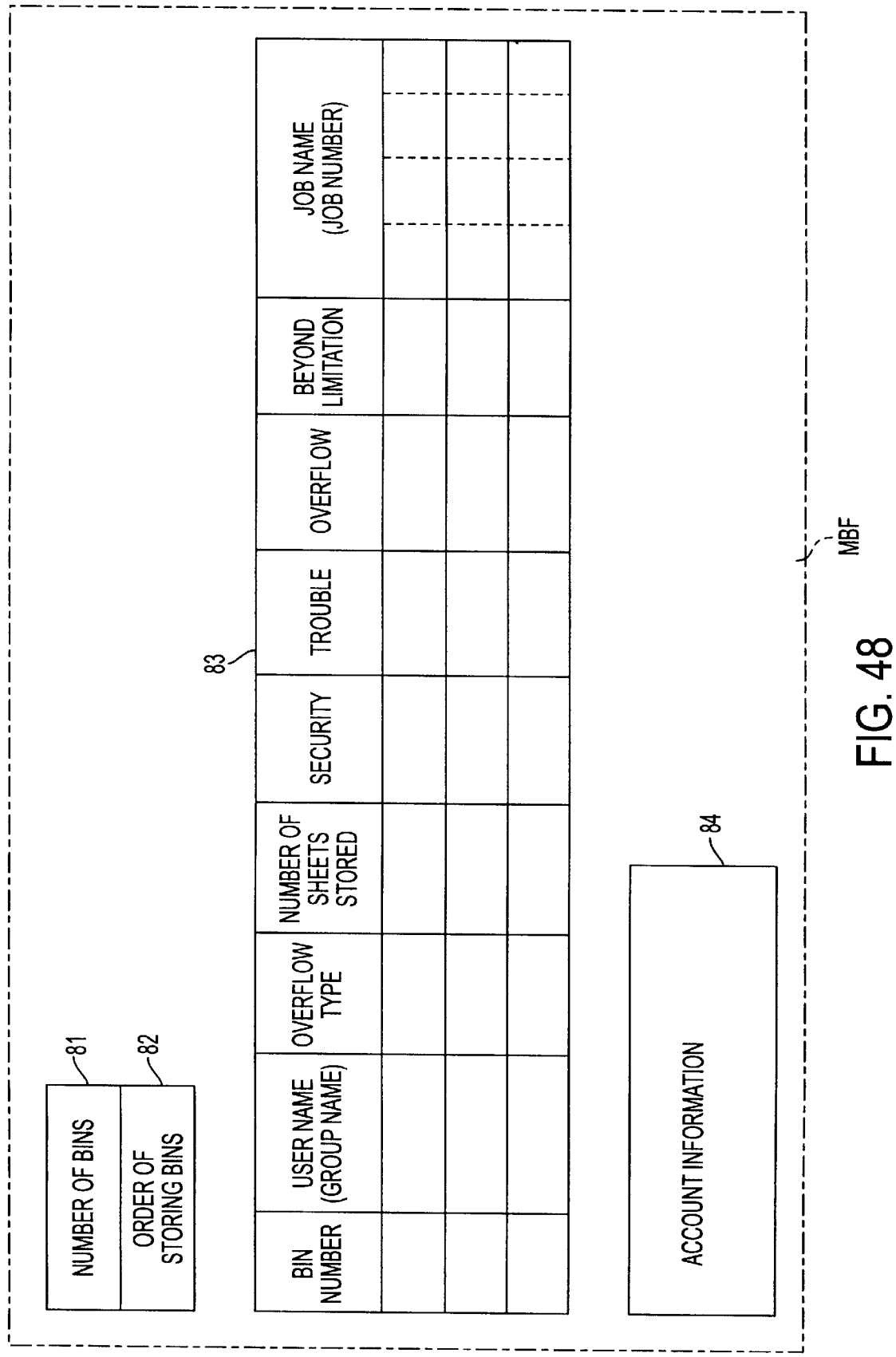
FIG. 48 shows the contents of the mailbox management information file.

FIG. 48 shows the contents of the mailbox management information file MBF.

The mailbox management information file MBF stores the number 81 of bins, the order 82 of allotting the bins for storing paper, the bin attributes 83, the account information 84, etc.

As the bin attributes 83, (1) user name (group name), (2) whether or not the bin is an overflow type, (3) total number of sheets stored, (4) security (locked/unlocked) and security mode, (5) whether or not there is a trouble in the hardware, (6) whether or not it has overflowed, (7) whether or not the preset limitation of accommodation is exceeded (8) job name/job number of at least one job accommodated in the bin, etc. are recorded in correspondence with each bin.

Control by the mailbox controller.

Figure 49:
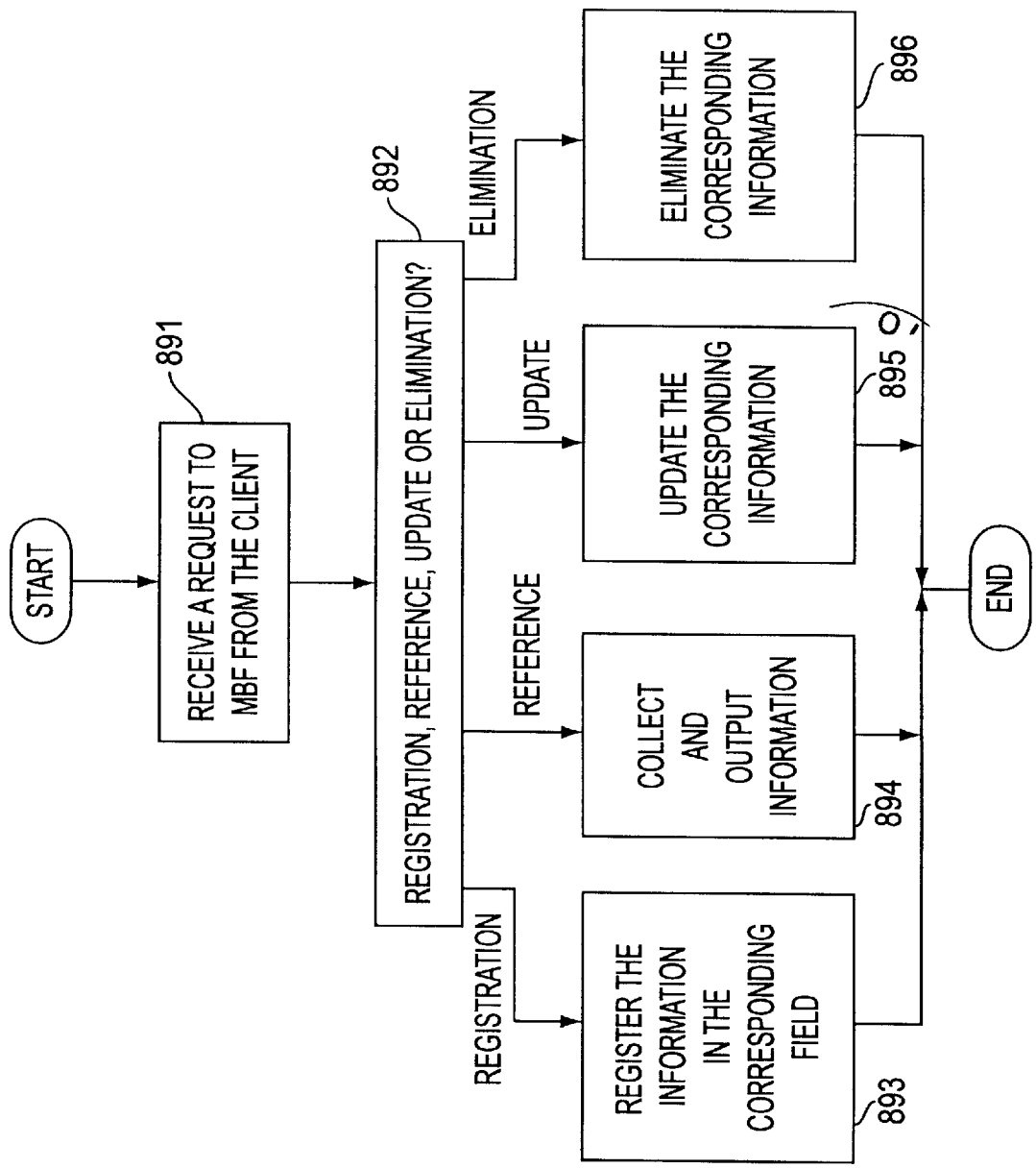
FIG. 49 is a flowchart of the processing of a request from a client.

The control of the registration to the mailbox management information file MBF will be explained in connection with FIG. 49 which is a flowchart of the processing steps of a request from the client 52.

When a request to the mailbox management information file MBF is supplied from the client 52 (Step 891), the mailbox controller 20a judges what the request is (e.g, request for the registration, reference, update or elimination of the information) (Step 892). Thereafter, the mailbox controller 20a registers the information at the corresponding field of the mailbox management information file MBF in the case of registration (Step 893), collects and outputs the required information in the case of reference (Step 894), updates the designated information in the case of update (Step 895), and eliminates the designated information in the case of elimination (Step 896).

Figure 50:
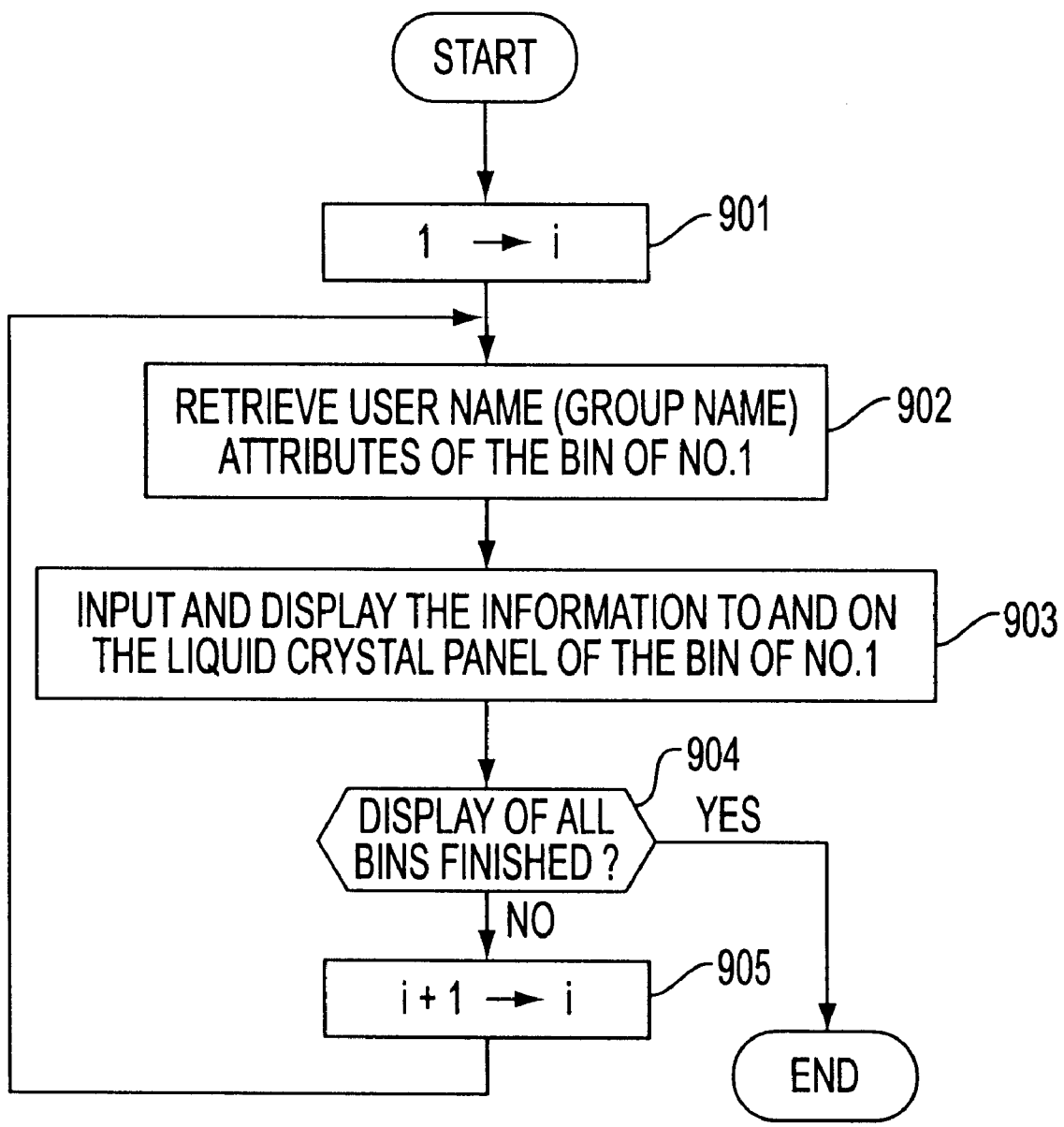
FIG. 50 is a flowchart of the processing for liquid crystal display.

FIG. 50 is a flowchart of the processing steps of the control process for the liquid crystal display.

When the power source is turned on, the mailbox controller 20a controls the display of liquid crystal panels of each bin. "i" is first set to 1 (Step 901). The user name or the group name of the bin number i is obtained from the mailbox management information file MBF and the bin attributes (hardware trouble, reserved/free, overflow, locked/unlocked, etc.) are collected (Step 902). These items of information are input to and displayed on the liquid panels of the bin designated by the bin number in (Step 903). Whether or not the displaying operation has been finished in all bins is then judged (Step 904). If the answer is NO, "the number i" is increased by 1 (Step 905), and the processing at the step 902 and thereafter is executed.

Figure 51:
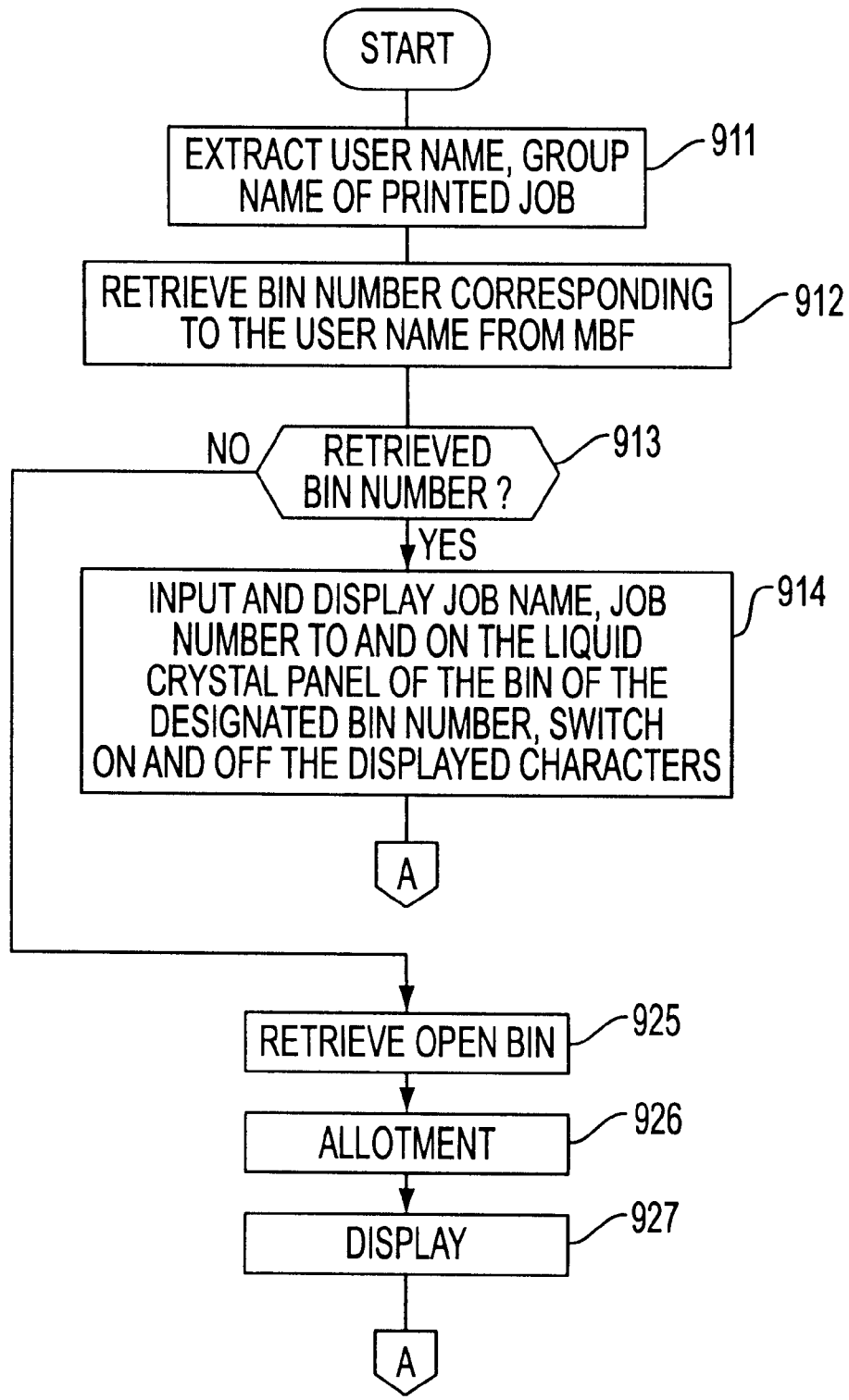
FIGS. 51 and 52 show a flowchart of the processing of deciding the bin for storing printed paper and displaying the process.
Figure 52:
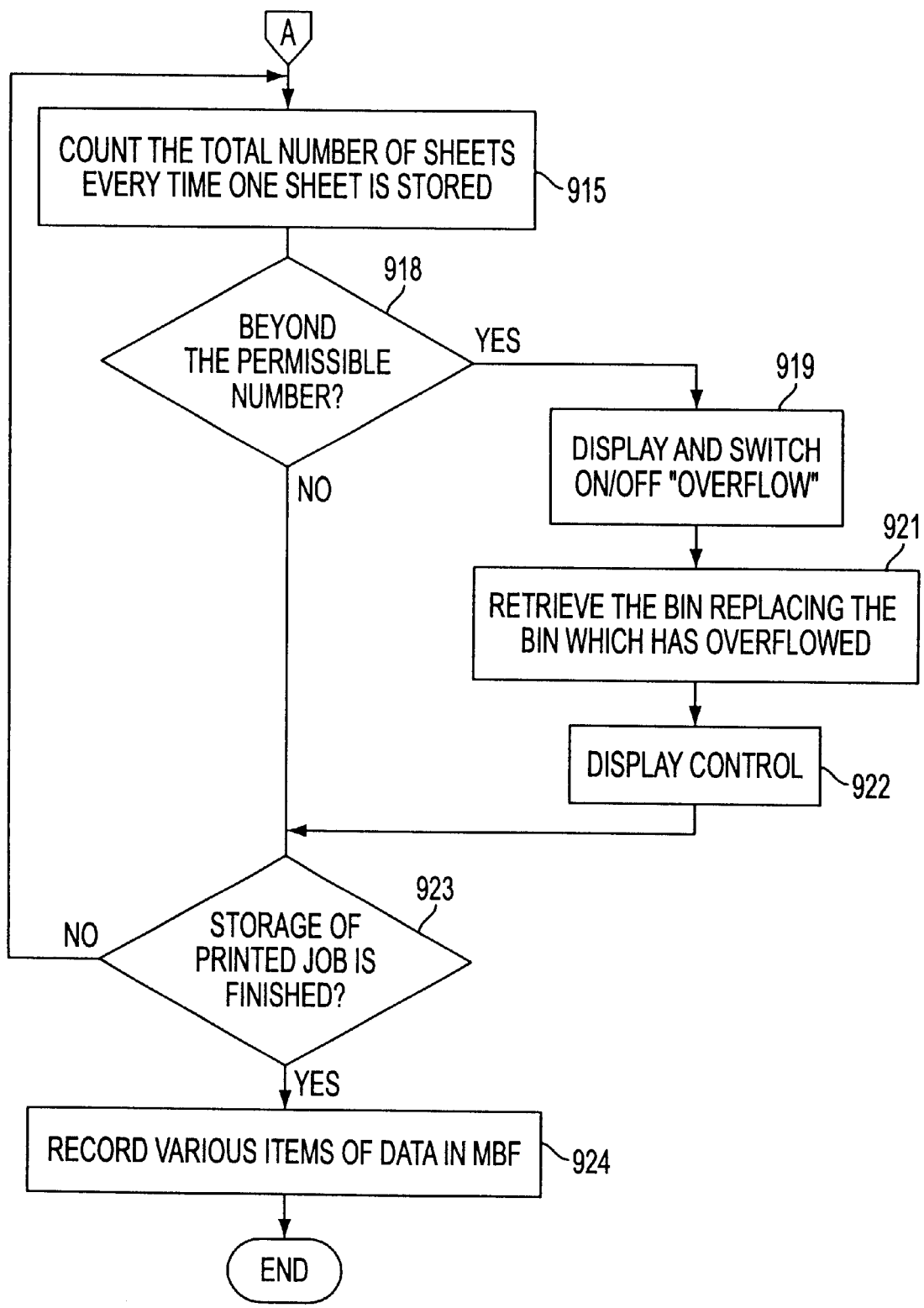

FIGS. 51 and 52 show a flowchart of the processing steps of deciding a bin storing a printed paper and displaying it. It is here assumed that the bin number is designated by the indirect designation system.

In order to print the data having the highest priority, the mailbox controller 20a extracts the user name or the group name included in the printing data on the paper (Step 911), and retrieves the bin number corresponding to the user name or the group name from the mailbox management information file MBF (Step 912).

If the bin number has been retrieved (Step 913), the paper name and the paper number are input to and displayed on the liquid crystal panel and the displayed characters are switched on and off (Step 914).

Every time one printed sheet is stored in the bin, the total number of sheets stored in the bin is counted (Step 915), and whether or not the permissible number of sheets is exceeded is judged (Step 918). If the answer is in the affirmative, the characters "Overflow" are displayed and switched on and of on the liquid crystal panel (Step 919).

A bin replacing the bin which has overflowed is then retrieved and the remaining printed paper is accommodated in the retrieved bin (Step 921). The paper name is continuously switched on and off on the bin which has overflowed, and similar display control to the control at the step 914 is executed on the liquid crystal panel of the bin which has replaced the bin (Step 922).

Thereafter, judgement is made as to whether or not the storage of the printed paper is finished (Step 923), and if the answer is in the negative, the processing at the step 915 and thereafter is executed.

If the printing operation is finished, the mailbox controller 20a writes information such as the job number/job name of the job stored in the bin, the total number of sheets stored in the bin, the number of the bin which has overflowed, and the number of the bin which has caused a hardware error in the mailbox management information file MBF (Step 924).

If the bin number is not found at the step 913, an open bin is retrieved from the bins (Step 925) and allotted to the printed paper (Step 926). The attributes of the open bin are obtained and the attributes, the paper name/paper number and the user name/group name are input to and displayed on the liquid crystal panels of the open bin. The displayed paper name/group name are switched on and off so as to indicate that printed paper is being stored in the bin (Step 927), and the processing at the step 915 and thereafter is executed.

Control of the operation of the safety mechanism of the mailbox.

If paper is to be taken out of the bin in the process of storage of printed paper in the same bin, the operation of taking out the paper is conducted preferentially and the storage of the paper is suspended until the operation is finished. The storage of the paper in the bin is resumed when sensor information that the cover of the bin is closed is supplied together with the information that the bin is vacant.

Figure 53:
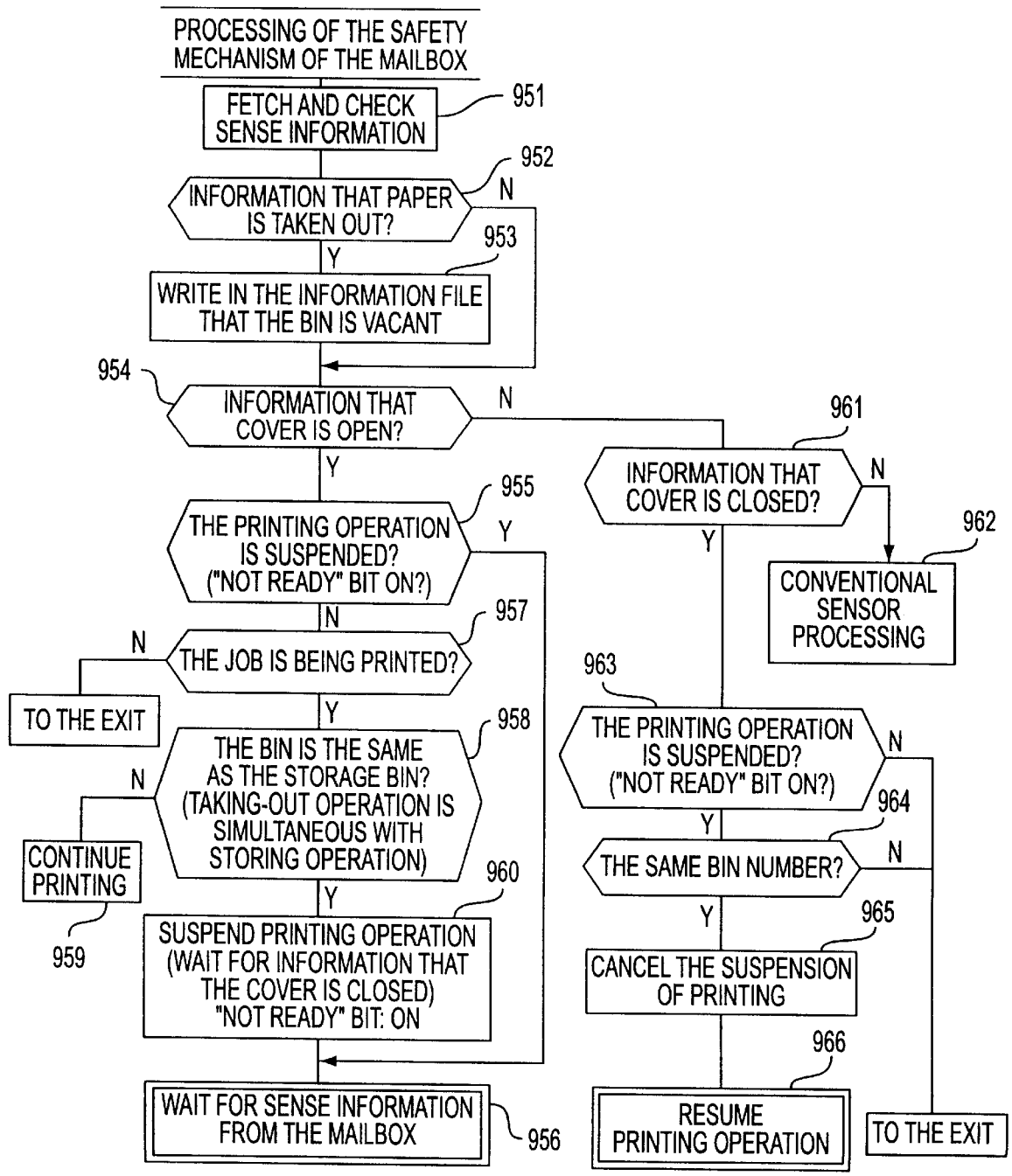
FIG. 53 is a flowchart of the processing by a safety mechanism of the mailbox.

FIG. 53 is a flowchart of processing steps performed by the safety mechanism of the mailbox.

When sensor information is issued, the mailbox controller fetches and checks the information (Step 951). The sensor information includes information as to whether the cover is open or closed, whether cut paper is taken out and detection of jamming. The sensor information is input together with the relating bin number.

It is then judged whether or not the sensor information reports that cut paper is taken out (Step 952). If the answer is YES, the fact that the paper has been taken out is recorded in the bin attribute field of the corresponding bin number in the mailbox management information file MBF (for example, the number of sheets is reset to 0) (Step 953).

Whether or not the sensor information reports that the cover is open is judged (Step 954), and if the answer is YES, judgment is made as to whether or not the printing operation is suspended, that is to say, whether temporary print half bit is on or off (Step 955).

If the answer is in the affirmative (the temporary print half bit is on), sense information from the mailbox is waited for (Step 956). This state is the state in which the cover is opened during the printing operation so that the printing operation is suspended. Therefore, when the cover is closed, the printing operation is resumed and the printed paper is stored again.

If the printing is not suspended at the step 955, whether or not the information is being printed is judged (Step 957). If the answer is in the negative, another processing is executed. On the other hand, if the answer is in the affirmative, it is judged whether or not the bin with the cover opened agrees with the bin which is storing paper (Step 958). If the answer is NO, the printing operation is continued. If the answer is YES, it means that the cover of the bin which is storing paper is opened during the printing operation. The printing operation is therefore suspended and the temporary print half bit becomes "1" (Step 960). Thereafter, sensor information from the mailbox reporting that the cover is closed is waited for (Step 956).

If the sensor information at the step 954 does not indicate that the cover is open, judgment is made as to whether or not it indicates that the cover is closed (Step 961). If the answer is NO, the information reports of jamming or other event, so that conventional sensor processing is executed (962).

If the sensor information indicates that the cover is closed at the step 961, judgment is made as to whether or not the printing operation is suspended (Step 963). If the printing operation is suspended, judgment is made as to whether or not the bin with the cover closed agrees with the bin which has suspended storing paper (Step 964). If the answer is YES, the suspension of printing is cancelled (Step 965) so as to resume the printing operation (Step 966). If the answer is NO at the steps 963 and 964, another processing is executed.

Advantages of the second embodiment.

Use of the mailbox mechanism facilitates the sorting of cut paper and reduces the sorting labor. In the common use of the network printer, since printed paper is stored in the bin corresponding to a user, it is possible to prevent the loss or scatter of printed paper. In addition, a security mode which keeps the contents of printing from sight can be utilized. Since the menu exclusively for the mailbox is prepared, it is possible to instruct the mailbox and to receive various types of information service through the menu written in a predetermined language such as Japanese.

Although the network printer apparatus is provided with a server function in the second embodiment, it is possible to provide a network printer apparatus which is composed of a server connected to a LAN network system and having the server function for a printer, and a printer apparatus connected with the server.

Applications of a network printer apparatus of the invention.

Figure 54A:
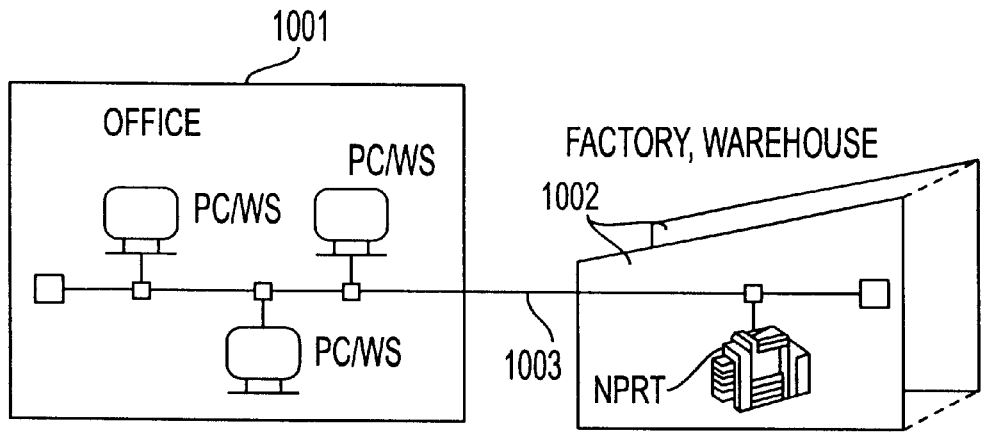
FIGS. 54a and 54b show applications of the network printer apparatus of the present invention.
Figure 54B:
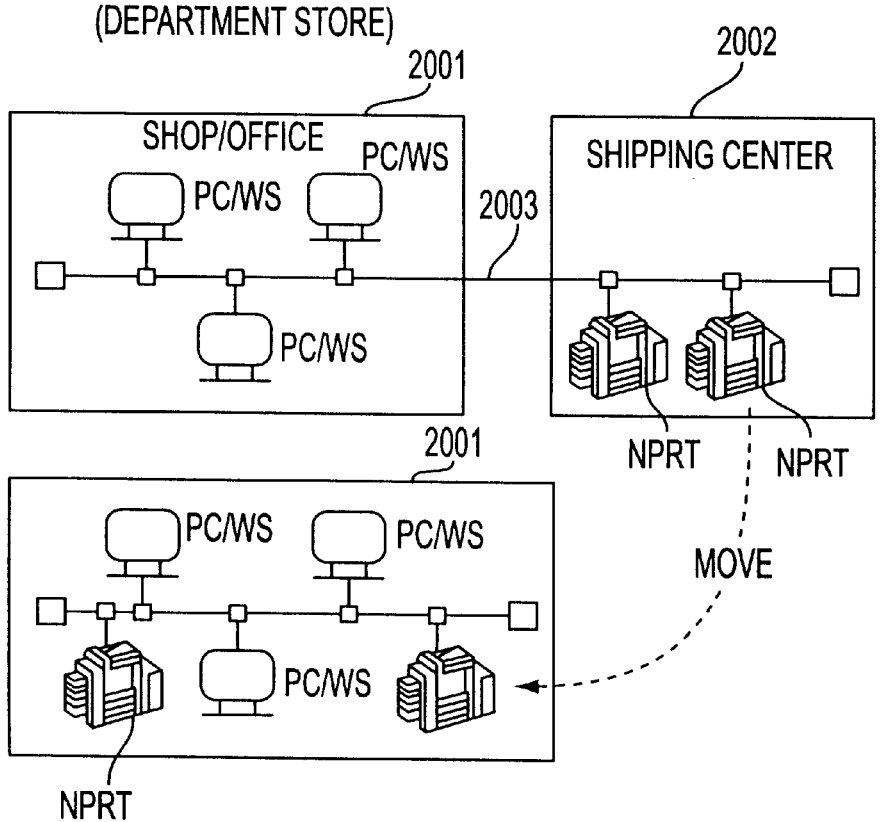

FIGS. 54a and 54b show applications of the network printer apparatus according to the present invention.

In the application form shown in FIG. 54a, the network printer apparatus is applied to a manufacturing industry. An office 1001 and each factory and warehouse 1002 are connected by a LAN cable 1003. PCs/WSs are connected to the LAN cable 1003 in the office 1001, and the network printer apparatus NPRT of the present invention is connected to the LAN cable 1003 in each factory and warehouse 1002. Alternatively, it is possible to provide the network printer apparatus NPRT in the office 1001 and to provide PCs/WSs in each factory and warehouse 1002 (this form is not shown). The network printer apparatus NPRT has a LAN adapter function and can be installed at any place. Therefore, when offices, factories and warehouses are distant from each other in a wide site, if the LAN system shown in FIG. 55a is provided, it is possible to distribute slips and the like by printing them by the network printer apparatus NPRT in each factory and warehouse upon request for printing from each PC/WS (client) of the office. In this case, since the network printer apparatus need not be connected to a server, it is possible to reduce the space for installing the network printer apparatus. In addition, it is possible to monitor the state of the network printer apparatus NPRT in each factory and warehouse or to operate the network printer apparatus NPRT from the office.

In the application form shown in FIG. 54b, the network printer apparatus is applied to a large retail establishment such as a department store. Each shop/office 2001 and a shipping center 2002 are connected by a LAN cable 2003. PCs/WSs are connected to the LAN cable 2003 in each shop/office 2001, and the network printer apparatus NPRT of the present invention is connected to the LAN cable 2003 in the shipping center 2002. Alternatively, it is possible to provide the network printer apparatus NPRT in each shop/office 2001 and to provide PCs/WSs in the shipping center 2002 (this form is not shown). Owing to this LAN system, it is possible to collectively output a large number of slips issued at each shop/office 2001 from the network printer apparatus NPRT in the shipping center 2002. The network printer apparatus NPRT has a LAN adapter function and can be installed at any place. It is therefore possible to move the network printer apparatus NPRT to each shop/office 2001 to print slips there only at the time of a midyear sale and a year-end sale and to move the network printer apparatus NPRT to a necessary place when it is not used in the shop/office 2001.

The present invention of the first embodiment has the following advantages:

(1) a network printer apparatus has a printing mechanism which can be directly connected to the communication path (e.g., Ethernet) of a LAN in an environment within a LAN network;

(2) a network printer apparatus corresponds to a LAN which is composed of an FEP (Front End Processor) having a full-scale server function and a LAN communication function and a RIP (Raster Image Processor);

(3) a network printer apparatus has an FEP which includes a mechanism of a combination of LAN driver controller, LAN interface driver control, a conversation (inquiry, response) controller between the client and the network printer apparatus, communication control between the FEP and the RIP, and spooling control of printing data;

(4) a network printer apparatus uses a communication system which is a combination of a communication through spool and a communication through a memory bus as the communication system between the FEP and the printer controller;

(5) a network printer apparatus is provided with a function of holding account information in accordance with the job printed;

(6) a network printer apparatus has a printing mechanism provided with reception examination function as a center routine function;

(7) a network printer apparatus has a function of adding and editing the data on a banner page as a center routine function;

(8) a network printer apparatus is provided with the center routine function which can be changed or to which addition is possible as well as a system standard function;

(9) LAN network system has menus written in a multiplicity of languages which can control the network printer apparatus and which are installed on the client;

(10) LAN network system has the first software for controlling the network printer apparatus and the second software for communicating directly between the client and the network printer apparatus not through a server;

(11) LAN network system has a function of setting, referring to or updating the structure definition information of the network printer apparatus on a menu screen in accordance with digital or analog information;

(12) LAN network system has a function of displaying the amount of remaining supply resources such as the paper remaining in the hopper or in a large-capacity hopper and toner as analog information, and displaying the amount of paper accommodated in the hopper or large-scale hopper and the amount of paper stored in the mailbox as analog information;

(13) a network printer apparatus has a function of displaying the job queue information, job status (waiting for printing, during printing, during holding, etc) and the usage ratio of the printer as the and a function of changing the printing attributes (paper size, selected hopper, both-side/single-side printing, printing format such as portrait and landscape) and the priority in the job queue;

(14) LAN network system has a function of outputting the account information of the network printer apparatus to an external storage medium (floppy disk, etc), displaying it on the display unit of a client or printing it by the network printer apparatus by the designation of a menu screen;

(15) LAN network system has a function of directly displaying a notice of trouble such as shortage of paper and trouble in the hardware caused in the network printer apparatus on the menu screen of the client and instructing reprinting;

(16) LAN network system has a function of downloading the program of the center routine function control through the menu screen;

(17) a network printer apparatus is provided with a mailbox management information file aimed at controlling, using and managing the mailbox and a software used for managing the mailbox management information file;

(18) a network printer apparatus is provided with the function of the mailbox management information file which is held in the hard disk or the storage unit and from which or into which data is read or written in response to the request from the client;
(19) LAN network system has a function of supplying the information such as the end of printing and hardware error from the network printer apparatus to the client by the original communication protocol of the network printer apparatus;
(20) a network printer apparatus has a function of storing various items of resource information such as the font and the form overlay which are downloaded from the client into the network printer apparatus by holding and managing them in the hard disk or the storage unit through the file managing function;
(21) a network printer apparatus is provided with a software for realizing a common use of the network printer apparatus in a mixed environment of a LAN network in which UNIX and PCs exist, in order to realize multiprotocol function the software having task for receiving packet data, identifying the communication protocol and distributing the data in accordance to the identified protocol, task for processing TCP/IP protocol, IPX/SPX protocol and task for processing Ethertalk protocol;
(22) a network printer apparatus has a function of controlling the reception of printing data to the network printer apparatus as a center routine control function;
(23) a network printer apparatus has a function of adding and editing information for a banner page as a center routine control function;
(24) a network printer apparatus has a function of controlling the number of printable pages in response to a request for printing as a center routine control function;
(25) a network printer apparatus has a function of checking a qualification of the client in response to a request for printing as a center routine control function;
(26) a network printer apparatus has a function of monitoring the holding time designated to a predetermined printing data which has required to be printed and post-processing the printing data after the elapse of the holding time without cancellation of the held as a center routine control function;
(27) a network printer apparatus has a mailbox as a post-processing mechanism for cut paper of the printer apparatus which is composed of a software for managing the mailbox, a software for controlling the storage of the printed cut paper in the mailbox and a hardware of the mailbox;
(28) a network printer apparatus has the mailbox is used and managed through the mailbox management information file;
(29) a network printer apparatus has a function for allotting a bin of the mailbox in accordance with the following:
allotment based on the user name
allotment based on the group name
allotment based on the bin number
allotment to an open bin
allotment to another bin when the allotted bin is full;
(30) a network printer apparatus has a function for selecting the order of allotting bins for storing paper from an descending order and an ascending order;
(31) a network printer apparatus has a function for setting the security system to the mailbox following:
password system
user ID system
smoky case system
key system;
(32) a network printer apparatus has a function for holding the following logging information so as to manage the mailbox:
a list of bin allotment information
a list of job information stored in a bin
a list of error information
a list of a bin accommodation ratio;
(33) a network printer apparatus has a mailbox, in which the following information is displayed on the side surface of a bin so as to inform of the user thereof:
job number of the job accommodated in the bin
the name of the user who is using the bin
the name of the group who is using the bin;
(34) a network printer apparatus has a mailbox, in which the following information is displayed on the side surface of a bin by a lamp or the like so as to inform of the state of use thereof:
used/unused
locked/unlocked (security)
overflow
during storage
(35) a network printer apparatus has a mailbox, in which the following displaying means is provided on each bin
liquid crystal panel
lamp
handwritten nameplate
(36) a network printer apparatus has a safety mechanism of the mailbox for suspending the storage processing when a user is taking out a job (paper) from the same bin;
(37) a network printer apparatus has a direct designation system for directly designating a bin number and an indirect designation system for storing paper in the bin registered in the mailbox management information file in correspondence with the user name or the group name;
(38) a network printer apparatus has a function of accessing the mailbox management information file through the software installed on the client, the mailbox management information file containing an access processing function item, a mailbox controlling function item and a managing function item;
(39) a network printer apparatus according to (38) is provided, in which the access processing function item having functions of:
retrieving and allotting the bin number for storage on the basis of the user name or the group name
retrieving an allotting an open bin which can store paper when client does not designate a bin for storing paper;
(40) a network printer apparatus according to (38), in which the mailbox controlling function item having functions of:
checking the total number of sheets stored in the bin and overflowing
designating the bin number for storing printed cut paper instructing the bin to be replaced when a trouble is caused instructing the job name and the job number of the latest job stored in the bin to be displayed on the displaying means of the bin instructing displayed characters on the bin to be turned on and off so as to detect a trouble in the bin with easiness

(41) a network printer apparatus according to (38), in which the managing function item having functions of:

recording the job name, the job number or the user name of the job stored in the bin in logging information displaying the user name of the bin and the bin attributes displaying information of the job stored in the bin;

(42) a network printer apparatus has a mailbox, in which the mailbox has the functions of:

displaying storage information on a liquid panel of each bin;

issuing sensor information when storage of the number of sheets stored in a bin reaches a predetermined value;

reporting that the paper is taken out of a bin;

suspending storage when the paper is taken out of the same bin displaying and switching on and off the bin number which is in the process of storing;

(43) a network printer apparatus according to (42) is provided, wherein the liquid crystal panels display the state of the mailbox in the form of:

printing job number, printing job name or user's name hardware error reserved/open storing overflow;

(44) a network printer apparatus according to (43), has a function of displaying the user's name by using a nameplate holder;

(45) a network printer apparatus according to (43), has a function of displaying the state of a bin and the hardware by turning on or switching on and off the lamps:

displaying a hardware error by turning of a red lamp displaying a bin which is storing paper by switching on and off a blue lamp on the bin;

(46) a network printer apparatus provided with a mailbox, has a function of preferentially executing the operation of taking paper out of the mailbox by suspending the printing operation until the end of the former operation when a sensor detects the operation of taking out paper;

(47) a network printer apparatus has a mailbox, in which there are two systems of fetching sensor information as an event supplied from the hardware of the mailbox, one of them is fetching sensor information on each bin when an event is caused and another is fetching sensor information on each bin when the cover is closed;

(48) a system is obtained of using the mailbox without using the mailbox management information file by:

storing paper in the bins in the network printer apparatus in the order of requests for printing, suspending the printing operation (the network printer apparatus is in the "Not Ready" state) when jobs are stored in all bins and waiting for at least one bin to become vacant, and resuming the storage of paper in a bin when the job is taken out of the bin (the bin becomes vacant) and the network printer apparatus assumes the "Ready" state;

(49) a network printer apparatus has a function of collecting data on the printing date, printer apparatus name, user name, job name, job number, number of pages to be printed, paper size, etc. in the network printer apparatus as account information;

(50) a network printer apparatus has functions of transferring account information to another client, displaying the account information, printing the account information and a backup function to an external storage medium (3.5-inch floppy, etc.);

(51) a network printer apparatus has a function enabling data to be converted, checked or changed as a filter control function; and

(52) a network printer apparatus has a function of adding and changing the filter control function which is provided in the network printer apparatus from an external storage medium (3.5-inch floppy, etc.) or another client.

As many apparently widely different embodiments of the present invention can be made without departing from the spirit and scope thereof, it is to be understood that the invention is not limited to the specific embodiments thereof except as defined in the appended claims.

As described above, according to the present invention, since the network printer is provided with a full-scale server function, it is possible to create an environment which can dispense with a PC/WS server. Therefore, a PC/WS server can be used for the intrinsic purpose of the server without deteriorating the performance due to the printing processing.

Since the network printer apparatus of the first embodiment is provided with a server function, it is possible to directly connect the network printer apparatus to Ethernet, which is a typical transmission path of a LAN. It is possible to connect the network printer apparatus at any place on the Ethernet. In other words, the network printer apparatus has an excellent portability.

Since the network printer apparatus of the above-described embodiment of the present invention is a printer for common use which is not connected to a PC/WS server, there is no limitation in the distance from a PC/WS server. A small space is therefore sufficient for the network printer apparatus. In other words, what is taken into consideration is only the area for installing the printer.

Since the network printer apparatus is provided with a multiprotocol controlling function, a common connector has only to be provided between the network printer apparatus and a LAN irrespective of the communication protocol of the LAN. This is advantageous in the cost and, in addition, it is not necessary to prepare network printers in correspondence with various communication protocols. For example, even in a LAN network in which both an environment of a UNIX server/client and an environment of Netware personal computers exist, the high-quality network printer can be utilized in common merely by connecting the connector to the LAN.

Since the network printer apparatus has a center routine function, it is possible to ensure the safety of common use of the network printer in an open environment by the qualification checking mechanism. Furthermore, by using a banner page editing function, the sorting of the printed sheets is facilitated.

By printing the system information on the banner page as information, it is possible to improve the communication means to a client.

The spooling function of the network printer apparatus can shorten the time it has conventionally taken a client to request printing. As a result, the client can allot the remaining time to another operation, thereby enhancing the operation efficiency.

In addition, according to the present invention, remote control of the printer and the queueing job from a client are possible.

By using a menu exclusively for the network printer, the operability is improved. Since the menu exclusively for the network printer enables various commands to the printer to be automatically created by the operation of GUI or by a predetermined language such as Japanese, the special knowledge required in line command or the like is unnecessary.

Furthermore, use of the mailbox mechanism facilitates the sorting of cut paper and reduces the sorting labor.

In the common use of the network printer, since printed paper is stored in the bin corresponding to a user, it is possible to prevent the loss or scatter of printed paper.

In addition, a security mode which keeps the contents of printing from sight can be utilized.

Since the menu exclusively for the mailbox is prepared, it is possible to instruct the mailbox and to receive various types of information service through the menu written in a predetermined language such as Japanese.

Description of the second embodiment.

Figure 55:
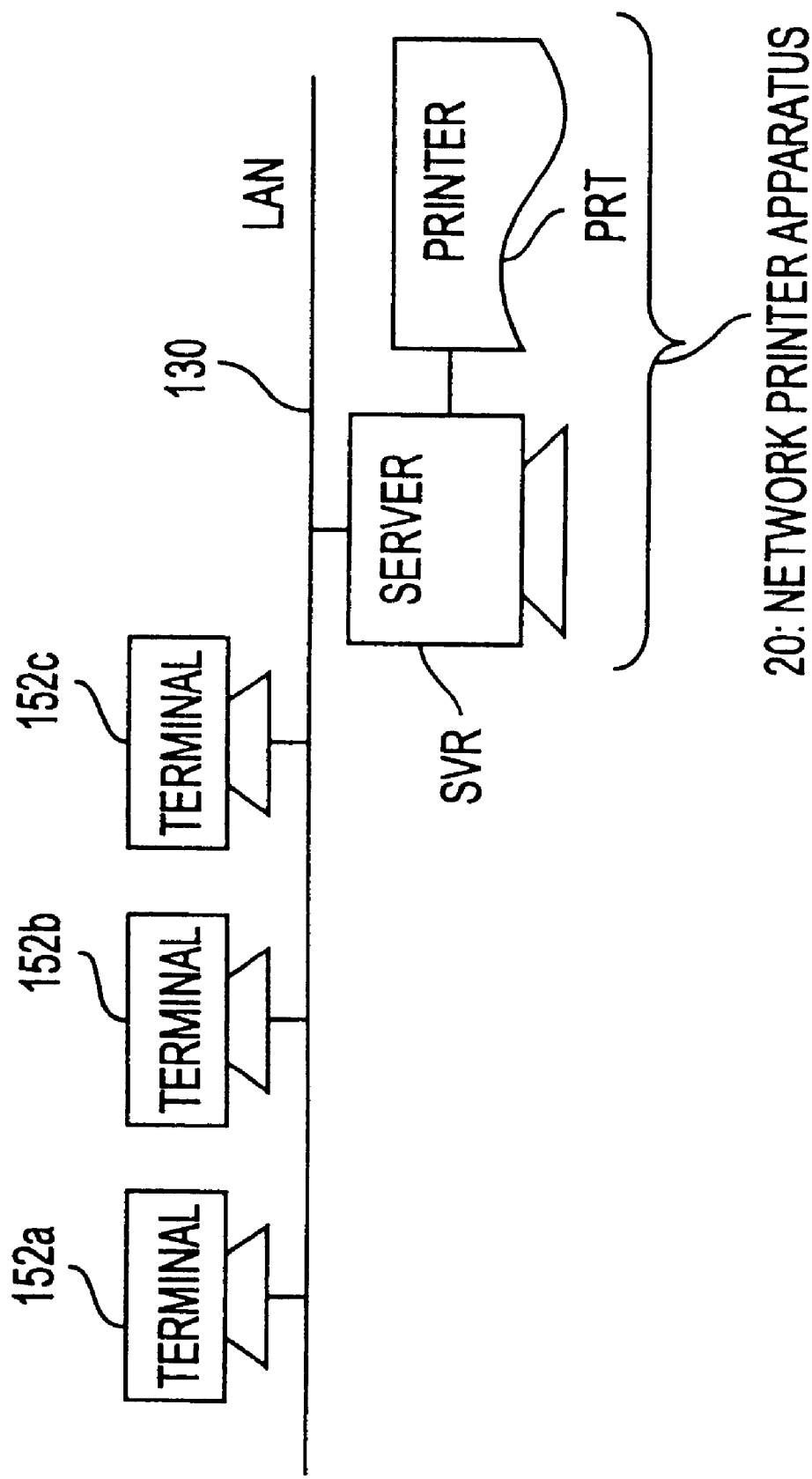
FIG. 55 shows connections between the server of the network printer apparatus and the terminals of the clients.

FIG. 55. shows a printer apparatus 20 including a printer PRT and a server SVR. Reference numerals 152a to 152c denote terminals of the clients and reference numeral 130 is LAN.

Figure 56:
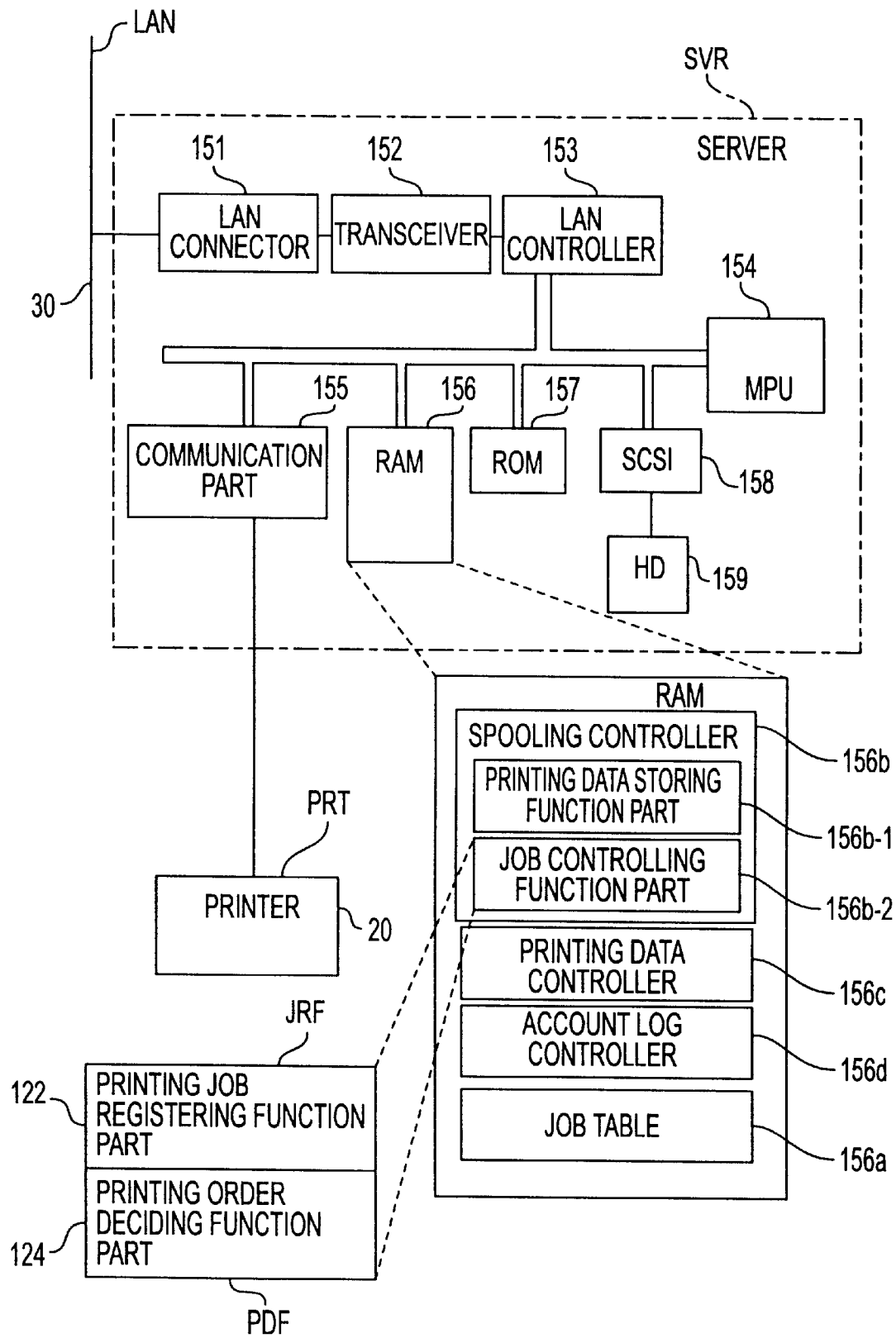
FIG. 56 shows the structure of a server of the printer apparatus of another embodiment of the present invention.
Figure 58:
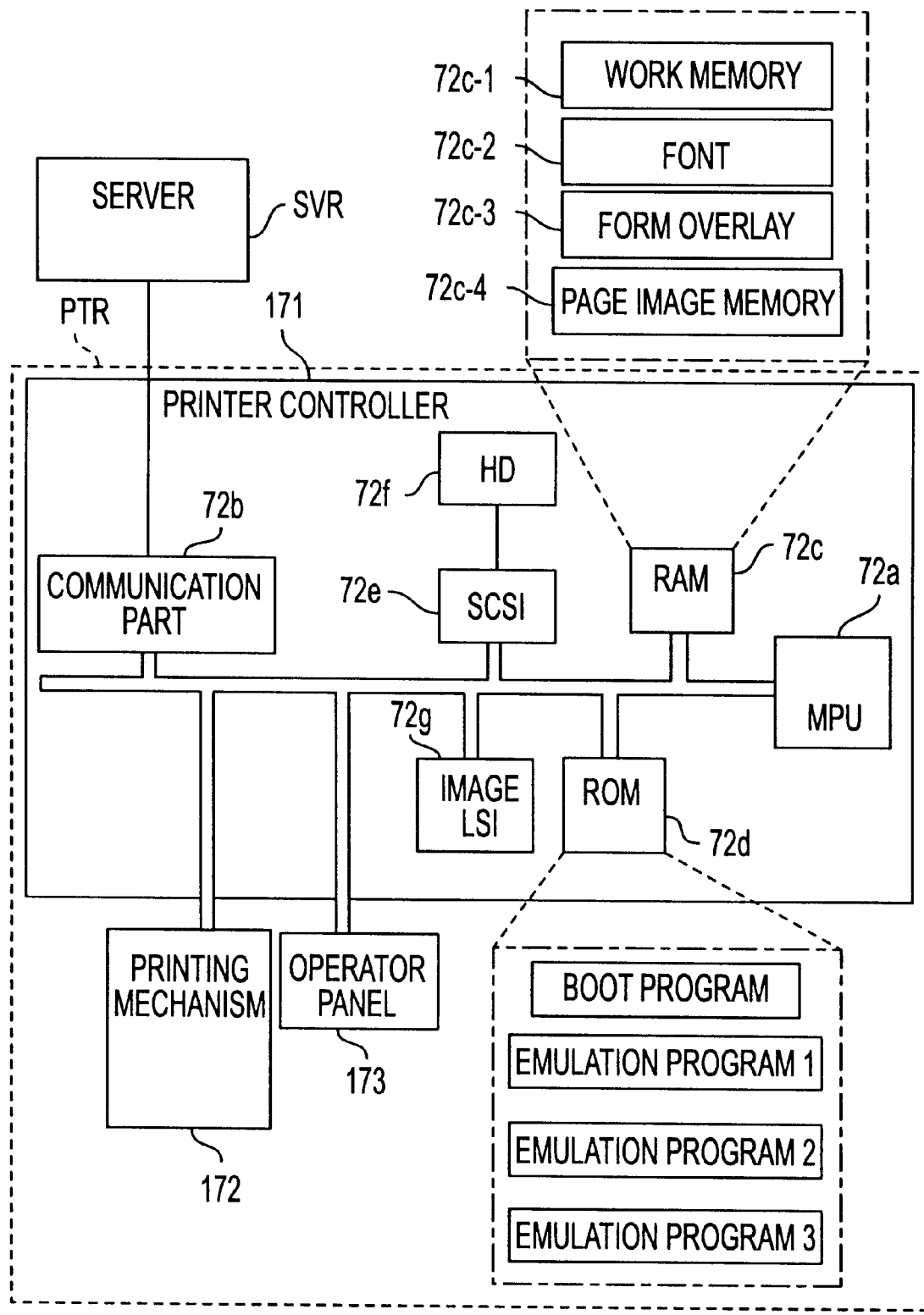
FIG. 58 is a block diagram of a printer controller of the apparatus of the embodiment of FIG. 56.

FIGS. 56 and 58 show the embodiment of the present invention with a server SVR. In FIG. 56, the reference numeral 151 represents a LAN connector. The LAN connector 151 includes connectors for, for example, 10Base2, 10BaseT and 10Base5 as described above. The reference 152 represents a transceiver for the LAN connector 151. The transceiver 152 detects the collision in CSMA/CD (Carrier Sense Multiple Access with Collision Detection) and controls transmission and reception in CSMA/CD. The reference numeral 153 denotes a LAN controller which is capable of controlling the communication protocol of TCP/IP, for example. The reference numeral 154 represents a microcomputer (MPU), 155 is a communication part for transmitting and receiving data to and from the printer PRT in accordance with RS232C or Centronics, 156 is a RAM, 157 is a ROM, 158 is a SCSI interface portion, and 159 is a hard disk (HD). 122 is a printing job registering unit and 123 is a printing order deciding unit, which have been described in connection with FIG. 2.

The ROM 157 stores a boot program, system program, etc. and the RAM 156 stores various softwares, a job table, etc.

Job table

A job table 156a registers printing jobs in the order of receipt. As shown in FIG. 57, each row of the job table 156 is allotted to one printing job and includes a field 61a for storing the printing job name (ID), a field 61b for storing the storage location in the hard disk 159, a field 61c for storing the file name, a field 61d for storing the file size, a field 61e for storing the name of the emulation program for interpreting the printing information, a field 61f for storing the form overlay name, and a job designation field (flag field) 61g for storing the data which designates another printing job using the same emulation program and the same form overlay as that of the printing job entered in the row. Every time a printing job is registered, each of these items is entered.

The RAM 156 stores softwares for a spooling controller 156b, a printing data transfer controller 156c, an account log controller 156d.

The spooling controller 156b is provided with a printing data storing function part 156b-1 and a job controlling function part 156b-2 for spooling (storing) the printing information which is transferred from the terminals 152a, 152b, . . . in the hard disk 159, registering the printing jobs in the order of receipt and taking out the printing jobs in a predetermined order. The printing data transfer controller 156c has a function of reading the printing information corresponding to the current printing job from the hard disk 159 and transferring the read printing information to the printer apparatus 20 (PRT). The account log controller 156d has a function of collecting the accounting information as to the job printed by the network printer and controlling account log.

Printing job controller.

The job controlling function part 156b-2 of the spooling controller 156b includes the printing job registering function unit JRF 22a for registering a printing job to the job table 156a and a printing order deciding function unit PDF 124.

When a user inputs new printing information, the printing job registering function part JRF extracts the emulation program name and the form overlay name from the new printing information and judges whether or not there is a printing job having the same emulation program name and the same form overlay name as the extracted emulation program name and form overlay name in the job table 156a. If the answer is YES, the printing job registering function part JRF retrieves the printing job, enters the name (ID) of the printing job corresponding to the new printing information in the job designation field 61g of the row of the retrieved printing job and registers the printing job corresponding to the new printing information in the job table 156a.

For example, in the case of newly registering the printing job having an ID of 3 (the printing job having an ID of 4 has not been registered yet), a printing job (ID=1) having the same emulation program name and the same form overlay name as those of the printing job of ID 3 exists in the job table 156a. Accordingly, the name (ID=3) of the printing job is entered in the flag field 61g of the row of the retrieved printing job of ID 1, and registers the printing job of ID 3 in the job table 156a.

When a printing operation is finished in accordance with a predetermined printing job and the printer is ready, the printing order deciding function part PDF judges whether or not another printing job is designated in the job designation field 61g of the predetermined printing job. If the answer is in the affirmative, the printing order deciding function part PDF determines that the designated printing job is to be printed next. On the other hand, if the answer is in the negative, the printing order deciding function part PDF determines that the printing job having the highest priority in the order of receipt of printing information (in the order of registration of printing jobs) is to be printed next.

For example, when the printing job are registered in the job table 56a, as shown in FIG. 58, the flag field 61g of the row of the first printing job of ID 1 is referred to after the first printing job is finished. Since ID 3 is written in the flag field 61g, the printing order deciding function part PDF determines that the printing job to be executed next is the printing job of ID 3, and eliminates the printing job of ID 1 from the job table 156a.

When the printing job of ID 3 is finished, the flag field 61g of the row of the printing job of ID 3 is referred to so as to judge whether or not any name of a printing job is written. In this case, no name is written, the printing order deciding function part PDF determines that the printing job of ID 2, which has the highest priority in the order of registration of printing jobs, is to be printed next.

In FIG. 58 which shows the printer of the second embodiment of the printer apparatus, the reference numeral 171 denotes a printer controller, 172 is an engine (printing mechanism) and 173 an operator panel. In the printer controller 171, the reference numeral 72a represents a microcomputer (MPU), 72b a communication part for transmitting and receiving data to and from the server SVR in accordance with RS232C or Centronics, 72c a RAM, 72d a ROM, 72e a SCSI interface portion, 72f a hard disk device (HD) and 72 g an image LSI for sequentially producing dot image data for one page in accordance with printing information and storing the data in the RAM 72c.

The RAM 72c is provided with a work memory region 72c-1, a font storage region 72c-2, a form overlay storage region for storing a form overlay, a page image memory region 72c-4 for storing the printing image (bit map data) formed, etc. The overlay necessary for printing is downloaded from the hard disk of the server SVR or the overlay storing terminal (client) on the LAN, as occasion demands.

The ROM 72d stores a boot program and various emulation programs for interpreting printing data. Examples of the emulation program are an FM sequence program, Japanese Post Scrip, and SUN raster.

Figure 59:
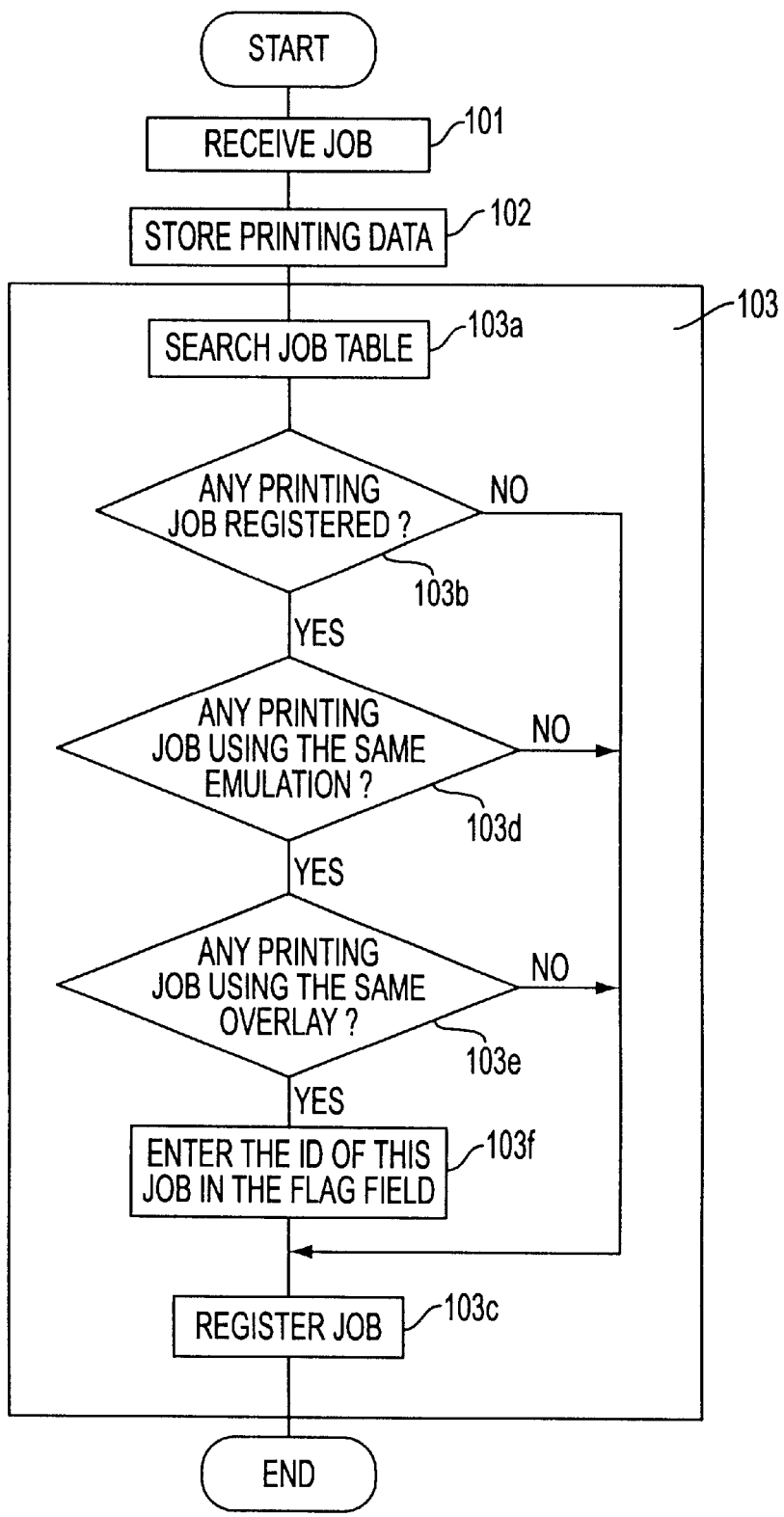
FIG. 59 is a flowchart of the process of registering a printing job in the printer apparatus of FIG. 58.

FIG. 59 is a flowchart of the process of registering a printing job when there is a request for printing in the apparatus of FIGS. 56 and 58. When a terminal requests the server SVT to print, and when the LAN controller 153 receives a packet (frame) through the LAN connector 151 and the transceiver 152, the LAN controller 153 judges whether or not the destination address in the packet agrees with the address of the LAN controller 153. If the answer is YES, the packet (frame) is stored in the buffer, while if the answer is NO, the packet is discarded. In order to reconstruct the data which is composed of a plurality of frames, the data having the same ID are linked in the buffer. This process is repeated until the linkage of the data having the same ID is finished. When the reconstruction of the data having the same ID is finished, the data (e.g., printing data) is transferred to the spooling controller 156b, which is disposed at the next stage (Step 101).

The spooling controller 156b has a file controlling function, and stores the printing data with a job number attached thereto in the hard disk 159 (Step 102) and simultaneously registers the printing job corresponding to the printing data in the job table 156a (Step 103).

The printing job is registered in the following way:

The job registering function part JRF of the job controlling function part 56b-2 searches the job table 156a so as to judge whether or not any printing job has been registered (Steps 103a, 103b). If no printing job has been registered, the job which is required to be printed is registered in the job table 156a (Step 103c), and the process is ended.

If there are printing jobs registered in the job table 156a, the printing job registering function part JRF extracts the emulation program names and the form overlay-names from the newly printing information, and judges whether or not there is any printing job having the same emulation program name and the same form overlay name in the job table 156a (Steps 103d, 103e). If the answer is NO, the job which is required to be printed is registered in the job table 156a (Step 103c), and the process is ended.

On the other hand, if there is another printing job having the same emulation program name and the same form overlay name in the job table 156a as the extracted emulation program name and form overlay name at the steps 103d and 103e, the printing job registering function part JRF retrieves it and enters the name (ID) of the job which is newly required to be printed in the job designation field 61g of the row of the retrieved printing job (Step 103f). Thereafter, the job which is required to be printed is registered in the job table 156a (Step 103c), and the process is ended.

Figure 60:
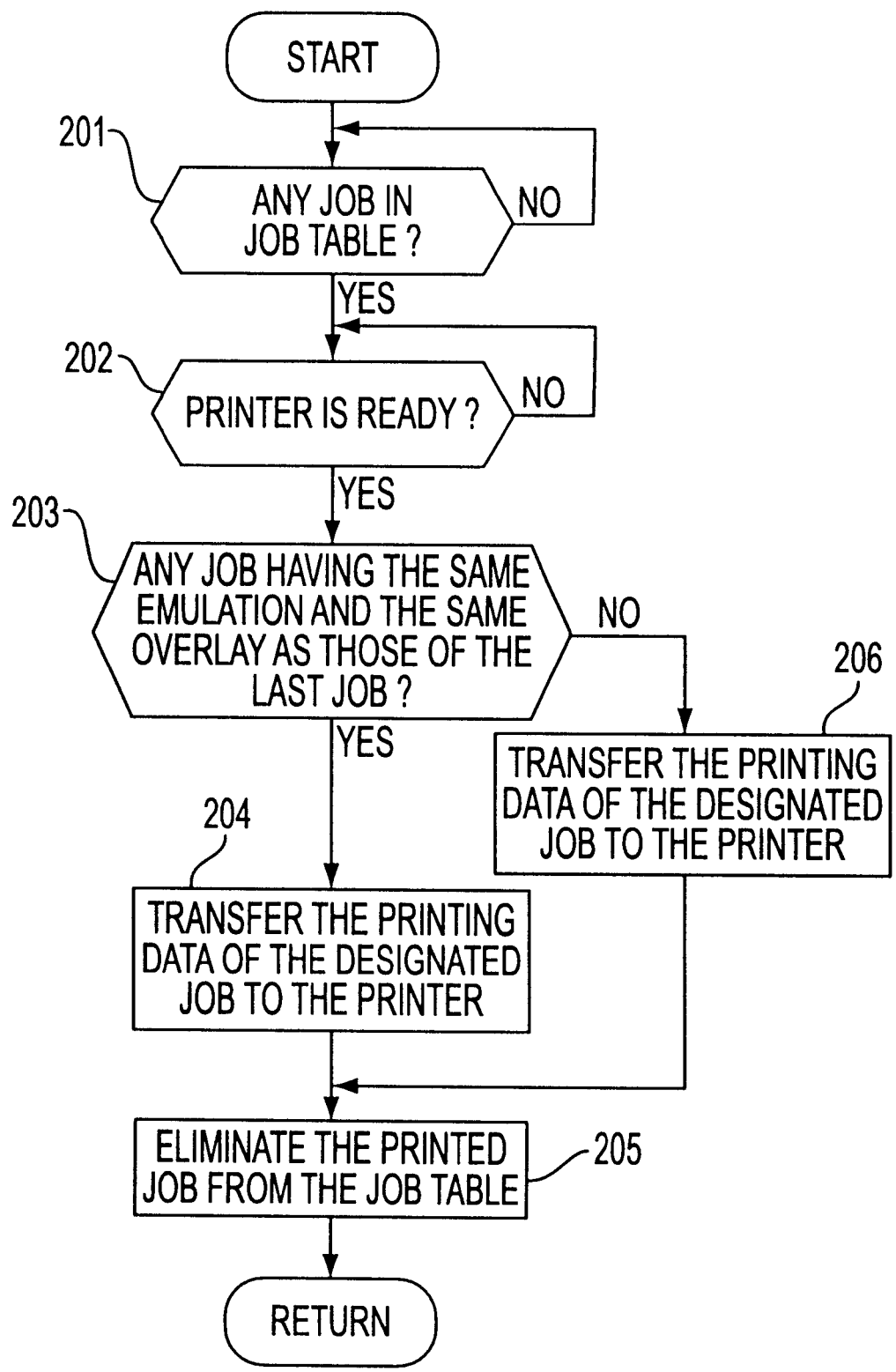
FIG. 60 is a flowchart of the process of deciding a printing job to be executed.

FIG. 60 is a flowchart of the process of deciding a printing job to be executed. The printing order deciding function part PDF of the job controlling function part 56b-2 judges whether or not there is any unprinted job in the job table 156a (Step 201). If the answer is YES, the printing order deciding function part PDF judges whether or not the command for printer ready has been input from the printer PRT (Step 202). If a printing operation is finished and the printer PRR is ready, the printing order deciding function part PDF judges whether or not there is in the job table 156a a printing job having the same emulation program name and the same form overlay name as those of the preceding printing job. In other words, whether or not the name of another printing job is written in the flag field 61g of the row of the last printing job is judged (Step 203).

If the answer is in the affirmative, the printing job name written in the flag field 61g is supplied to the printing data transfer controller 156c. The printing data transfer controller 156c reads the printing information of the designated printing job from the hard disk 159, and transfers the read printing information to the printer PRT (Step 204). Thereafter, the printing data transfer controller 56c eliminates the printing job which as been finished printing from the job table 156a (Step 205), and the process returns to the beginning.

On the other hand, if there is no other printing job in the flag field 61g at the step 203, the printing order deciding function part PDF determines that the printing job which has the highest priority in the order of registration of printing jobs (in the order of receipt of printing jobs) is to be printed next, and supplies the name of this printing job to the printing data transfer controller 156c. The printing data transfer controller 156c reads the printing information of the designated printing job from the hard disk 159, and transfers the read printing information to the printer PRT (Step 204). Thereafter, the printing data transfer controller 156c eliminates the printing job which has been finished printing from the job table 156a (Step 205), and the process returns to the beginning.

Figure 61:
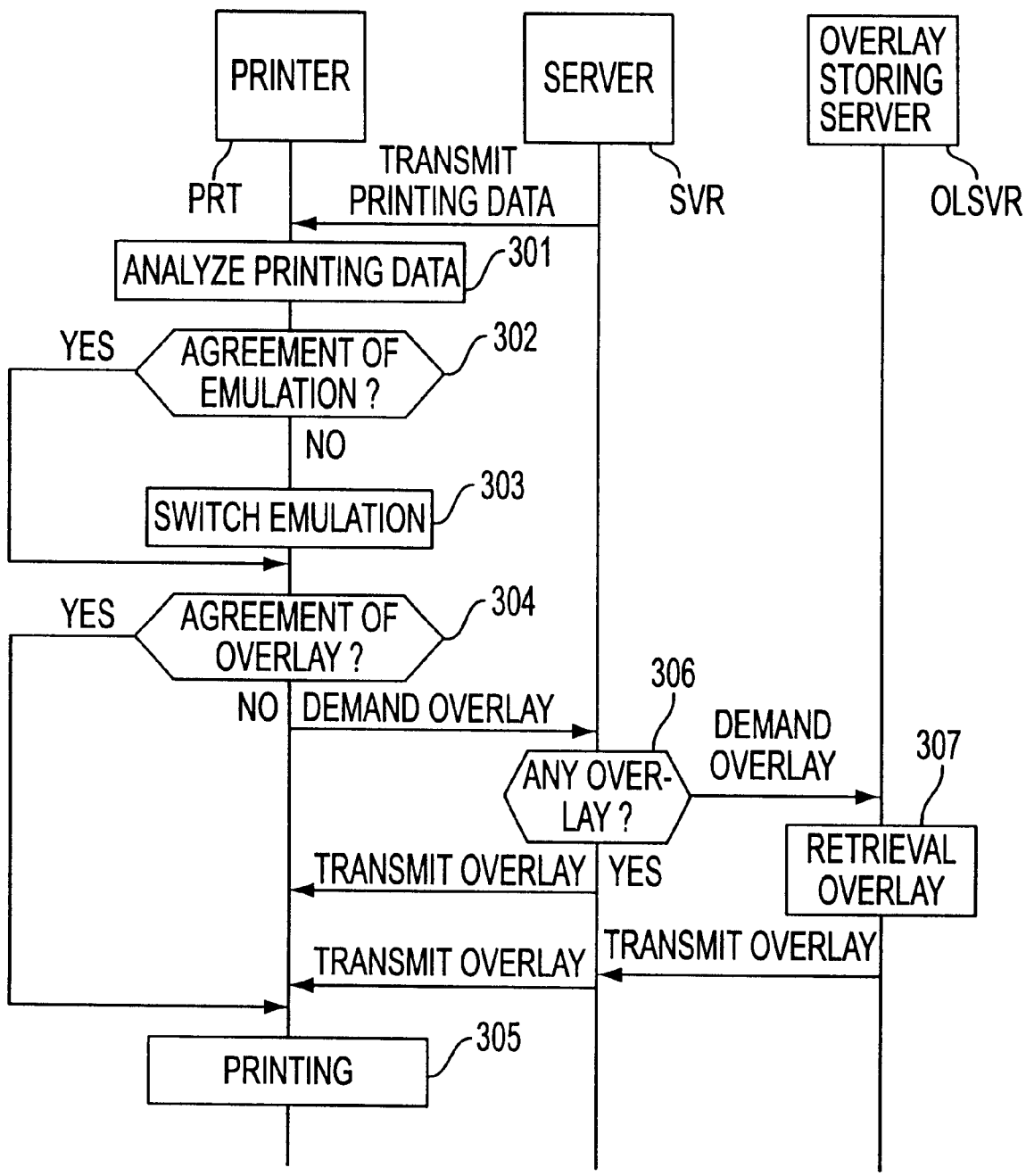
FIG. 61 is a flowchart of the procedure of the printer.

FIG. 61 shows the procedure of operation of the printer PRT 20.

When printing data is transferred from the server SVR, the printer controller 171 of the printer PRT analyzes the printing data (Step 301), and judges whether or not the emulation program in the printing data agrees with the emulation program of the preceding printing job (Step 302). If the answer is YES, the emulation program is not switched over, while if the answer is NO, the emulation program is changed over to the emulation program designated by the printing data (Step 303).

It is then judged whether or not the form overlay in the printing data agrees with the form overlay of the preceding printing job (Step 304). If the answer is YES, printing operation is executed in accordance with the printing data (Step 305).

If the answer is NO at the step 304, the printer controller 171 demands the overlay from the server SVR. The server SVR judges whether or not the demanded overlay is stored in the hard disk 159 (Step 306), and if the answer is YES, the server SVR transfers the overlay to the printer PrT. The printer PRT then stores the overlay in the RAM 72c and executes the printing operation (Step 305).

If the answer is NO at the step 306, the server SVR demands the overlay from an overlay storing server OLSVR. The overlay storing server OLSVR retrieves the demanded overlay and transfers it to the server SVR (Step 307). The server SVR transfers the overlay to the printer PRT. The printer PRT stores the overlay in the RAM 72c and executes the printing operation (Step 305).

As described above, according to the present invention, if there is any printing job having the same emulation program name and the same form overlay name as those of the printing job which has been finished printing, the printing job is executed irrespective of the order of receipt. It is therefore possible to reduce, as much as possible, the number of times a form overlay is to be changed, thereby enhancing the efficiency of use of the network printer apparatus.

In the above-described embodiment, the printing job name is entered in the flag field 61g when both the emulation program and the overlay agree with those of another printing job. The job table 156a may have a structure with the case in which only the overlay or the emulation program of a printing job agrees with that of another printing job also taken into consideration.

FIG. 62 shows the printing job table 156a adaptable to such a case. The same numerals are provided for the elements which are the same as those shown in FIG. 58. This job table 156a is different from that shown in FIG. 58 in that a second flag field 61h for designating the printing job in which only the overlay is the same is provided.

Referring to FIG. 62, when a new printing job of ID 3 is registered, since the overlay of the printing job agrees with the overlay of the printing job of ID 1 which has already been registered, ID=3 is entered in the second flag field 61h of row of the printing job of ID 1.

When a next printing job of ID 4 is registered, since the emulation programs and the overlay of the printing job agree with those of the printing job of ID 1 which has already been registered, ID=4 is entered in the first flag field 61g of the row of the printing job of ID 1. In addition, since the overlay of the printing job of ID 4 agrees with the overlay of the printing job of ID 3 which has already been registered, ID=4 is entered in the second flag field 61h of the row of the printing job of ID 3.

In this state, the printing job is decided in the following way:

After the printing job of ID 1 is executed, the first flag field 61g of the printing job of ID 1 is referred to so as to judge whether or not another name of a printing job is written. If the answer is in the affirmative, the retrieved printing job (ID=4) is executed, and the name (ID=1) of the printing job is eliminated from the job table 156a. After executing the printing job of ID 4, the first flag field 61g of the printing job of ID 4 is referred to so as to judge whether or not another name of a printing job is written. If no name is written in the first flag filed 61g, it is judged whether or not there is a row of a printing job having the name (ID=4 of the printed job in the second flag field 61h. If the answer is YES, the printing job (ID=3) having the same overlay as the printing job of ID 4 is then executed. The name (ID=4) of the printed job is eliminated from the printing job table 156a. In this way, it is possible to further reduce the number of times a form overlay is to be changed, thereby enhancing the efficiency to use of network printer apparatus.

Figure 63:
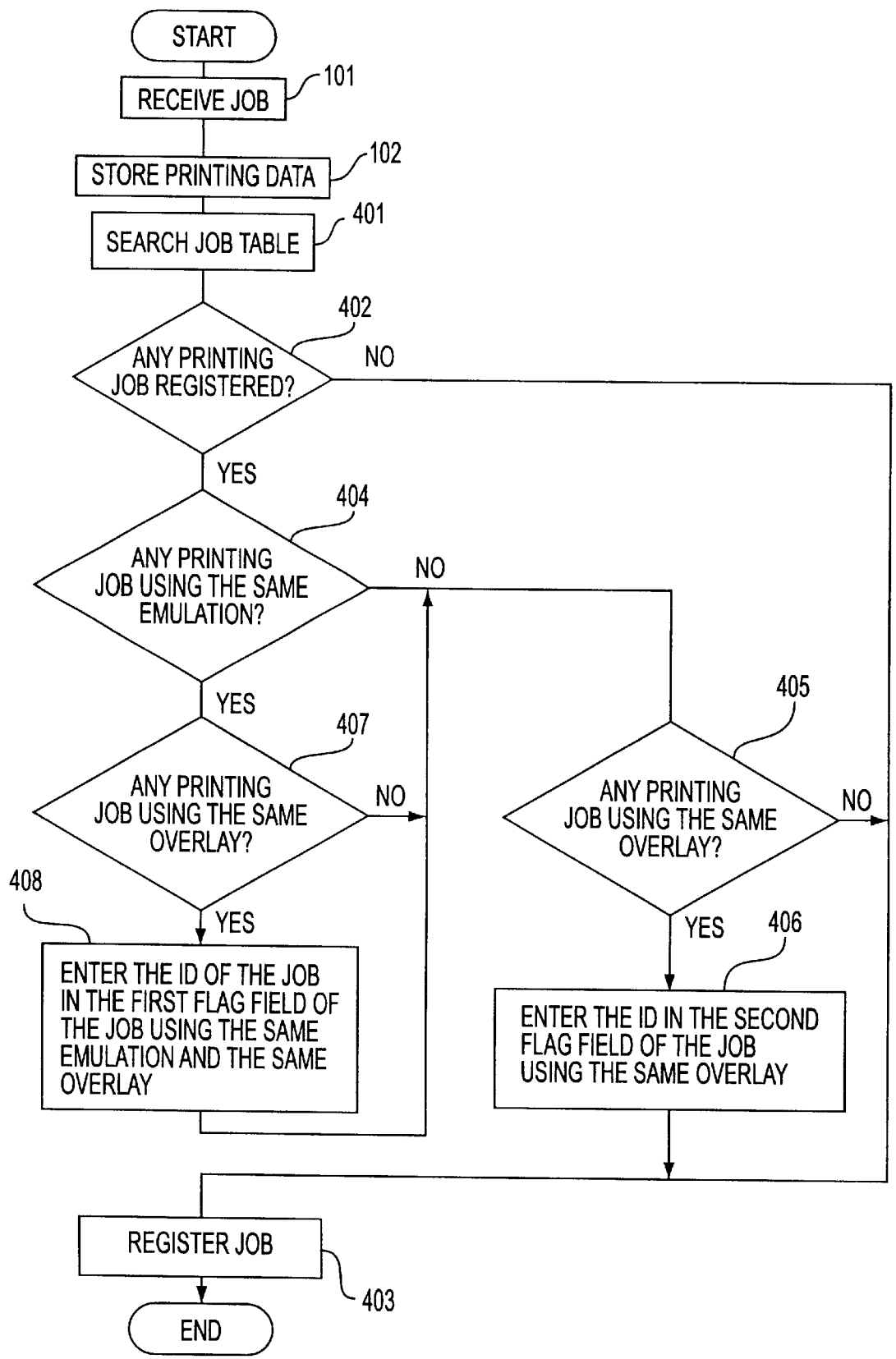
FIG. 63 is a flowchart of the process steps of registering a printing job when the job table shown in FIG. 62 is adopted.

FIG. 63 is a flowchart of the process of registering a printing job when the job table having the first and second flag fields is adopted. The proceedings at the steps 101 and 102 are the same as those in the flowchart shown in FIG. 59.

When a request for printing is output, the job registering function part JRF of the job controlling function part 156b-2 searches the job table 156a so as to judge whether or not any printing job has been registered (Steps 401, 402). If no printing job has been registered, the job which is required to be printed is registered in the job table 156a (Step 403), and the process is ended.

If there is another printing job registered in the job table 156a, the printing job registering function part JRF extracts the emulation program name and the form overlay name from the printing information, and judges whether or not there is any printing job having the same emulation program name as the extracted emulation program name in the job table 156a (Step 404).

If the answer is in the negative, it is judged whether or not there is any printing job having the same overlay name as the extracted overlay name in the job table 156a (Step 405). If the answer is in the negative, the job which is required to be printed is registered in the job table 56a (Step 403), and the process is ended. On the other hand, if there is another printing job having the same form overlay name in the job table 156a at the step 405, the printing job registering function part JRF enters the name (ID) of the job which is required to be printed in the second flag field 61h of the row of the retrieved printing job (Step 406). Thereafter, the job which is required to be printed is registered in the job table 156a (Step 403), and the process is ended.

If there is another printing job having the same emulation program name in the job table 156a at the step 404, it is further judged whether or not there is any printing job also having the same overlay name as the extracted overlay name (Step 407). If there is a printing job having the same emulation program name and the same form overlay name as the extracted emulation program name and form overlay name, the printing job registering function part JRF enters the name (ID) of the job which is required to be printed in the job designation field 61g of the row of the retrieved printing job (Step 408).

If the answer is NO at the step 407, or after processing at the step 408, it is judged whether or not there is a printing job having a different emulation program name but the same form overlay name as the extracted form overlay name (Step 405). If the answer is NO, the job which is required to be printed is registered in the job table 156a (Step 403), and the process is ended. On the other hand, if the answer is YES, the printing job registering function part JFR enters the name (ID) of the job which is required to be printed in the second flag field 61h of the row of the registered printing job (Step 406). Thereafter, the job which is required to be printed is registered in the job table 156a (Step 403), and the process is ended.

In this modification, the name of a printing job having the same emulation program name and the same overlay as those of a registered printing job is entered in the first flag field 61g of the row of the registered printing job, and the name of a printing job in which only the overly name agrees with that of a registered printing job is entered in the second flag field 61g of the row of the registered printing job. Alternatively, it is possible to enter the name of a printing job having the same emulation program name and the same overly as those of a registered printing job in the first flag field 61g of the row of the registered printing job, and to enter the name of a printing job in which only the emulation program name agrees with that of a registered printing job in the second flag field 61h of the row of the registered printing job.

In the above-described modification, the printing job name is entered in the flag field 61g only when both the emulation program and the overlay agree with those of another printing job. Similar processing may be conducted by entering the name of a printing job in which only the emulation program name agrees with that of another printing job or only the overlay name agrees with that of another printing job in the first flag field 61g.

Control considering only emulation program.

When printing information is input, the emulation program name is extracted from the printing information, and it is judged whether or not there is any printing job having the same emulation program name as the extracted emulation program name in the job table. If the answer is in the affirmative, the name of the job which is required to be printed is entered in the first flag field 61g of the retrieved printing job and the printing job corresponding to the input printing information is registered in the job table 56a. After the printing operation of a predetermined printing job is finished, whether or not there is another printing job designated in the job designation field of the row of the printed job is judged. If the answer is YES, the printing order deciding function part PDF determines that the designated printing job is to be executed next.

Control considering only overlay.

When printing information is input, the overlay name is extracted from the printing information, and it is judged whether or not there is any registered printing job having the same overlay name as the extracted overlay name in the job table. If the answer is in the affirmative, the name of the job which is required to be printed is entered in the first flag field 61g of the row of the registered printing job and the printing job corresponding to the input printing information is registered in the job table 56a. After the printing operation of a predetermined printing job is finished, whether or not there is another printing job designated in the job designation field of the row of the printed job is judged. If the answer is YES, the printing order deciding function part PDF determines that the designated printing job is to be executed next.

Figure 64:
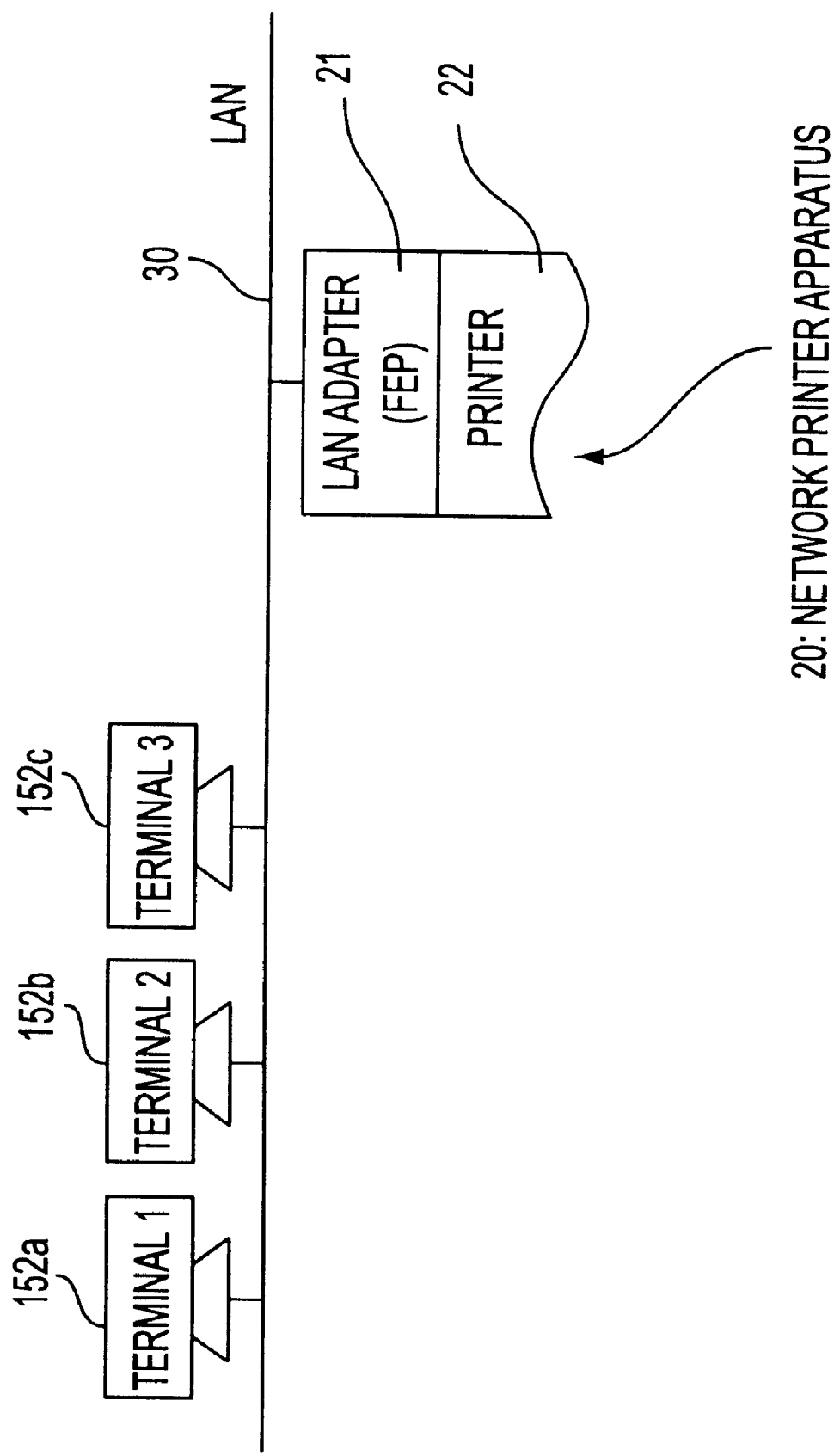
FIG. 64 shows connections of the LAN adapter of the printer of the present invention to the terminals of the clients.

FIG. 64 shows a LAN network system to which a network printer apparatus according to the present invention is applicable.

In FIG. 64, the reference numerals 152a to 152c . . . represent terminals such as personal computers (PC) or work stations (WS), 20 a network printer apparatus and 30 a LAN. The network printer apparatus 20 is integrally composed of a LAN adapter (Front End Processor: FEP) 21 provided with a function of communication with the LAN and a full-scale server function, and a printer part 22. In the physical environment shown in FIG. 55, the network printer apparatus 20 of the present invention is composed of the server SVR and the printer PRT which are separate from each other. In contrast, in the physical environment shown in FIG. 64, the network printer apparatus 20 of the present invention further comprises the LAN adapter (Front End Processor: FEP) 21 provided with a function of communication with the LAN and a full-scale server function, and printer part 22, as has been described in connection with the first embodiment.

The job table 156a is created by the spooling function (job registering function) of the FEP 21 in accordance with the flow shown in FIG. 63 and stored both in the RAM 21e and the RAM 22g of the printer controller 22. The printing job to be executed next is decided by the printing job deciding function of the printer controller 22 in accordance with the process shown in FIG. 60, and the printing operation is executed.

When there is a printing job using the same emulation program and/or the same form overlay as those of the printing job which has been finished printing, this job is executed next irrespective of the order of receipt. It is therefore possible to reduce, as much as possible, the number of times emulation programs are to be switched and the number of times a form overlay is to be changed, thereby enhancing the efficiency of use of the network printer apparatus.

In addition, when there is a printing job using the same emulation program and the same form overlay as those of the printing job which has been finished printing, this job is executed irrespective of the order of receipt, and when there is a printing job in which only the emulation program or the overlay agrees with that of the printing job which has been finished printing, this job is also executed irrespective of the order of receipt. It is therefore possible to further reduce the number of times emulation programs are to be switched or the number of times a form overlay is to be changed, thereby enhancing the efficiency of the network printer apparatus.

As many apparently widely different embodiments of the present invention can be made without departing from the spirit and scope thereof, it is to be understood that the invention is not limited to the specific embodiments thereof except as defined in the appended claims.

What is claimed is:

1. A network printer apparatus connected to a plurality of computers through a LAN network system, the apparatus comprising:

a connector for connecting the apparatus to the LAN network system;

LAN adapter means including a LAN interface driver for receiving printing information from the computers through said LAN network system, the printing information including an emulation name for identifying a format of printing data sent from a respective one of the computers the printing information also containing an information portion field and a header field which is disposed ahead of the information portion field, the header field containing a destination address field, a sender address field and a communication protocol type field identifying the type of one of a plurality of communication protocols said information portion field containing a header field for identifying the, header of the communication protocol identified from said communication protocol type field, and a print data field, each of the communication protocols identifying a format for transferring the printing data between the apparatus and the respective one of the computers, and a multiprotocol controller having a protocol control function, respectively for each of said plurality of communication protocols, and identifying a communication protocol by the protocol type in said communication protocol type field in the printing information and further controlling transfer of the printing data between the apparatus and the respective one of the computers, wherein the printing information is sent through the LAN network in the form of a packet; said multiprotocol controller identifies a communication protocol from the communication protocol type field in the printing information contained in said packet based on said specific information identifying the type of communication protocol in said packet, the protocol control function of said multiprotocol controller, which corresponds to the communication protocol identified from the communication protocol type field is selected, and said transfer is performed in accordance with the identified communication protocol; and wherein said respective protocol control functions may be processed in parallel:

storage means for storing the printing data transferred from said plurality of computers;

a printer controller, coupled to said storage means, for forming an image of the printing data in accordance with the emulation name in the printing information transferred from the one of the computers; and a printing mechanism for printing the image on paper.

2. A network printer apparatus according to claim 1, wherein:

said LAN adapter means includes a spooling controller coupled to said storage means for storing printing information and creating a queue for printing jobs to be executed;

said printer controller reading out from said storage means a printing information corresponding to a printing job of the highest priority which is designated by said queue, and forming and outputting a dot image for each page to be printed on the basis of said printing information.

3. A network printer apparatus according to claim 2, wherein:

said printer controller includes said storage means and a means for storing said queue; and said LAN adapter means and said printer controller are connected to each other through a memory bus and a SCSI bus so that information excepting printing data is received and transmitted therebetween through said memory bus and the printing data is stored in said storage means through said SCSI bus.

4. A network printer apparatus according to claim 2, wherein said storage means is provided in said printer controller so as to store fonts and overlays which are to be downloaded through the LAN network system from a client.

5. A network printer apparatus according to claim 2, wherein:

said LAN adapter means further includes a controller for identifying a request for inquiry about the state of said apparatus and said printing jobs, said request being transmitted from a client, and a communication response controller for supplying a response to said inquiry to said client in accordance with a predetermined communication protocol; and said printer controller further includes a status controller for collecting information on said state of said apparatus and said printing jobs in response to said inquiry and transmitting the collected information to said communication response controller.

6. A network printer apparatus according to claim 2, wherein said LAN adapter means further includes a communication response controller for transmitting a notice of an end of printing or an error in apparatus functions, to said client by an original communication protocol which is different from said communication protocol.

7. A network printer apparatus according to claim 2, wherein said LAN adapter means includes a center routine controller for eliminating a predetermined printing job whose execution is held and in a hold state, from said queue after elapse of a designated holding time, without cancelling the hold state.

8. A network printer apparatus according to claim 2, wherein said printer controller includes:

an emulation controller for interpreting said printing information; and an image processor for converting said printing information into a dot image for each page being processed in the printer apparatus.

9. A network printer apparatus according to claim 8, wherein said emulation controller is provided with a plurality of emulations and operates to interpret said printing information in accordance with an emulation which is designated by said printing information.

10. A network printer apparatus according to claim 2, wherein said LAN adapter means further includes an account log controller for storing a result of printing as account information.

11. A network printer apparatus according to claim 10, wherein said account information includes printing data, a name of a client, a name of a printing job, number of sheets to be printed, an address of the client and paper size.

12. A network printer apparatus according to claim 1, and further comprising:

a means for storing a job table including a plurality of rows and in which each row is allotted to one printing job and includes a field for storing a name of a printing job, a field for storing a storage location in said storage means at which said printing information is stored, a field for storing a name of an emulation program for interpreting printing information, a field for storing a name of a form overlay, a job designation field for storing data which designates another printing job using the same emulation program and the same form overlay as those of the corresponding printing job entered in said row;

a printing job registering means for extracting the name of the emulation program and the name of the form overlay from newly input printing information, judging whether or not there is a printing job having the same name of the emulation program and the same name of the form overlay as the extracted name of the emulation program and the name of the form overlay in said job table, retrieving the printing job if an answer is affirmative, entering the data for designating said newly input printing information in said job designation field of the row of the retrieved printing job, and registering the printing job corresponding to said newly input printing information in said job table; and a printing order decision means for judging, when a printing operation is finished in accordance with a predetermined printing job, whether or not another printing job is designated in said job designation field of the row of said predetermined printing job, and executing the printing operation corresponding to the designated job if the answer is affirmative, while executing printing operations in series in the order of receipt of printing information if the answer is negative.

13. A network printer apparatus according to claim 1, wherein said LAN adapter means includes a center routine controller having a reception examination function for prohibiting a receipt of a request for printing when said request is supplied from a client other than the clients who a re registered in advance.

14. A network printer apparatus according to claim 1, wherein said LAN adapter means includes a center routine controller for editing a banner page and inserting said banner page into printing data either at the beginning or at the end when a request for printing is received from a client.

15. A network printer apparatus according to claim 1, wherein said LAN adapter means includes a center routine controller for registering in advance a number of permissible sheets to be printed in total and a number of permissible sheets to be printed in one cycle, and deciding the number of sheets to be printed in the range which does not exceed said number of permissible sheets to be printed in total and said number of permissible sheets to be printed in one cycle while taking the number of pages which are required to be printed, the total number of sheets which have actually been printed, said number of permissible sheets to be printed in total and said number of permissible sheets to be printed in one cycle into consideration.

16. A network printer apparatus according to claim 1, wherein said LAN adapter means includes a center routine controller for adding thereto a new center routine function from a floppy disc or one of said clients.

17. A network printer apparatus according to claim 1, wherein said LAN adapter means includes a filter controller for converting data or a code in said printing information.

18. A network printer apparatus according to claim 17, wherein said filter controller is operable to add a new filtering function from a floppy disc or a client.

19. A network printer apparatus according to claim 1,
wherein the emulation name in the printing information identifies one of a plurality of emulations which are different each other; and
wherein said multiprotocol controller comprises means for identifying one of the plurality of emulations in accordance with the emulation name.

20. A network printer apparatus according to claim 1, wherein said connector portion includes a plurality of various types of connectors including one which is connectable to a predetermined physical medium attachment connected to a LAN cable.

21. A network printer apparatus according to claim 1, wherein said printing information is transferred from the computer through the LAN network in the form of a packet which includes a destination address, a sender address, a type of communication protocol and the printing information, said LAN interface driver receives a packet from the LAN network and supplies the packet to said multiprotocol controller and said multiprotocol controller stores or discards the packet based upon whether the destination address in said packet agrees with the address of the multiprotocol controller.

22. A network printer apparatus as in claim 1, wherein said plurality of communication protocols includes at least a TCP/IP protocol.

23. A network printer apparatus connected to a plurality of clients through a LAN network system, comprising:
a LAN interface driver for receiving printing information from a client through said LAN network system,
the printing information including an emulation name for identifying a format of printing data sent from the respective one of the clients, the printing information also containing an information portion field and a header field which is disposed ahead of the information portion field, the header field containing a destination address field, a sender address field and a communication protocol type field identifying the type of one of a plurality of communication protocols, said information portion field containing a header field for identifying the header of the communication protocol identified from said communication protocol type field, and a print data field, each of the communication protocols identifying a format for transferring the printing data between the apparatus and the respective one of the clients;
communication protocol control means having a protocol control function respectively for each of said plurality of communication protocols, and identifying one of the communication protocols by the protocol type in said type field in the printing information and further controlling transfer of the printing data between the apparatus and the respective one of the clients, wherein the printing information is contained in a packet which is sent through the LAN network, said communication protocol control means identifies a communication protocol from said type field in the printing information in said packet, the protocol control function of said multiprotocol controller, which corresponds to the communication protocol identified from the communication protocol type field is selected, and said transfer is performed in accordance with the identified communication protocol; and wherein said respective protocol control functions may be processed in parallel:
storage means for storing the printing data transferred;
a spooling controller coupled to said storage means for storing the printing data and creating a queue for printing jobs to be executed;
a printer controller for forming an image of the printing data in accordance with the emulation name in the printing information transferred; and
a printing mechanism for printing the image on paper.

24. A network printing apparatus according to claim 23, and further comprising:
a means for storing a job table including a plurality of rows and in which each row is allotted to one printing job and includes a field for storing a name of a printing job, a field for storing a storage location in said storage means at which said printing information is stored, a field for storing a name of an emulation program for interpreting printing information, and a first job designation field for storing data which designates another printing job using the same emulation program as that of the corresponding printing job was correct in said row;
a printing job registering means for extracting the name of the emulation program from a newly input printing information, judging whether or not there is a printing job having the same name of the emulation program name as the extracted name of the emulation program in said job table, retrieving the printing job if an answer is affirmative, entering the data for designating said newly input printing information in said job designation field of the row of the retrieved printing job and registering the printing job corresponding to said newly input printing information in said job table; and
a printing order decision means for judging, when a printing operation is finished in accordance with a predetermined printing job, whether or not another printing job is designated in said job designation field of the row of said predetermined printing job, and executing the printing operation corresponding to the designated job if the answer is affirmative, while executing printing operations in series in the order of receipt of printing information if the answer is negative.

25. A network printer apparatus according to claim 24, wherein:
each row of said job table further includes a second job designation field for designating another printing job using a different emulation program but the same form overlay as that of the corresponding printing job entered in said row;
said printing job registering means extracts the name of the emulation program and the name of the form overlay from said newly input printing information, judges whether or not there is a printing job having a different name of the emulation program but the same name of the form overlay as the extracted name of the form overlay in said job table, and retrieves the printing job if the answer is affirmative, and said printing job registering means enters the name of the printing job corresponding to said newly input printing information in said second job designation field of the row of the retrieved printing job; and said printing order decision means judges, when a printing operation is finished in accordance with a predetermined printing job, whether or not another printing job is designated in said first job designation field of the row of said predetermined printing job, if the answer is negative, said printing order decision means judges whether or not another printing job is designated in said second job designation field of the row of said predetermined printing job, and if the answer is affirmative, said printing order decision means commands the designated job to be executed, while if the answer is negative, said printing order decision means commands printing operations to be executed in series in the order of receipt of printing information.

26. A network printer apparatus as in claim 23, wherein said plurality of communication protocols includes at least a TCP/IP protocol.

27. A LAN network system comprising:

a plurality of computers; and a network printer apparatus connected to said computers; said network printer apparatus including:

LAN adapter means including a LAN interface driver for receiving printing information from a client through said LAN network system, the printing information including an emulation name for identifying a format of printing data sent from the respective one of the computers, the printing information also containing an information portion field and a header field which is disposed ahead of the information portion field, the header field containing a destination address field, a sender address field and a communication protocol type field identifying the type of one of a plurality of communication protocols, said information portion field containing a header field for identifying the header of the communication protocol identified from said communication protocol type field, and a print data field, each of the communication protocols identifying a format for transferring the printing data between the apparatus and the respective one of the computers, a multiprotocol controller having a protocol control function respectively for each of said plurality of communication protocols and identifying one of the communication protocols by the protocol type in said type field in the printing information and further controlling transfer of the printing data between the apparatus and a respective one of the clients, wherein the printing information is sent through the LAN network in the form of a packet, said multiprotocol controller identifies the communication protocol from said type field in the printing information contained in the protocol control function said multiprotocol controller, which corresponds to the communication protocol identified from the communication protocol type field, is selected, and said transfer is performed in accordance with the identified communication protocol; and wherein said respective protocol control functions may be processed in parallel;

storage means for storing the printing data transferred, and a spooling controller coupled to said storage means for storing the printing data and creating a queue for printing jobs;

a printer controller for forming an image of the printing data in accordance with the emulation name in the printing information transferred; and a printing mechanism for printing the image on paper; and each client including:

a menu controller for creating printing data, inquiry data for inquiry about the state of said apparatus and printing job information and data for changing or registering printing attributes by an operation on a menu screen; and a communication controller for transmitting a request for printing in accordance with a predetermined communication protocol, and supplying said inquiry data for inquiring about the state of said apparatus and printing job information and said data for changing or registering printing attributes, to said network printer apparatus in accordance with an original communication protocol which is different from said predetermined communication protocol.

28. A LAN network system according to claim 25, wherein said client receives a response to an inquiry and displays the response data.

29. A LAN network system according to claim 25, wherein said network printer apparatus transmits information on paper shortage and network printer apparatus operation failure to said client by said original communication protocol, and said client displays said information.

30. A LAN network system according to claim 25, wherein said network printer apparatus includes a server accommodating said LAN adapter means for controlling communication in accordance with a communication protocol and a spooling control function for creating a queue of printing jobs.

31. A Lan network system as in claim 27, wherein said plurality of communication protocols includes at least a TCP/IP protocol.

32. A LAN adapter for a network printer apparatus connected to a plurality of computers through a LAN network system, comprising:

a LAN interface driver for receiving printing information from the computers through said LAN network system, the printing information including an emulation name for identifying a format of printing data sent from the respective one of the computers the printing information also containing an information portion field and a header field which is disposed ahead of the information portion field, the header field containing a destination address field, a sender address field and a communication protocol type field identifying the type of one of a plurality of communication protocols, said information portion field containing a header field for identifying the header of the communication protocol identified from said communication protocol type field, and a print data field, each of the communication protocols identifying a format for transferring the printing data between the apparatus and the respective one of the computers; and a multiprotocol controller having a protocol control function respectively for each of said plurality of communication protocols, and identifying one of the communication protocols by the protocol type in said type field in the printing information and further controlling transfer of the printing data between the apparatus and the respective one of the computers and indicating a printer controller to form an image of the printing data in accordance with the emulation name in the printing information transferred from the one of the computers, wherein the printing information is sent through the LAN network in the form of a packet, said multiprotocol controller identifies the communication protocol from said type field in the printing information contained in said packet, the protocol control function of said multiprotocol controller, which corresponds to the communication protocol identified from the communication protocol type field, is selected, and said transfer is performed in accordance with the identified communication protocol, and wherein said respective protocol control functions may be processed in parallel.

33. A network printer apparatus according to claim 32, wherein the emulation name in the printing information identifies one of a plurality of emulations which are different each other; and wherein said multiprotocol controller comprises means for identifying the one of the plurality of emulations in accordance with the emulation name.

34. A LAN adapter as in claim 32, wherein said plurality of communication protocols includes at least a TCP/IP protocol.

35. A LAN adapter for a network printer apparatus connected to a plurality of computers through a LAN network system, comprising:

a LAN interface driver for receiving printing information from the computers through said LAN network system, the printing information including an emulation name for identifying a format of printing data sent from the respective one of the computers the printing information also containing an information portion field and a header field which is disposed ahead of the information portion field, the header field containing a destination address field, a sender address field and a communication protocol type field identifying the type of one of a plurality of communication protocols including a TCP/IP protocol, an IPX/SPX protocol and an ETHER nettalk, said information portion field containing a header field for identifying the header of the communication protocol identified from said communication protocol type field, and a print data field, each of the communication protocols identifying a format for transferring the printing data between the apparatus and the respective one of the computers; and a multiprotocol controller having a protocol control function, respectively for each of said plurality of communication protocols, and identifying one of the communication protocols by the protocol type in the printing information and further controlling transfer of the printing data between the apparatus and the respective one of the computers and indicating a printer controller to form an image of the printing data in accordance with the emulation name in the printing information transferred from the one of the computers, wherein the printing information is sent through the LAN network in the form of a packet, said multiprotocol controller identifies the communication protocol from said type field in the printing information contained in said packet, the protocol control function said multiprotocol controller, which corresponds to the communication protocol identified from the communication protocol type field, is selected, and said transfer is performed in accordance with the identified communication protocol; and wherein said respective protocol control functions may be processed in parallel;

a front processor including the multiprotocol controller.

36. The network printer apparatus according to claim 31, wherein said front end processor further includes a spoiling controller for storing the printer data received in a hard disk and also queuing job information.

37. A LAN adapter as in claim 35, wherein said plurality of communication protocols includes at least a TCP/IP protocol.

38. A network printer apparatus connected to a plurality of clients through a LAN network system, comprising a LAN interface driver for receiving printing information from a client through said LAN network system, the printing information including an emulation name for identifying a format of a printing data sent from the respective one of the clients the printing information also containing an information portion field and a header field which is disposed ahead of the information portion field, the header field containing a destination address field, a sender address field and a communication protocol type field identifying the type of one of a plurality of communication protocols, said information portion field containing a header field for identifying the header of the communication protocol identified from said communication protocol type field, and a print data field, each of the communication protocols identifying a format for transferring the printing data between the apparatus and the respective one of the clients;

communication protocol control means having a respective protocol control function for each of said plurality of communication protocols and identifying one of the communication protocols by the protocol type in the printing information and further controlling transfer of the printing data between the apparatus and the respective one of the clients, wherein the printing information is sent through the LAN network in the form of a packet, said communication protocol control means identifies the communication protocol from said type field in the printing information in said packet, the protocol control function of said multiprotocol controller, which corresponds to the communication protocol identified from the communication protocol type field, is selected, and said transfer is performed in accordance with the identified communication protocol; and wherein said respective protocol control functions may be processed in parallel;

storage means for storing the printing data transferred;

a spooling controller coupled to said storage means for storing the printing data and creating a queue for printing jobs to be executed;

a printer controller for forming an image of the printing data by converting the printing data into dot image data based on the queue created by the spooling in controller; and a printing mechanism for printing the dot image data on paper.

39. A network printer apparatus as in claim 38, wherein said plurality of communication protocols includes at least a TCP/IP protocol.

* * * * *